US012664855B2

(12) United States Patent
(10) Patent No.: US 12,664,855 B2

Ohno et al.

(45) Date of Patent: *Jun. 23, 2026

(54) GAMING MACHINE AND CONTROL METHOD FOR OPERATING GAMING MACHINES TO DISPLAY COMPUTER-ANIMATED REEL GAMES

(71) Applicant: Konami Gaming, Inc., Las Vegas, NV (US)

(72) Inventors: Yuji Ohno, Las vegas, NV (US); Satoshi Suda, Las Vegas, NV (US); Yuji Taniguchi, Las Vegas, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,972

(22) Filed: Jan. 17, 2023

(65) Prior Publication Data

US 2023/0267797 A1 Aug. 24, 2023

Related U.S. Application Data

(63) Continuation of application No. 15/931,915, filed on May 14, 2020, now Pat. No. 11,587,390, which is a continuation of application No. 15/705,741, filed on Sep. 15, 2017, now Pat. No. 10,706,662.

(60) Provisional application No. 62/399,774, filed on Sep. 26, 2016.

(51) Int. Cl.
*G07F 17/32* (2006.01)

(52) U.S. Cl.
CPC ...... *G07F 17/3213* (2013.01); *G07F 17/3216* (2013.01); *G07F 17/3246* (2013.01); *G07F 17/3258* (2013.01); *G07F 17/3267* (2013.01)

(58) Field of Classification Search
CPC ............. G07F 17/3213; G07F 17/3216; G07F 17/3246; G07F 17/3258; G07F 17/3267; G07F 17/3239; G07F 17/3206; G07F 17/3241; G07F 17/3253; G07F 17/329
See application file for complete search history.

(56) References Cited

U.S. PATENT DOCUMENTS

| | | | | |
|---|---|---|---|---|
| 6,511,068 B1 * | 1/2003 | Sklansky | A63F 3/00157 273/237 |
| 8,668,573 B1 * | 3/2014 | Mayeroff | G07F 17/3267 463/16 |
| 10,726,678 B1 * | 7/2020 | Rehill | G07F 17/326 |
| 2003/0060265 A1 * | 3/2003 | Webb | G07F 17/3216 463/20 |

(Continued)

FOREIGN PATENT DOCUMENTS

| | | |
|---|---|---|
| JP | 2015-058366 A | 3/2015 |
| JP | 2016-063917 A | 4/2016 |

*Primary Examiner* — Jeffrey K Wong

(74) *Attorney, Agent, or Firm* — Howard & Howard Attorneys PLLC

(57) ABSTRACT

A gaming system including one or more gaming machines provides a game to one or more players. The game includes a primary game and a bonus game with first and second features. In the first feature a plurality of objects are presented to a player. The player is allowed to select one of the objects and an associated award may be awarded. Any unselected objects are added to an escrow meter. In the second feature, the player is allowed to select one or more of the escrow objects.

12 Claims, 51 Drawing Sheets

(56) References Cited

U.S. PATENT DOCUMENTS

| | | | | |
|---|---|---|---|---|
| 2003/0064800 | A1* | 4/2003 | Jackson | G07F 17/3209 463/16 |
| 2003/0195037 | A1* | 10/2003 | Vuong | G07F 17/32 463/29 |
| 2004/0082374 | A1 | 4/2004 | Maya et al. | |
| 2004/0147300 | A1* | 7/2004 | Seelig | G07F 17/34 463/16 |
| 2006/0073871 | A1* | 4/2006 | Rodgers | G07F 17/34 463/17 |
| 2006/0116208 | A1* | 6/2006 | Chen | G06F 9/545 463/43 |
| 2007/0117603 | A1* | 5/2007 | Seelig | G07F 17/3211 463/16 |
| 2008/0146346 | A1* | 6/2008 | Hardy | G07F 17/329 463/16 |
| 2008/0200241 | A1* | 8/2008 | Davies | G07F 17/3255 463/40 |
| 2008/0242421 | A1* | 10/2008 | Geisner | A63F 13/75 463/42 |
| 2009/0011821 | A1* | 1/2009 | Griswold | G07F 17/3206 463/25 |
| 2010/0016052 | A1 | 1/2010 | Gagner et al. | |
| 2010/0234093 | A1 | 9/2010 | Gomez et al. | |
| 2012/0276988 | A1 | 11/2012 | Vancura et al. | |
| 2014/0141870 | A1 | 5/2014 | Mayeroff et al. | |
| 2016/0063799 | A1* | 3/2016 | Reeves | G07F 17/326 463/17 |
| 2016/0163152 | A1 | 6/2016 | Ko | |
| 2016/0358424 | A1* | 12/2016 | Thomas | G07F 17/3272 |

* cited by examiner

| | | | | |
|---|---|---|---|---|
| PicB | Wild | PicB | PicD | J |
| Q | Wild | PicA | Q | PicA |
| K | Wild | J | A | 10 |
| Wild | Trigger | Q | PicB | 9 |
| Wild | 9 | PicD | PicD | J |
| Wild | J | Wild | Q | PicA |
| K | PicC | J | A | 10 |
| PicA | Trigger | Q | Wild | 9 |
| 9 | A | PicA | Wild | Wild |
| Trigger | PicA | K | Wild | Wild |
| J | Wild | Trigger | Trigger | Wild |
| PicC | Wild | PicC | Q | PicC |
| Wild | Wild | A | PicA | Trigger |
| Wild | K | J | Q | 10 |
| Wild | PicD | PicA | PicB | PicA |
| A | 10 | 10 | PicC | K |
| Q | PicA | K | J | PicB |
| PicD | J | Wild | Q | 10 |
| J | A | Wild | PicC | PicD |
| inn | J | Wild | A | PicA |

GAMING MACHINE AND CONTROL METHOD FOR OPERATING GAMING MACHINES TO DISPLAY COMPUTER-ANIMATED REEL GAMES

CROSS REFERENCE TO RELATED APPLICATION

This application is a continuation of U.S. patent application Ser. No. 15/931,915, filed May 14, 2020, which is a continuation of U.S. patent application Ser. No. 15/705,741, filed Sep. 15, 2017 (now U.S. Pat. No. 10,706,662, issued Jul. 7, 2020), which claims the benefit of U.S. Provisional Patent Application Ser. No. 62/399,774, filed Sep. 26, 2016, the disclosures of which are hereby incorporated by reference in their entirety.

COPYRIGHT NOTICE

The figures included herein contain material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

TECHNICAL FIELD

The present invention relates to a gaming machine, a control method for a gaming machine, and a program for a gaming machine.

BACKGROUND ART

Gaming machines, such as slot machines, are a cornerstone of the gaming industry. Generally, the popularity of such machines with players is dependent on the perceived likelihood of winning money at the particular game and the intrinsic entertainment value of the game relative to other available gaming options. Where the available gaming options include a number of competing games and the expectation of winning each game is believed to be generally the same, players are most likely to be attracted to the most entertaining and exciting games. Thus, gaming operators strive to employ the most entertaining and exciting games available because such games attract frequent play and, hence, increase profitability to the operator.

Furthermore, one concept that has been successfully employed to enhance the entertainment value of the game is the addition of a bonus game that may be played in conjunction with the "primary" game. The bonus game may comprise any type of game, either similar to or completely different from the primary game. The bonus game is initiated upon the occurrence of a selected event or outcome of the primary game.

Because the excitement and entertainment value of the primary game provides increased player appeal relative to other gaming machines and the bonus game concept increases player appeal and excitement, thereby increasing the chance to win the potential pay-out amount, there is a continuing need to develop new features for primary and bonus games. New features are necessary to appeal to player interest and enhance excitement in order to entice longer play and satisfy demands of operators for interesting games and increased profitability.

The present invention is directed to satisfying these needs.

SUMMARY OF INVENTION

In one aspect of the present invention, a gaming system is provided. The gaming system includes at least one gaming machine for providing a game to a player and a bonus award controller. The game includes a primary game and a bonus game. The bonus game includes at least a first feature and a second feature. The gaming machine includes a display unit and a first controller. The display unit is configured to display the game. The first controller is coupled to the display unit and configured to initiate the primary game and to establish an outcome of the primary game. The first controller, in response to detecting a first trigger condition, provides the first feature to the player. The first controller in providing the first feature to the player: presents to the player a plurality of objects; allows the player to select one of the plurality of objects; awards the player an award associated with a selected object; and, adds any unselected object to an escrow meter. The escrow meter includes a plurality of escrow objects. The bonus award controller is coupled to the gaming machine and, in response to detection of a second trigger condition, provides the second feature to the player. The bonus award controller in providing the second feature displays, on the display unit, the plurality of escrow objects; allows the player to select one or more of the escrow objects; and awards to the player an escrow award associated with the selected one or more of the escrow objects.

In another aspect of the invention, a control method for a gaming system is provided. The gaming system includes at least one gaming machine for providing a game to a player and a bonus award controller. The game includes a primary game and a bonus game. The bonus game includes at least a first feature and a second feature. The gaming machine includes a display unit and a first controller. The display unit is configured to display the game. The first controller is coupled to the display unit. The method includes the steps of: initiating the primary game and establishing an outcome of the primary game, detecting a first trigger condition and providing the first feature to the player. The method in providing the first feature to the player, includes the steps of presenting to the player a plurality of objects, each object having an associated award; allowing the player to select one of the plurality of objects; awarding the player the award associated with a selected object; adding any unselected object to an escrow meter; and detecting a second trigger condition and providing the second feature to the player. The escrow meter includes a plurality of escrow objects. The method in providing the second feature includes the steps of displaying, on the display unit, the plurality of escrow objects; allowing the player to select one or more of the escrow objects; and awarding to the player an escrow award associated with the selected one or more of the escrow objects.

In still another aspect of the present invention, a program for a gaming system is provided. The gaming system includes at least one gaming machine for providing a game to a player and a bonus award controller. The game includes a primary game and a bonus game. The bonus game includes at least a first feature and a second feature. The gaming machine includes a display unit and a first controller. The display unit is configured to display the game. The first controller is coupled to the display unit. The program of the gaming machine performs the steps of: initiating the primary game and establishing an outcome of the primary game, detecting a first trigger condition and providing the first feature to the player. The program of the gaming machine provides the first feature to the player, performs the steps of presenting to the player a plurality of objects, each object having an associated award; allowing the player to select one of the plurality of objects; awarding the player the award associated with a selected object; adding any unselected object to an escrow meter; and detecting a second trigger condition and providing the second feature to the player. The escrow meter includes a plurality of escrow objects. The program of the gaming machine provides the second feature to the player, performs the steps of displaying, on the display unit, the plurality of escrow objects; allowing the player to select one or more of the escrow objects; and awarding to the player an escrow award associated with the selected one or more of the escrow objects.

DETAILED DESCRIPTION OF EMBODIMENTS

A gaming system, according to an embodiment of the present invention, referencing the attached figures is described in detail below. Further, duplicated descriptions will be omitted for identical attached symbols in identical or corresponding parts in each figure.

With reference to the drawings, and in operation, the present invention is directed towards a gaming system 2, a control method for a gaming system 2, and a program for a gaming system 2 that provides a game to a player.

Figure 1A:
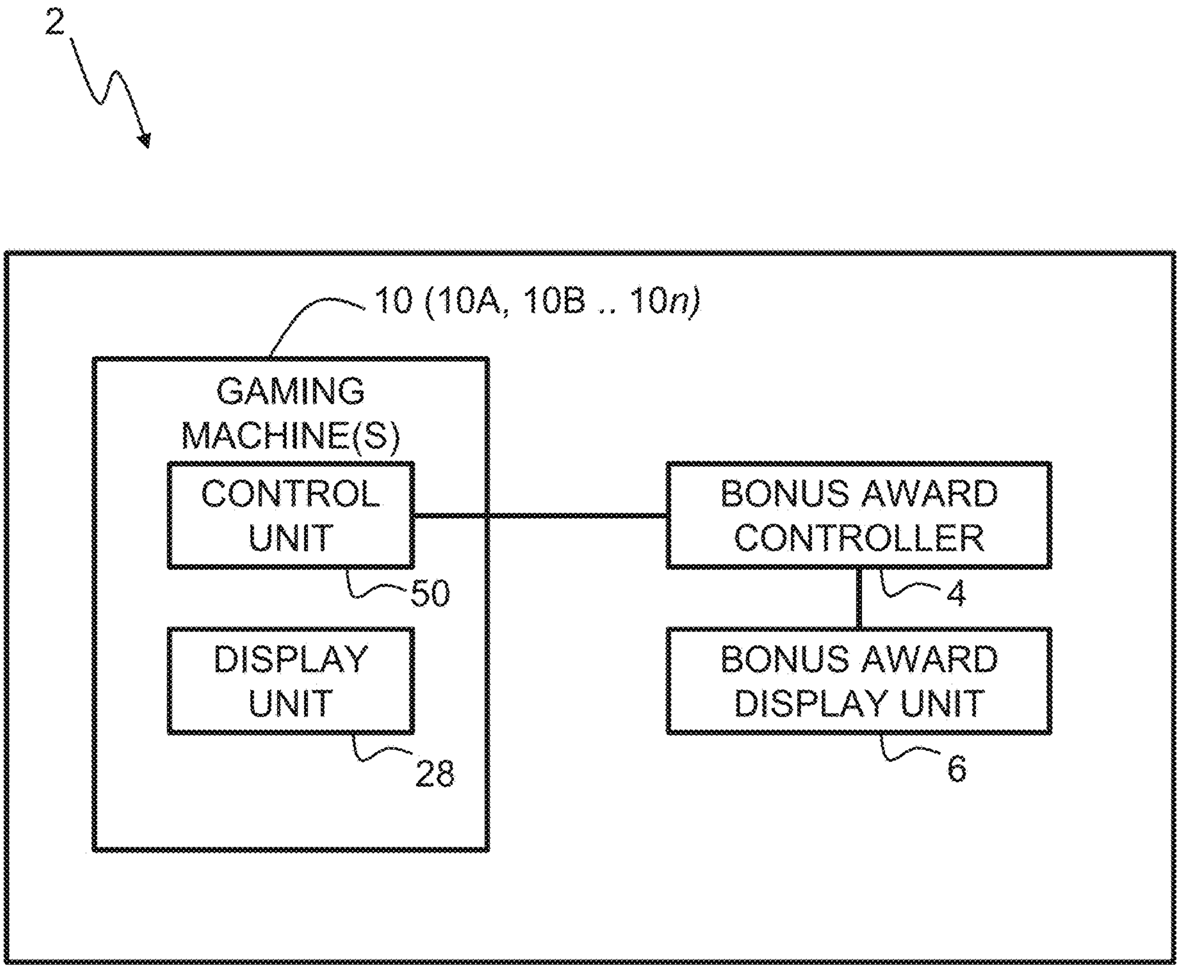
FIG. 1A is a functional block diagram of a gaming system, including one or more gaming machines, for providing a game to one or more players, according to an embodiment of the present invention.

With specific reference to FIG. 1A, the gaming system 2 includes at least one gaming machine 10 (10A, 10B . . . 10*n*). Each gaming machine 10 includes a controller 50 and a display unit 28. As discussed in further depth below, each gaming machine 10 may provide a game to a player. In one embodiment, the game includes a primary game and a plurality of features. As will be discussed in further detail below, the primary game may be a video slot game. In one aspect of the present invention, the features are triggered independently. In another aspect of the present invention, as discussed below, while triggered independently, occurrences in one of the features may affect another one of the features.

As shown in FIG. 1A, the gaming system 2 may include a bonus award controller 4 and a bonus award display unit 6. In one embodiment, the bonus award controller 4 is separate from, and may be spaced remotely from, the gaming machines 10. In another embodiment, the bonus award controller 4 may be housed within or adjacent to one of the gaming machines 10. In still another embodiment, the bonus award controller 4 may be implemented by the controller 50 of one or more of the gaming machines 10. The bonus award display unit 6 may be a display unit 6 separate from the gaming machines 10. The bonus award display unit 6 may display information related to one or more of the features of the game. The bonus award display unit 6 may be remotely located away from the gaming machines 10 or may be located at a position in which players at the gaming machines 10 may view the bonus award display unit 6. For instance, the gaming machines 10 may be arranged in a bank of gaming machines 10 and the bonus award display unit 6 may be positioned at, near or above the bank of gaming machines 10. For example, the gaming system 2 may include n gaming machines 10A, 10B . . . 10*n*. The gaming system 2 may include more than one bonus award display unit 6, each displaying the same or different information.

In one embodiment of the present invention, the game provided by the gaming system 2 includes a first feature and a second feature. In the first feature or bonus selection event, a plurality of objects (or indicia or symbols representing objects) is presented to a player. Each of the objects has an associated award. The player is allowed to select one of the objects and the associated award may be awarded. Any unselected objects are added to an escrow meter. In the second feature or bonus award event, the player is allowed to select one or more of the escrow objects. Each of the escrow objects has an associated escrow award. The escrow award(s) for any selected objects are awarded to the player.

As discussed more fully below, the features are generally triggered during the primary game upon the occurrence of an associated trigger condition. The trigger condition may be any suitable trigger condition. For example, trigger condition may be randomly determined (and unknown) to the player, i.e., a mystery trigger. In other embodiments, the trigger condition may be the appearance or occurrence of one or a plurality of predetermined symbols during the main or primary game. Alternatively, the trigger condition may be received from an external source, such as a player tracking system and/or casino management system (see below).

In one embodiment, the primary game and the features are all presented at the gaming machines 10 separately. In this embodiment, the bonus award controller 4 is located at or near the respective gaming machine 10 and may be implemented by the controller 50 of the gaming machine 10.

In one aspect, the primary game may be provided to a respective player by, or via one of the gaming machines 10. One or more of the features may be provided by the bonus award controller 4. For instance, in one embodiment, the primary game and the first feature may be provided by the controller 50 of the respective gaming machine 10. However, the second feature may be provided by the bonus award controller 4 which is in communication with the controller 50 of the respective gaming machine 10. For example, any unselected objects in the first feature are sent to the bonus award controller 4 to be stored in the escrow meter. Once the second feature is triggered (see below) at one of the gaming machines 10, the controller 50 of the one of the gaming machines 10 sends a signal to the bonus award controller 4 that the second feature has been triggered.

In one embodiment of the present invention, the first and second features are provided to a player at a gaming machine 10 separately from the other players, even if one or more of the features are implemented by the same bonus award controller 4. In other words, even if the gaming system 2 includes multiple gaming machines 10 linked to a bonus award controller 4, the bonus award controller 4 maintains a separate escrow meter for each player and/or gaming machine 10.

In another embodiment, the bonus award controller 4 maintains an escrow meter for a plurality of gaming machines. The first feature may be triggered or provided to players on each of the gaming machines 10. Any unselected objects during the first feature are added to the same escrow meter. When the second feature is triggered, by any one of the players, all of the saved objects or escrow objects in the escrow meter are available.

Figure 2A:
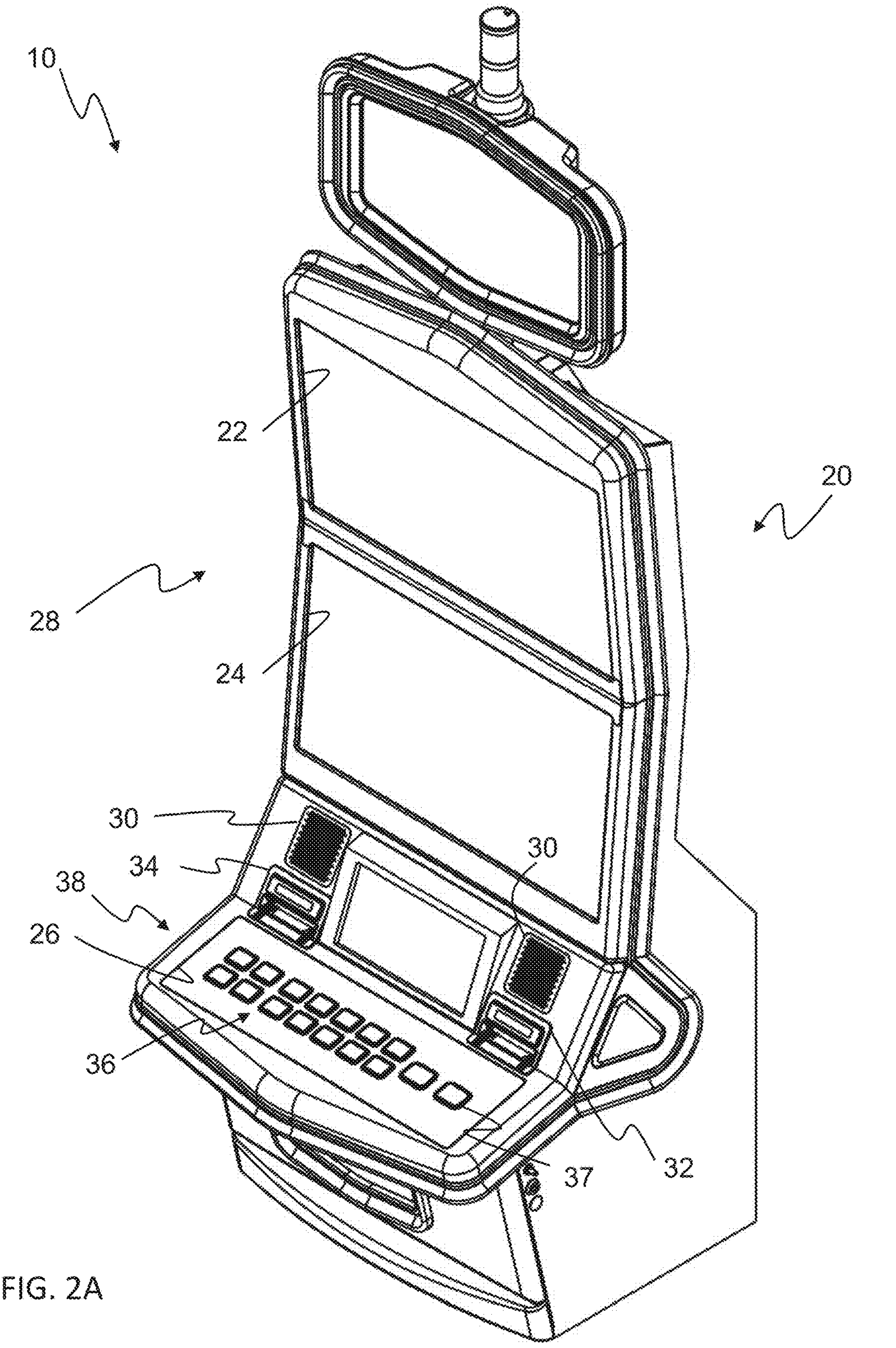
FIG. 2A is a perspective view of the gaming machine, according to the first embodiment.
Figure 2B:
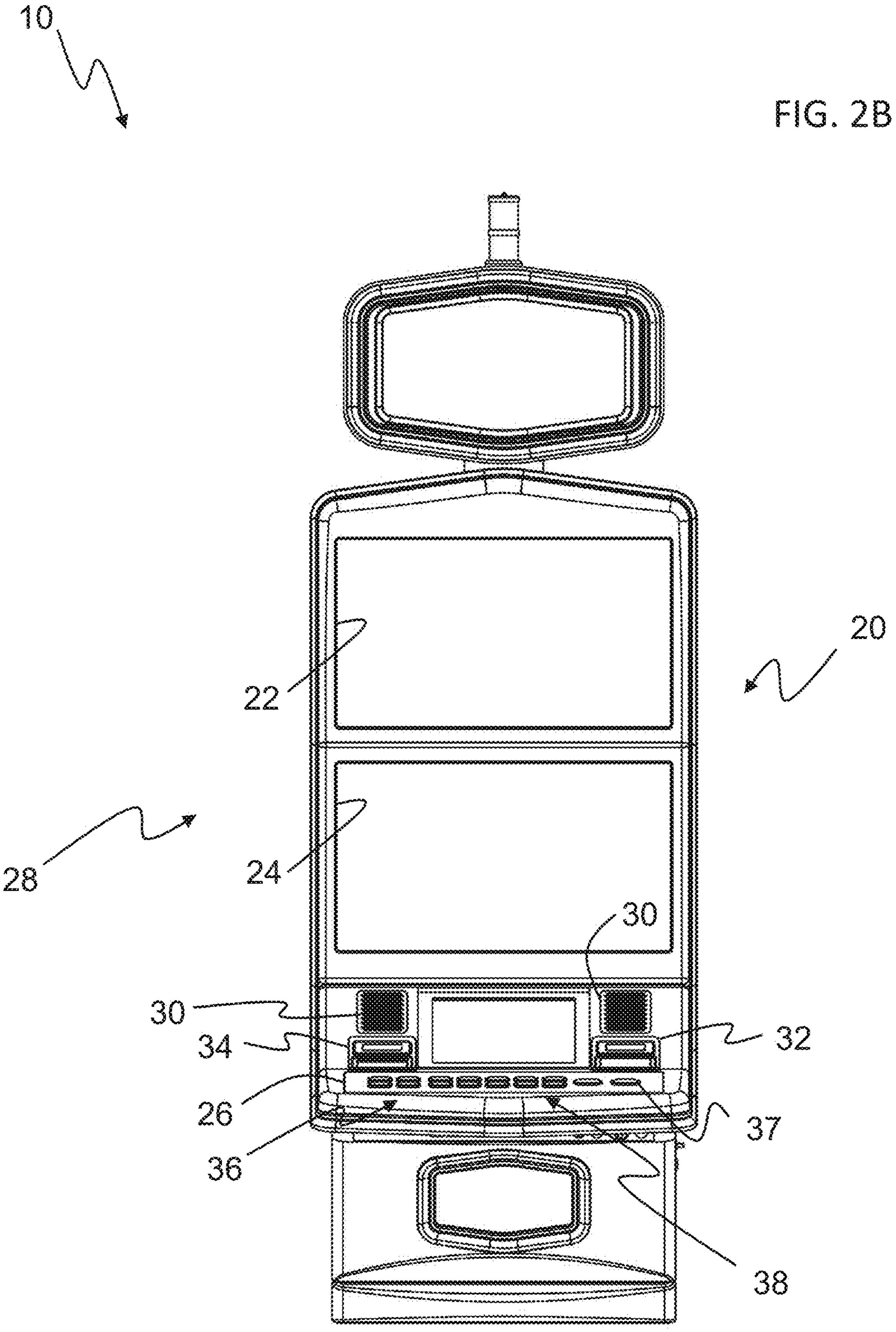
FIG. 2B is a front view of the gaming machine of FIG. 1A.
Figure 2C:
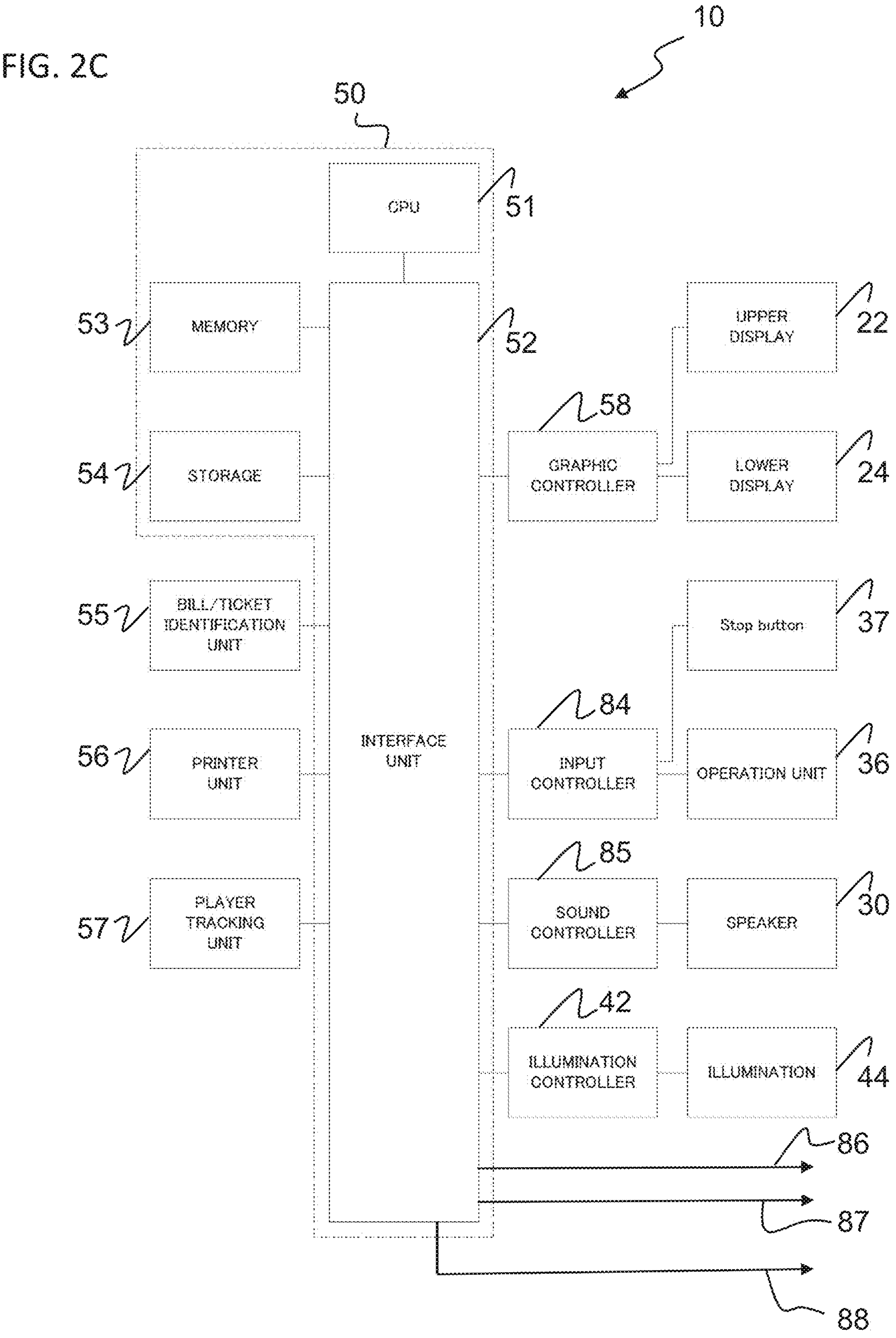
FIG. 2C is a functional block diagram of the gaming machine in FIGS. 2A and 2B.

With reference to FIGS. 2A, 2B, and 2C, an exemplary gaming machine 10 according to an embodiment of the present invention is shown. The gaming machine 10 according to the present embodiment, receives a predetermined game value from the player, generates a game result, and provides a payout to the player according to the game result. FIG. 2A and FIG. 2B are a perspective view and a front view, respectively, of a gaming machine 10, according to the present embodiment. As shown in FIG. 2A, this gaming machine 10 provides a cabinet 20 providing an upper display 22, a lower display 24, a control panel 26 and may also house a player tracking or ranking unit 57 (see FIG. 2C). The upper and lower displays 22, 24 form a display unit 28. The cabinet 20 also houses a controller 50 (see FIG. 2C) that controls each part (see below). The controller 50 also implements a random number generator (RNG) that is used during operation of the game. Each configuration is described below.

The upper display 22 and the lower display 24 may be flat panel display devices, such as both liquid crystal display devices and organic EL display devices and the like, and by controlling via each controller 50, the game screen mentioned below functions as the display unit 28 provided to the player.

Speakers 30 are provided on the left and right of the cabinet 20, and by controlling via the controller 50, sound is provided to the player. On the control panel 26, a bill/ticket identification unit 32, the printer unit 34, and an operation unit 36 are provided.

The player tracking unit 57 may be housed on the center of the front surface of the cabinet 20. The player tracking unit 57 has a card reader that recognizes a player identification card, a display that presents data to the player, and a keypad that receives input by the player. This type of player tracking unit 57 reads information recorded on the player identification card inserted by the player into the card reader, and displays the information and/or information acquired by communicating with the external system on the display, by cooperatively operating with the controller 50 mentioned below or an external system. Further, input from the player is received by the keypad, the display is changed according to the input, and communication with the external system is carried out as necessary.

The bill/ticket identification unit 32 is disposed on the control panel 26 in a state where the insertion opening that a bill or ticket is inserted into is exposed, an identification part that identifies a bill/ticket by various sensors on the inside of the insertion opening is provided, and a bill/ticket storage part is provided on the outgoing side of the identification part. The bill/ticket identification unit 32, receives and identifies bills and tickets (including vouchers and coupons) that are the game value as a game executing value, and notifies the controller 50 mentioned below.

The printer unit 34 is disposed on the control panel 26 in a state where the ticket output opening that a ticket is output from is exposed, a printing part that prints predetermined information on a printing paper on the inside of the ticket output opening is provided, and a housing part that houses the printing paper inside the paper inlet side of the printing part is provided. The printer unit 34, under the control of the controller 50 mentioned below, prints information on paper and outputs a ticket according to credit payout processing from the gaming machine 10. The output ticket can use the payout credit as game play by being inserted into the bill/ticket identification unit 32 of another gaming machine 10, or, can be exchanged for cash by a kiosk terminal inside of the casino or a casino cage.

The operation unit 36 receives the operation of the player. The operation unit 36 includes a group of buttons 38 that receives various instructions from the player on the gaming machine 10. The operation unit 36, for example, may include a spin button 37 and a group of setting buttons. The spin button 37 receives an instruction to start (start rotating the reel) the game listed below. In certain embodiments discussed below, the spin button 37 may be used as a stop button 37 during the skill-based game. The group of setting buttons 38 includes a group of bet buttons, a group of line-designation buttons, a max bet button, and a payout button and the like. The group of bet buttons receives an instruction operation regarding the bet amount of credits (bet number) from the player. The group of line-designation buttons receive an instruction operation that designate a pay line (referred to as an effective line below) subjected to a line judgment below from the player. The max bet button receives an instruction operation regarding the bet of the maximum amount of credits that can be bet at one time from the player. The payout button receives an instruction operation instructing a credit payout accumulated in the gaming machine 10.

With reference to FIG. 2C, further on the inside of the cabinet 20, a control board equipped with a central processing unit 51 (abbreviated as CPU below) that configures the controller 50, an interface unit (or part) 52, a memory 53 and a storage 54 and the like are incorporated. The control board is configured so that communication is possible through the interface unit 52 and each of the components equipped on the cabinet 20, controls the operation of each part by executing the program recorded in the memory 53 or the storage 54 of the CPU 51, and provides a game to the player.

FIG. 2C shows a functional block diagram of the gaming machine 10, according to the present embodiment. The gaming machine 10 provides the controller 50. The controller 50 is configured as the interface unit 52 including a chip set providing communication functions of the CPU 51, a memory bus connected to a CPU, various expanding buses, serial interfaces, USB interfaces, Ethernet (registered trademark) interfaces and the like, and a computer unit where the CPU 51 provides the addressable memory 53 and the storage 54 through the interface unit 52. The memory 53 can be configured to include RAM that is a volatile storage medium, ROM that is a nonvolatile storage medium, and EEPROM that is a rewritable nonvolatile storage medium. The storage 54 provides the controller 50 as an external storage device function, can use reading devices such as a memory card that is a removable storage medium, and a magneto optical disk and the like, and can use hard disks.

On the interface unit 52, in addition to the CPU 51, the memory 53, and the storage 54, a bill/ticket identification unit 55, a printer unit 56, the player tracking unit 57, a graphic controller 58, an input controller 84, and a sound controller 85 are connected. That is, the controller 50 is connected to the operation unit 36 through the input controller 84, and connected to the upper display 22 and/or the lower display 24 through the graphic controller 58. Further, when illumination that provides decorative lighting to the gaming machine 10 is provided, the illumination is controlled under the control of the controller 50 on the interface unit 52, and an illumination controller 42 that provides a decorative lighting effect may be connected.

The controller 50, which includes memory 53 and storage 54, controls each part by executing a program stored in the memory 53 and the storage 54, and provides a game to the player. Here, for example, the memory 53 and storage 54 may be configured to store a program and data of an operating system and subsystem that provide the basic functions of the controller 50 to the EEPROM of the memory 53, and stores a program and data of an application that provides a game to the storage 54. According to such a configuration, it can be easy to change or update a game by replacing the storage 54. Further, the controller 50 may be a multiprocessor configuration that has a plurality of CPUs.

Each block connected to the controller 50 is described below. The bill/ticket identification unit 55 corresponds to the bill/ticket identification unit 32, receives bills or tickets in the insertion opening, and notifies the controller 50 of identifying information corresponding to the assortment of bills or the payout processing of credits. The bill/ticket identification unit 55 notifies the information to the controller 50, and the controller 50 increases the usable credit amount inside of the game according to the notified content. The printer unit 56 corresponds to the printer unit 34, and under the control of the controller 50 that receives an operation of the payout button of the group of setting buttons 38, information corresponding to the credit payout processing from the gaming machine 10 is printed and output on a printed ticket.

The player ranking (or tracking unit) unit 57 cooperatively operates with the controller 50, and sends and receives information and the like of the player from the casino management system. The graphic controller 58 controls the upper display 22 and the lower display 24, under the control of the controller 50, and displays a display image that includes various graphic data. The sound controller 85 drives the speakers 30 under the control of the controller 50, and provides various sounds such as an announcement, sound effects, BGM and the like.

Further, the interface unit 52, has various communication interfaces for communicating with the exterior of the gaming machine 10, for example the interface unit 52 can communicate with an external network by Ethernet 86, 87, and a serial output 88. In the present embodiment, one example shows when there is communication between a well-known server side gaming network (Server Based Gaming), a G2S network (Game to System), and a slot information system (Slot Data System), respectively.

The controller 50 determines if a trigger condition has occurred during the primary game, and if the trigger condition has occurred, the controller 50 provides a corresponding feature game (see below).

In one embodiment the trigger condition is the appearance a predetermined symbol or symbols in the interim outcome. The predetermined symbol may be randomly determined (and unknown) to the player, i.e., a mystery trigger.

It should be noted that the trigger condition may be any suitable condition or set of conditions that may occur in the game, or occur independent of the game, e.g., from an outside source such as a player tracking system. The trigger condition may be a mystery trigger event, i.e., an event which while related to the main game, is not visible or part of or shown within the outcome of the game.

Further, in the illustrated embodiment discussed below, the primary game is a video slot game. However, as noted above the present invention is not limited to such a primary game. In the illustrated embodiment, a gaming machine 10 providing a primary game in the form of a slot machine is described, but the present invention is not limited thereto, and a primary game in the form of poker, a video card game called black jack, bingo, keno, a wheel game and the like may be provided. Further, it is possible to apply the present invention to a pachinko machine or a pachinko slot machine. The present invention may be used with any type of primary game.

A game screen may be provided by the gaming machine 10 during the primary game, according to an embodiment of the present invention. The game screen may be displayed on the display unit 28 (the upper display 22 and/or the lower display 24) by the controller 50 executing a predetermined program. In the illustrated embodiment, the game screen is displayed on the lower display 24. In the upper display 22, a game title may be displayed as well as other information related to the primary game and/or the feature(s). In one aspect of the present invention, the gaming machine 10 provides a primary game to the player. For instance, the primary game may be a video slot game. During the primary game, in response to a predetermined trigger or trigger condition, one or more features may be provided.

Figure 3A:
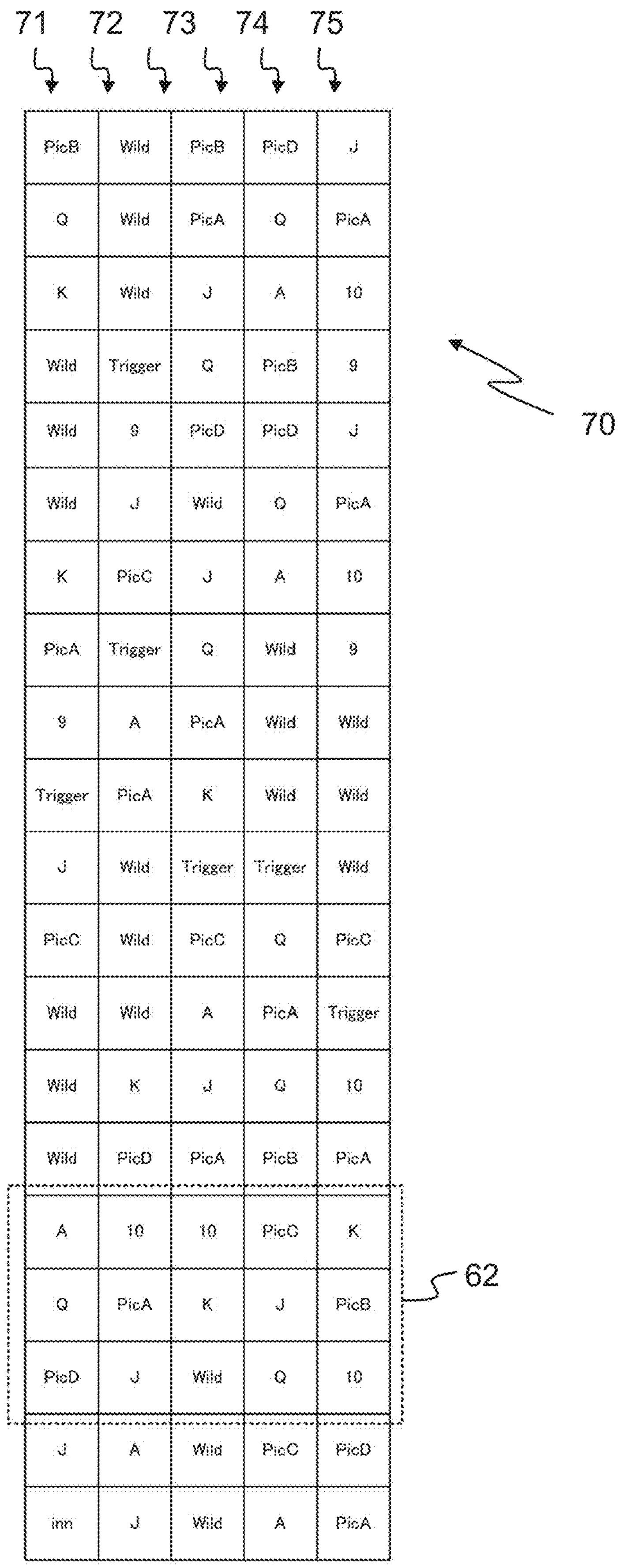
FIG. 3A is a figure showing an exemplary symbol arrangement showing the order of symbols displayed during a base or primary game, according to an embodiment of the present invention.
Figure 3B:
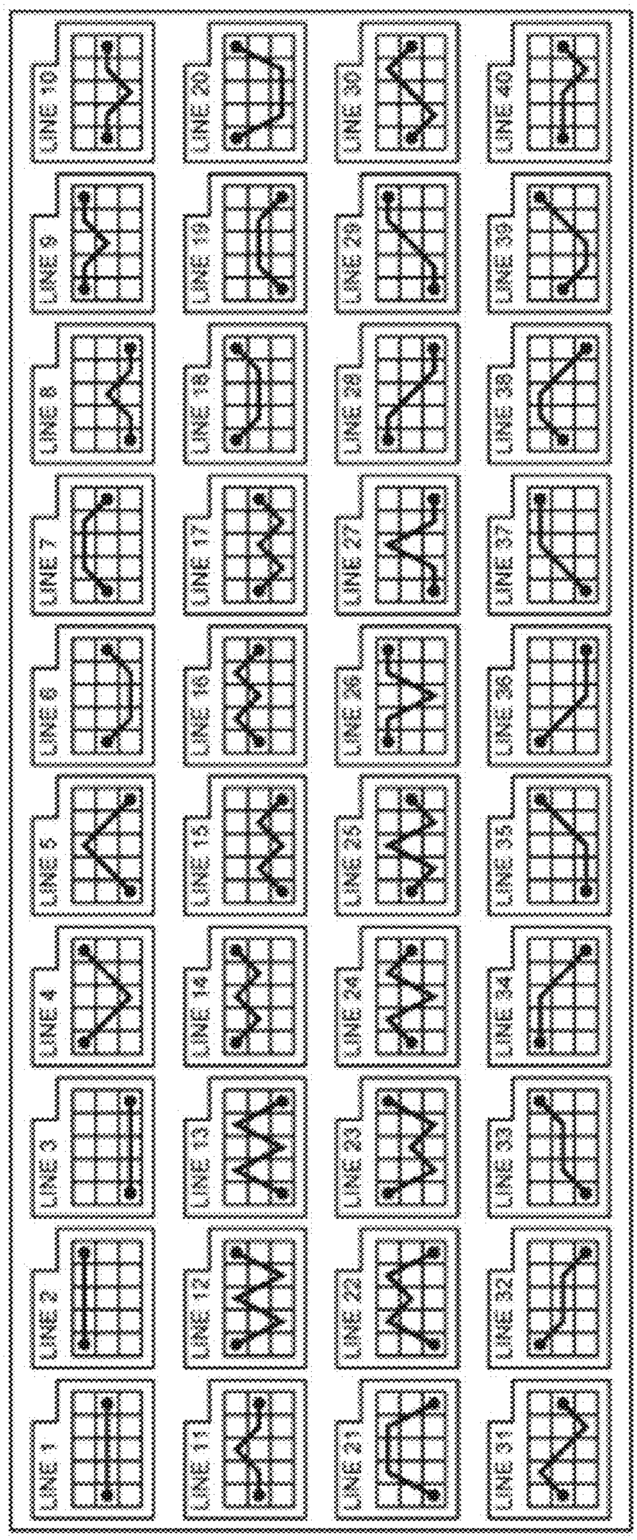
FIG. 3B is a figure showing one example of a pay line set on the determination area in FIG. 3A.

With reference to FIGS. 3A and 3B, the primary game of the present invention may provide a video slot game in a display area or grid 62 during the primary game. The grid or display area 62 may be displayed on either the upper display 22 or the lower display 24. The present embodiment shows the state of displaying the game screen on the lower display 24. As shown in FIG. 3A, this game screen has a determination area 62 for displaying symbols. By using such a game screen, the gaming machine 10 of the present embodiment operates as a slot machine that pays a payout according to a winning combination of symbols displayed on the determination area 62.

The display unit 28 displays a plurality of symbols in the display area 62. The determination area 62, or grid, 62 has a plurality of rows (r) and columns (c). The determination area 62 is configured by a plurality of cells 64 that are the stop position of symbols. For example, the display area 62 may include 15 cells 64 disposed in a grid shape of 3 rows and 5 columns. The upper display 22 may be used to display animations during the feature animations. Further, the display unit 28 can display a decorative area, and an area that displays credit amount, bet number, and a credit amount obtained by winning (WIN number) and the like, outside of the determination area 62. On each of the plurality of cells 64 of the display area 62, one symbol is stopped and displayed.

Figure 4A:
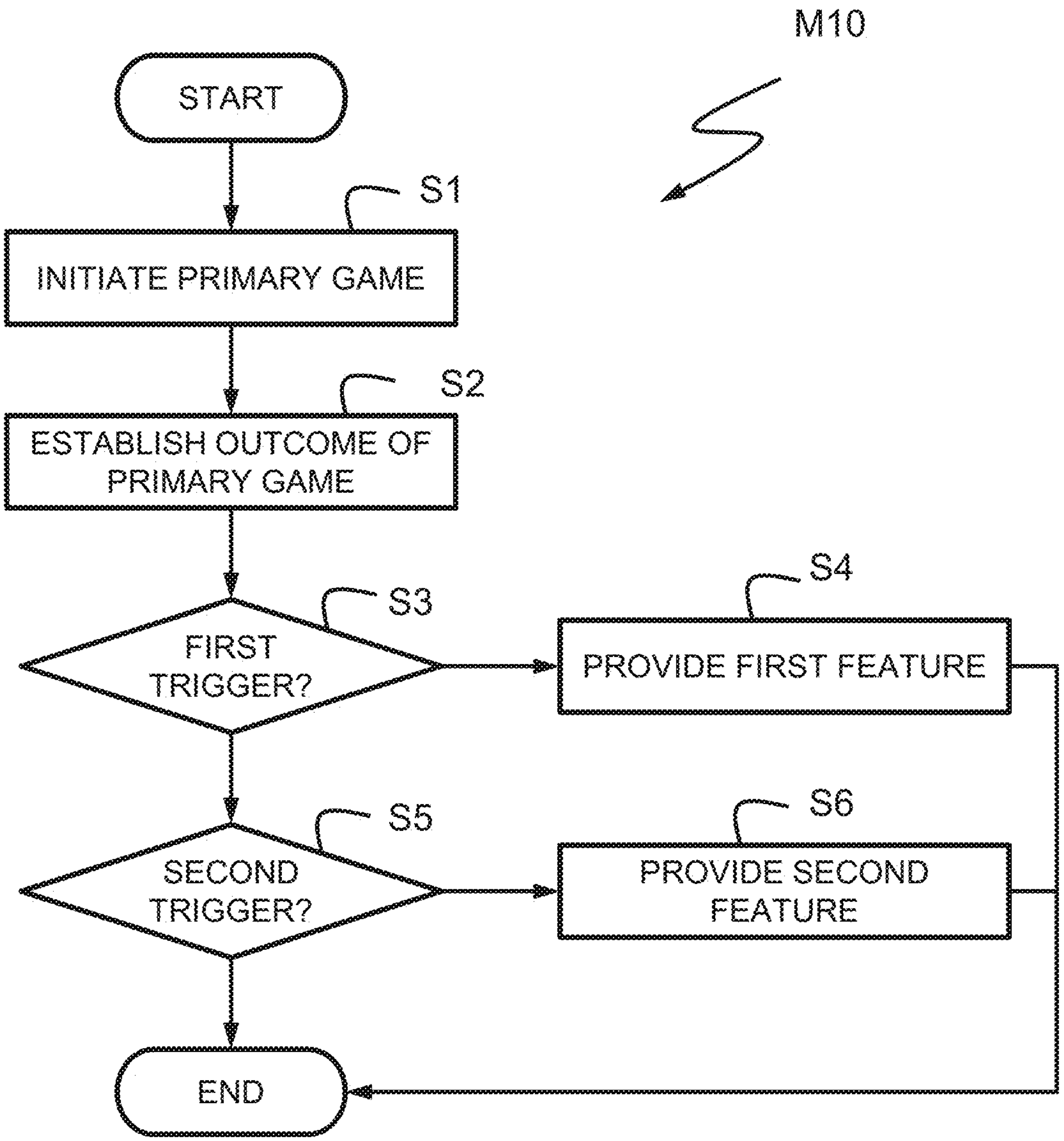
FIGS. 4A-4C are portions of a flow diagram of a method for providing a game to a player, according to an embodiment of the present invention.
Figure 4B:
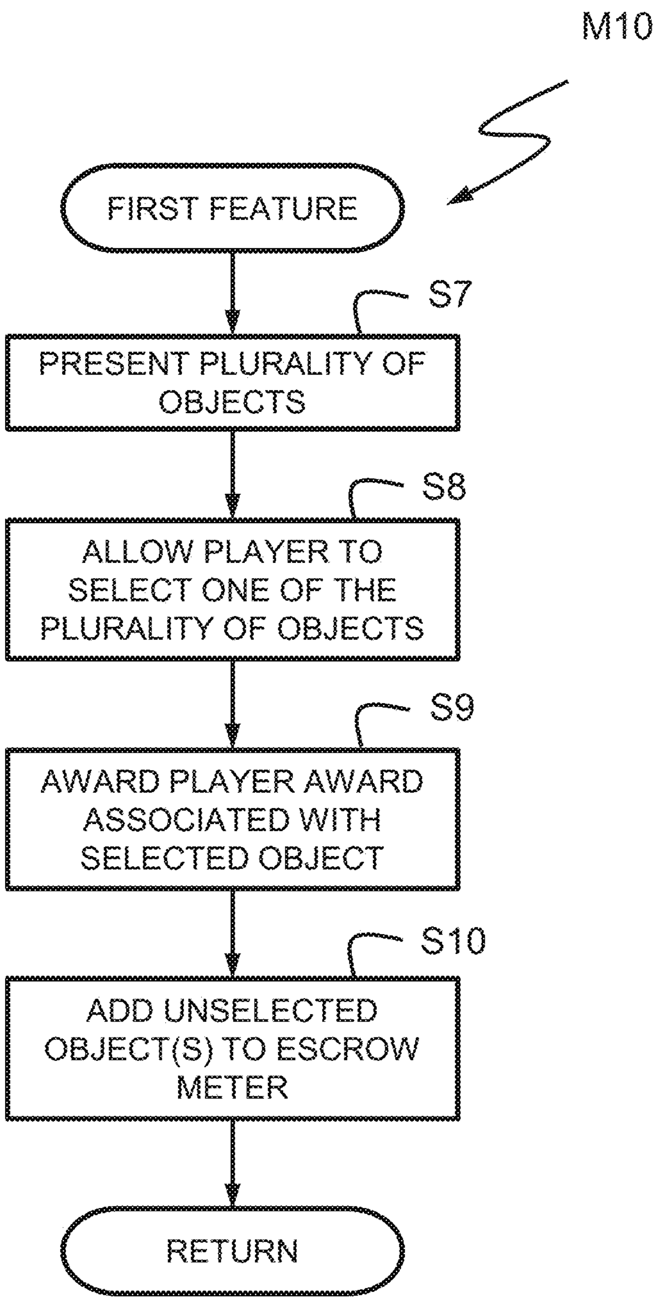

On each cell of the display area 62, as shown in FIGS. 3A and 4B, a symbol is displayed based on the symbol arrangement of virtual reel strips 71 to 75 configured of a virtual reel set 70. That is, the cells 64 of the display area 62 correspond to the virtual reel strips 71 to 75 by column, and the symbols disposed on predetermined parts of each virtual reel strip 71 to 75 are displayed. Furthermore, as mentioned below, by moving (scrolling or spinning) each symbol by column based on the symbol arrangement of the virtual reel strips 71 to 75, the symbols displayed in the cells 64 of the determination area 62 change, and by stopping the movement (scrolling or spinning) by columns, the symbols are stopped. Here, the virtual reel strips 71 to 75 are data where the controller 50 uses a program having the memory 53 or the storage 54, and data showing the symbol arrangement (i.e., the order of symbols on each reel) regulated by each cell column. Further, the virtual reel set 70 is a general term for such virtual reel strips 71 to 75.

Each virtual reel strip 71 to 75, in the example of FIG. 3A, is configured by twenty symbols in respective symbol positions, and those symbols are aligned in an order defined by each reel. Each virtual reel strip 71 to 75 includes symbols selected from a symbol set. This symbol set includes card symbols ("9", "10", "J", "Q", "K", and "A") that imitate playing cards as regular symbols, and picture symbols ("PicA", "PicB", "PicC", and "PicD") that show a pattern. Further, this symbol set includes a wild symbol ("Wild") that is substituted as another symbol when a win is determined and a trigger or symbol ("Trig") that may be used to determine if a bonus game is to be provided. Each of these symbols have a different rank from each other regarding their value when winning, their rank gradually raises in this order: "9", "10", "J", "Q", "K", "A", "PicA", "PicB", "PicC", and "PicD", A combination of symbols that includes high-ranking symbols when winning, can obtain a larger winning payout compared to a combination of low-ranking symbols when winning.

In general, the controller 50 starts a primary game, determines the stop position of each virtual reel strip 71 to 75 randomly, the virtual reel strips 71 to 75 move from a current position, and the operation to stop on a stop position uses the display unit 28 (for example, the lower display 24) and is expressed. Due to this, in the display or determination area 62, the symbols included on the virtual reel strips 71 to 75 are continuously moved (scrolled or spun) in the vertical direction of the display area 62 (see FIG. 3A), and one symbol of one cell aligned in an order of the symbol based on the symbol arrangement is stopped so that it is displayed.

The controller 50 changes and stops the plurality of symbols displayed on the display unit 28 according to the operation of the player received by the operation unit 36, and a payout may be paid according to the stopped symbols inside the determination area 62.

In the display area 62, a pay line is set that is used when winning is determined. The pay line is set to be extended over the column on the right end from the cells of the column of the left end, and is a line that combines the plurality of cells determining a win. The number of effective lines within the set pay line is selected by the operation of a group of line designation buttons included in the group of setting buttons 38 of the operation unit 36 for the player. The controller 50, in regards to the result of a game that is a combination of symbols, determines a win when a predetermined number of identical symbols is surpassed and aligned on a set pay line, and pays a payout to the player according to the type and number of symbols. On the gaming machine 10 of the present embodiment, a predetermined number of pay lines (LINE 1-40) of cells with three rows and five columns in the display area 62 is set (see FIG. 3B). The system for determining a win may determine a win when a predetermined number of identical symbols from cells of the column on the left end are aligned on a set pay line, may determine a win when a predetermined number of identical symbols from cells of the column on the right end are aligned on a set pay line, and may determine a win when a predetermined number of identical symbols are aligned on a continuous column on a predetermined pay line.

It should be noted that pay lines shown other than (or in addition to) the pay lines shown in FIG. 3B may be used. In general, the pay lines shown in FIG. 3B start in the first column and end in the last column, and include one cell per column. However, one or more pay lines could include one or more cells in the same column and may include a vertical pay line.

In one embodiment of the present invention, the gaming machine 10 includes the operation unit 36, a display unit 22, 24 and a controller 50. The operation unit 36 is configured to receive an operation of a player (see above). The display unit 22, 24 is operably coupled to the operation unit 36 and is configured to display a symbol display area 62. The symbol display area 62 includes a plurality of cells arranged in a grid 62. As discussed above, the grid 62 has a plurality of rows and a plurality of columns.

The controller 50 is operably coupled to the operation unit 36 and the display unit 28 and is configured to initiate a game in response to player operation and to establish an outcome of the game. The controller 50, in response to initiation of the game, being randomly selects a plurality of symbols associated with the symbol display area or grid 62. Each symbol in the plurality of symbols is associated with one of the plurality of cells 64 in the grid 62. The plurality of symbols forms an interim outcome.

The controller 50 determines if a trigger condition has occurred during the primary game, and if the trigger condition has occurred, the controller 50 provides a respective feature.

In one embodiment the trigger condition is the appearance a predetermined symbol or symbols in the interim outcome.

The predetermined symbol may be randomly determined (and unknown) to the player, i.e., a mystery trigger.

It should be noted that the trigger condition may be any suitable condition or set of conditions that may occur in the game, or occur independent of the game, e.g., from an outside source such as a player tracking system. The trigger condition may be a mystery trigger event, i.e., an event which while related to the main game, is not visible or part of or shown within the outcome of the game.

Returning to FIGS. 1A, 1B, 2A, 2B, and 2C, in one embodiment the gaming system 2 includes a first gaming machine 10A and a bonus award controller 4. It should be noted that the bonus award controller 4 may be controller 50 separate from the controller 50 of the gaming machine 10A or may be implemented by, or one of, the controller(s) 50 of the gaming machines 10. The features described below may be provided to a player by a first controller 50, i.e., the controller 50 of the first gaming machine 10A either by itself or through or under the control of the bonus award controller 4.

The gaming machine 10A provides a game to a first player. The game includes a primary game, a first feature and a second feature. The gaming machine 10A includes a display unit 28 that is configured to display the primary game. As discussed above, the display unit 28 may include an upper display 22 and a lower display 24. The primary game may be displayed on the upper display 22, the lower displayer and/or both on the upper and lower displays 22, 24. The first controller 50 is coupled to the display unit 28 and configured to initiate the primary game and to establish an outcome of the primary game. As discussed above, the first controller 50 may provide an award to the player based on the outcome of the primary game.

The first controller 50, in response to detecting a first trigger condition, is configured to provide the first feature to the player. In one embodiment, the first controller 50 provides the first feature directly to the player. In another embodiment the first controller 50 provides the first feature to the player under the control of the bonus award controller 4.

Figure 1B:
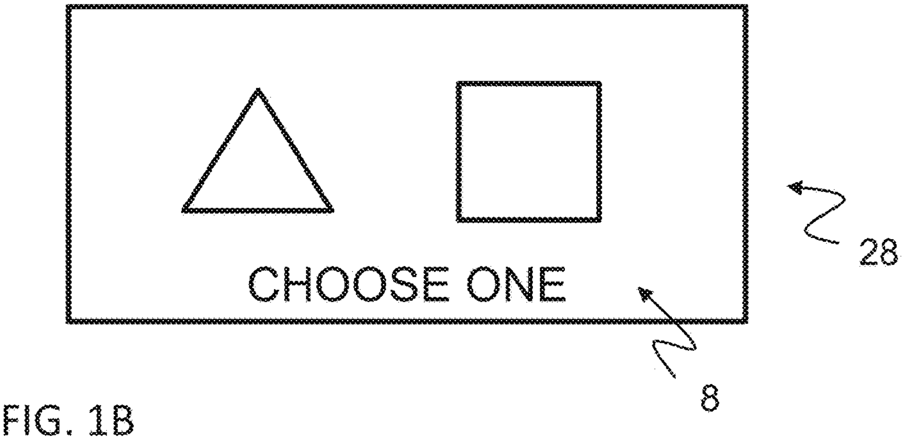
FIG. 1B is a diagrammatical illustration of a player selection dialog according to an embodiment of the present invention.

With reference to FIGS. 1A and 1B, in one aspect of the present invention, the first controller 50, in providing the first feature to the player, presents to the player a plurality of objects 8 and allows the player to select one of the plurality of objects 8. Each of the objects 8 has an associated (concealed) award. The player is awarded the award associated with the selected object.

In one aspect of the present invention, the objects 8 presented to the player are randomly selected from a set of available objects. In the illustrated embodiment, the set of available objects includes a triangle, a square and a circle. For each instance of the first feature, the objects 8 presented to the player are randomly chosen. Each object 8 presented to the player has an associated award. In one embodiment, the award associated with each object is randomly determined. It should be noted that the presented objects 8 may include more than one of the same type of object. For instance, in the illustrated example of FIG. 1B, the presented objects 8 include a triangle and a square. However, the presented objects 8 could include any combination of the set of available objects, including two triangles, two squares or two circles. Each of the presented symbols may a randomly determined award associated therewith. The randomly associated awards may be determined from a range of credit values. Alternatively, the randomly determined awards may be randomly determined from a set of possible awards. Each of the possible awards may have the same probability of occurring or each may have a different or weight probability of occurring. The probabilities may be different for each object type.

Alternatively, or in addition, the set of possible awards may also include jackpots. The jackpots may have an associated predetermined value or credit value or may be a progressive jackpot. In one embodiment, the set of possible awards may include six jackpots (in addition to, or in replacement of any credit awards). For example, the set of possible awards may include: Gold, Purple, Red, Orange, Blue, and Green jackpots. In another embodiment, the set of possible awards includes 3 progressive jackpots: Mini, Maxi, and Supreme jackpots.

In the illustrated embodiment, the set of possible objects or object types includes three objects (a triangle, a square, and a circle). However, it should be known that other objects and/or a set of possible objects that includes more or less than 3 objects may be used.

Additionally, in the illustrated embodiment the player is presented with two objects and is allowed to choose one of the objects in the first feature. However, it should be noted that the player may be presented with more than two objects. In such embodiments, the player may be or is allowed or must pick a number of objects. Generally, the number of objects the player may or must select is less than the number of objects presented such that there is at least one remaining object at the completion of the first feature.

After the player selects one of the symbols, the award associated with the selected symbol may be awarded to the player. Any unselected objects or symbols are added to an escrow meter 9.

In general, the escrow meter 9 is maintained by the bonus award controller 4. The unselected object(s), including information relating to the unselected objects, which may include, e.g., the award associated with the unselected objects and the order is in which the unselected objects have been acquired or added to the escrow meter 9. The unselected objects added to the escrow meter 9 along with any objects already within the escrow meter 9 are known as escrow objects.

Figure 1C:
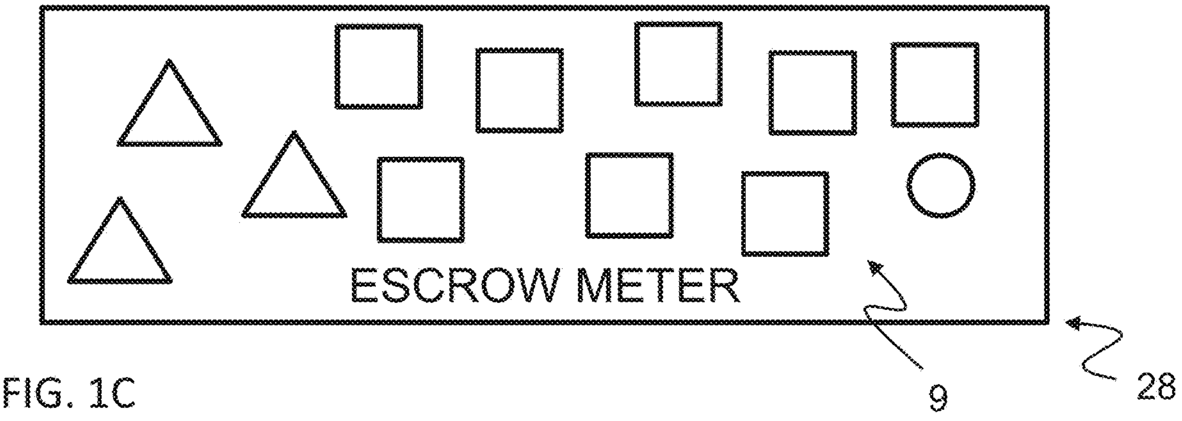
FIG. 1C is a diagrammatical illustration of a display with an escrow meter according to an embodiment of the present invention.

With reference to FIG. 1C, in one embodiment the escrow meter 9 is displayed on the bonus award display unit 6 (see above). The escrow meter 9 may also be displayed on the display unit 28 of the gaming machines 10. In one embodiment, each of the objects may be individually displayed in the escrow meter 9. Thus, if there are multiple instances of one of the objects, each instance is shown separately.

Figure 1D:
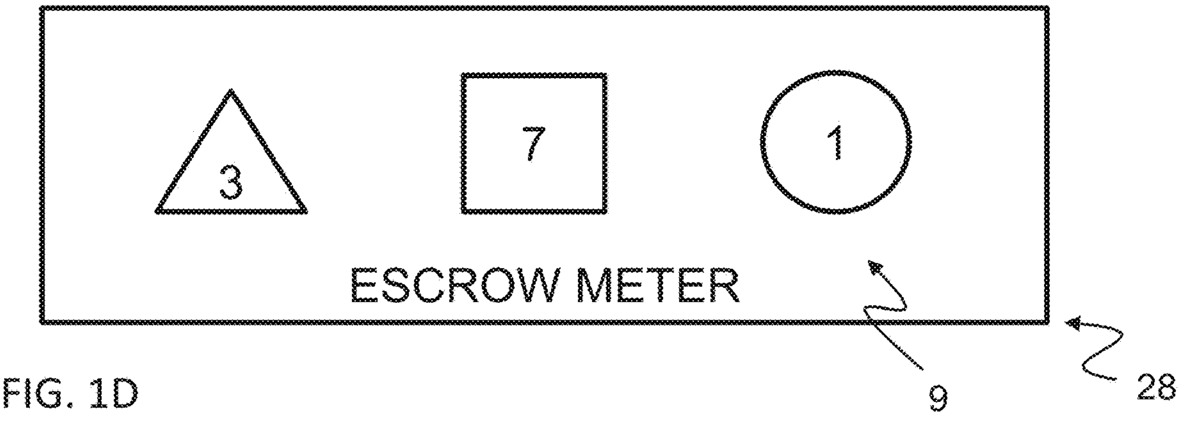
FIG. 1D is a diagrammatical illustration of a display with an escrow meter according to another embodiment of the present invention.

With specific reference to FIG. 1D, in another embodiment, if there are multiple instances of the objects, then a single instance of each object may be shown. Each object may include a label with the number of instances of the respective object in the escrow meter 9. For example, in the example of FIG. 1D, the escrow meter 9 includes three instances of the triangle object, seven instances of the square object and one instance of the circle object.

Figure 1E:
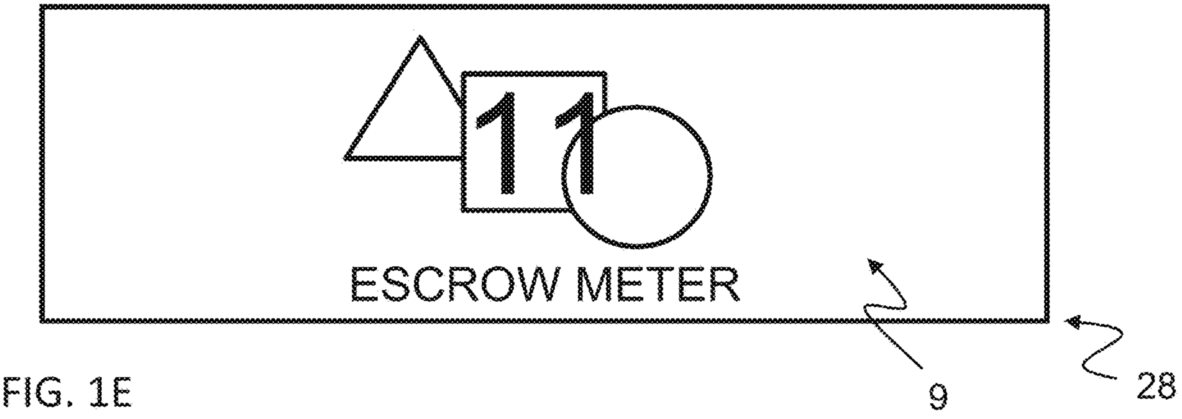
FIG. 1E is a diagrammatical illustration of a display with an escrow meter according to still another embodiment of the present invention.

With specific reference to FIG. 1E, in still another embodiment, if there are multiple instances of the objects, then a single instance or multiple instance of each object may be shown (at least in part) with the total number objects indicated.

The bonus award controller 4 is coupled to the controller 50 of the gaming machine(s) (10). In response to a second trigger condition, the bonus award controller 4 provides the second feature.

In providing the second feature, the bonus award controller 4 in providing the second feature displays on the display unit 28 the escrow objects. Each of the escrow objects has an associated (hidden) escrow award. The escrow award may be the same as the object award previously associated with the escrow object prior to the corresponding added to the escrow meter 9. Alternatively, an escrow award may be randomly determined and associated with each escrow object after (or when) the escrow object is added to the escrow meter 9. The randomly determined escrow awards may be determined in a manner similar to the process in which the object awards are determined for the objects in the first feature. However, the escrow awards may be determined from the same set of possible awards or a different set of possible awards.

After the escrow objects are displayed, the player is allowed to select one or more of the escrow objects.

In one embodiment, the player is allowed to select a predetermined number of the escrow objects.

In another embodiment, the player may select escrow objects until a predetermined condition has occurred. For instance, in one specific embodiment, the player may select escrow objects until the player has selected all of the escrow objects, until a selected escrow award has a predetermined award, e.g., a particular jackpot, or until a randomly selected escrow object has been selected by the player.

In one embodiment, the player must select all of the escrow objects. The player may be provided an opportunity to select all of the escrow objects simultaneously, or may be allowed to select the escrow objects individually.

After the player selects an escrow object, the player is awarded the escrow award associated with the selected escrow object. The escrow award(s) may be awarded right after each escrow object is selected or after all of the escrow objects have been selected.

Returning to FIG. 1A, as discussed above, a second gamine machine 10B may provide the game to a second player. The second gaming machine 10B includes a second display unit 28 and a second controller 50. The second display unit 28 displays the game to the second player. The second controller 50 is coupled to the second display unit 28 and configured to initiate the primary game and to establish an outcome of the primary game on the second gaming machine 10B. The second controller 50 in response to detecting the first trigger condition on the second gaming machine 10B, provides the first feature to the second player. The bonus award controller 4 in response to detecting the second trigger condition on the second gaming machine 10B provides the second feature to the second player.

In one embodiment, all unselected objects in the first feature are aggregated from all of the gaming machines 10 and added to the escrow meter 9. Thus, when the second feature is triggered on one of the gaming machines 10 being played by one of the players, the escrow meter 9, and thus, the escrow objects displayed to the player in the second feature may have originated at any one of the gaming machines 10.

In another embodiment, the escrow meter 9 includes tracks the unselected objects from the first feature from each gaming machine 10 separately in individual sub-meters. When the second feature is triggered at one of the gaming machines 10, the escrow objects in the corresponding sub-meter is displayed to the player of the one of the gaming machines 10.

In one embodiment, the system 2 includes a bonus award display (or escrow display) unit 6 (see above). The escrow meter 9 and/or the play of the second feature may be displayed on the bonus award display unit 6 as well as the display unit 28.

As discussed above, the trigger condition used to initiate the features may be any suitable trigger condition including, but not limited to, mystery triggers and/or a predetermined combination of symbols appearing in an outcome of the primary game and/or any predetermined event during the primary game and/or any external event.

In another aspect of the present invention, the bonus award controller 4 resets the escrow meter 9 after the escrow award associated with the selected one or more objects has been awarded. In one embodiment, the bonus award controller 4 resets the escrow meter 9 to include one of each type of object and with a randomly determined or predetermined award. In another embodiment, the bonus award controller 4, resets the escrow meter 9 to include a randomly determined set of escrow objects.

Figure 4C:
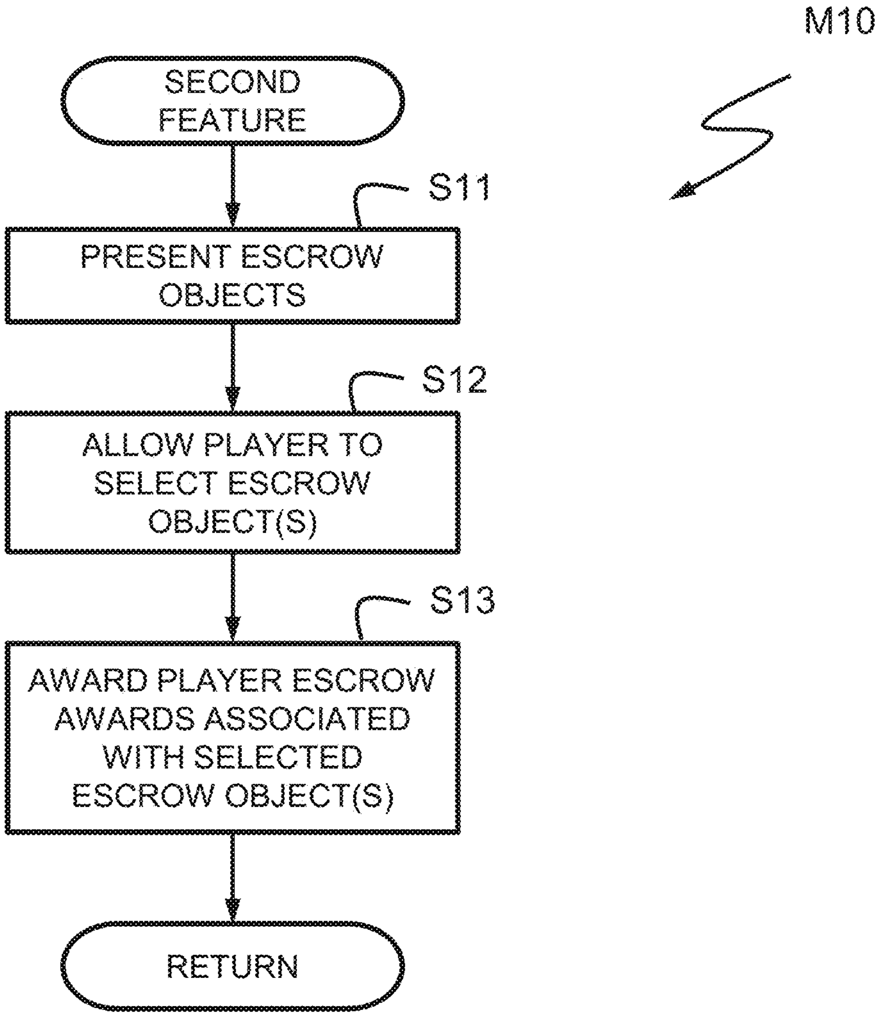

With reference to FIGS. 4A, 4B, and 4C, a method M10 for providing a game to a player using a gaming system 2 will now be discussed. The gaming system 2 includes at least one gaming machine 10. Each gaming machine 10 providing the game to a player. The game includes a primary game, a first feature, and a second feature. The primary game is displayed on the display unit 28 of the gaming machine 10. In a first step S1, the primary game is initiated and an outcome of the primary game is established in a second step S2. In a third step S3, if the first trigger condition is detected, then the method M10 proceeds to a fourth step S4 in which the first feature is provided. If in the third step S3, the first trigger condition has not been detected, then the method M10 provides to a fifth step S5.

In the fifth step S5, if the second trigger condition is detected, then the method M10 proceeds to a sixth step S6. Otherwise, the method M10 ends. In the sixth step S6, the second feature is provided.

With specific reference to FIG. 4B, the method M10 includes a sub-process to provide the first feature. In a seventh step S7, a plurality objects are presented to the player. As discussed above, the objects presented to the player may be randomly selected from a set of possible symbols. Each symbol has an associated award that may be randomly assigned. In an eighth step S8, the player is allowed to select one of the plurality of objects. In a ninth step S9, the player is awarded the award associated with the select one of the objects. The unselected object(s) are added to an escrow meter 9 in a tenth step S10.

With specific reference to FIG. 4C, the method M10 includes a sub-process to provide the second feature. In an eleventh step S11, the escrow objects are presented to the player. Each of the escrow objects has an associated escrow award. The player is allowed to select one (or more) of the escrow objects in a twelfth step S12. In one embodiment, the player may select the escrow objects separately until, e.g., there are no remaining escrow objects, or the player may select all of the escrow objects simultaneously. The player is then awarded the escrow award(s) associated with the escrow objects in a thirteenth step S13.

Next, is a description of a program of the gaming machine 10 for operating one or a plurality of computers as the controller 50. The gaming machine 10 stores the program in the memory, and can execute the program. The gaming machine 10 can access the program stored in the memory and can operate as the gaming machine 10 of the present embodiment by the program.

Further, the program according to the embodiment may be provided through a network or stored in a recording medium. Recording media such as a floppy (registered trademark) disk, CD-ROM, DVD, or ROM and the like, or semiconductor memory and the like are exemplified as a recording medium. In this case, a program stored in the memory uses a reading device inside the gaming machine 10 such as a floppy (registered trademark) disk drive device, CD-ROM drive device, and DVD drive device and the like.

The embodiments of the present invention are described above, but the present invention is not limited to such an embodiment, a variety of variations are possible.

Referring to FIGS. 2A-2C, in one embodiment, the controller 50 includes a plurality of user input devices that may include an acceptor device which accepts media associated with a monetary value to establish a credit balance, a validator configured to identify the physical media, a cash-out button actuatable to cause an initiation of a payout associated with the credit balance. The acceptor device may include a touchscreen display associated with the display unit 28 and/or the player tracking unit 57, the paper money/ticket identification unit 55, the operation unit 36, the player tracking unit 57, a coin slot, a ticket in ticket out (TITO) system, a bill acceptor, and/or any suitable device that enables the gaming machine 10 to receive media associated with a monetary value and establish a credit balance for use in playing the gaming machine. In one embodiment, the acceptor device may be configured to receive physical media such as, for example, a coin, a medal, a ticket, a card, a boll, currency, and/or any suitable physical media that enables the gaming machine 10 to function as described herein. The acceptor device may also be configured to accept virtual media such as, for example, a player tracking account, a virtual credit balance, reward points, gaming credits, bonus points, and/or any suitable virtual media that enables the gaming machine 10 to function as described herein. For example, in one embodiment, the coin slot may include an opening that is configured to receive coins and/or tokens deposited by the player into the gaming machine 10. The controller 50 converts a value of the coins and/or tokens to a corresponding amount of gaming credits that are used by the player to wager on games played on the gaming machine 10. The bill acceptor may include an input and output device that is configured to accept a bill, a ticket, and/or a cash card into the bill acceptor to enable an amount of gaming credits associated with a monetary value of the bills, ticket, and/or cash card to be credited to the gaming machine 10. In one embodiment, the bill acceptor also includes a printer (not shown) that is configured to dispense a printed voucher ticket that includes information indicative of an amount of credits and/or money paid out to the player by the gaming machine 10 during a gaming session. The voucher ticket may be used at other gaming devices, or redeemed for cash, and/or other items as part of a casino cashless system.

In the embodiment, determining the stop position of each reel is described as consecutively acquiring a random number that is used respectively, but the acquisition procedure of the random number is not limited to this. For example, when the game starts, the controller 50 acquires these random numbers in a batch, and each random number may be stored in the storage area of the non-erasing memory 53 or the storage 54 when power failure occurs. In this type of situation, even when a power failure and the like occurs during a game, because the controller 50 acquired the random number from the memory 53 or the storage 54 when the game started before the power failure occurred, when resuming the game after recovering from a power failure, the progress of the game can be reproduced. For example, when a game result obtaining a high payout is formed right before a power failure occurs, the player will be greatly dissatisfied if the progress of the game is not similar after recovering from a power failure. However, as mentioned above when the game starts all of the random numbers are acquired in a batch, and by saving these random numbers in the memory 53 or the storage 54, such great dissatisfaction can be avoided for the player because the progress of a game similar to before a power failure occurred can be reproduced after recovering from a power failure.

In another embodiment, the player may initiate a game through actuation of a spin button (or other button). After initiation of the game, the controller 50 randomly determines the step position of all reels. The controller 50 may perform the check for the trigger condition before the reels stop spinning, and thus has already determined the outcome of the game. However, the controller 50 displays the outcome of the game in a step by step process as discussed above. Further, if the trigger condition has occurred with respect to the columns in the left plurality of columns, the check and evaluation of the interim outcome with respect to the columns in the right plurality of columns should be performed in certain embodiments. For example, if the bonus game is provided that is triggered based on the interim outcome, the interim outcome must be established to perform such an evaluation.

Further, in the embodiment, a bill or ticket is displayed as game value, and received by these bill/ticket identification devices, and a form where a ticket is output by a printer unit is described, but the present invention is not limited to this. The game value is a concept including tangible objects such as a coin, bill, coin, medal, ticket, and the like, or electronic data that has a value equivalent to these. For example, a coin is received by the coin accepter, and there may be a form where a coin is paid by a coin hopper. A player is identified and credit that is accumulated in an account on a server is used, there may be a form where credit is paid to an account, information of credit stored in a storage medium of a magnetic card, IC card and the like is read and used, and there may be a form where credit is paid by writing to the storage medium.

As discussed above, the controller 50 may include the processor 51 and a random-number generator (RNG) which may be implemented on the controller 50 and a memory device 53. The memory device 53 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the CPU 51 to store, retrieve, and/or execute instructions and/or data.

The processor 51 executes various programs, and thereby controls other components of the controller 50 according to player instructions and data accepted by the user input device. The processor 51 executes a game program, and thereby conducts a game in accordance with the embodiments described herein. The memory device 53 stores programs and data used by the processor 51. Moreover, the memory device 53 stores data including, but not limited to, wagers, wager amounts, average wagers per game, a game type, awards, type of awards, triggering conditions, sound effects, game symbol display effects, 3D sound features, image data for producing game images and/or screens on the display device 33, 24, and temporarily stores variables, parameters, and the like that are used by the processor 51. In addition, the memory device 53 stores indicia, symbol weights, symbol values, paytables, and/or winning combination tables which represent relationships between combinations of random numbers and types of awards. In one embodiment, the memory device 53 utilizes RAM to temporarily store programs and data necessary for the progress of the game, and EPROM to store, in advance, programs and data for controlling basic operation of the gaming machine 10, such as the booting operation thereof.

Further, in the embodiment when showing a free game provided as a bonus game, a bonus game that uses a different virtual reel strip from a regular game may be provided. Further, there could be a provided a feature according to a value of the random number acquired during a regular game.

Further, set conditions providing a bonus or feature are not limited to trigger determination or line determination, for example there may be a configuration providing a bonus game when the bet number surpasses a predetermined value. There could be a configuration providing a bonus game according to a value of the random number acquired during a regular game.

Further, in the embodiment, a form providing a free game for a predetermined number of times as a bonus game is shown, and a bonus game that is not limited to a number of times may be provided. In this situation, there could be a configuration providing a bonus game until an end condition is satisfied, as an end condition is a combination of specified symbols, or a determining bonus game based on a random number.

Exemplary embodiments of a gaming device, a gaming system, and a method of providing an award to a player are described above in detail. The gaming device, system, and method are not limited to the specific embodiments described herein, but rather, components of the gaming device and/or system and/or steps of the method may be utilized independently and separately from other components and/or steps described herein. For example, the gaming device may also be used in combination with other gaming systems and methods, and is not limited to practice with only the gaming device as described herein. Rather, an exemplary embodiment can be implemented and utilized in connection with many other gaming system applications. For instance, the present invention is applicable to a gaming system which is a combination of a community gaming system and individual gaming devices. In such a case, the individual gaming device and the community gaming device provide feature cooperatively by providing 1st and 2nd feature display area on the community gaming system and 3rd feature display area on the individual gaming devices et al. and the predetermined symbol is copied from the 1st and 2nd feature display area on the community gaming system to 3rd feature display area on the individual gaming devices and the like.

Figure 16:
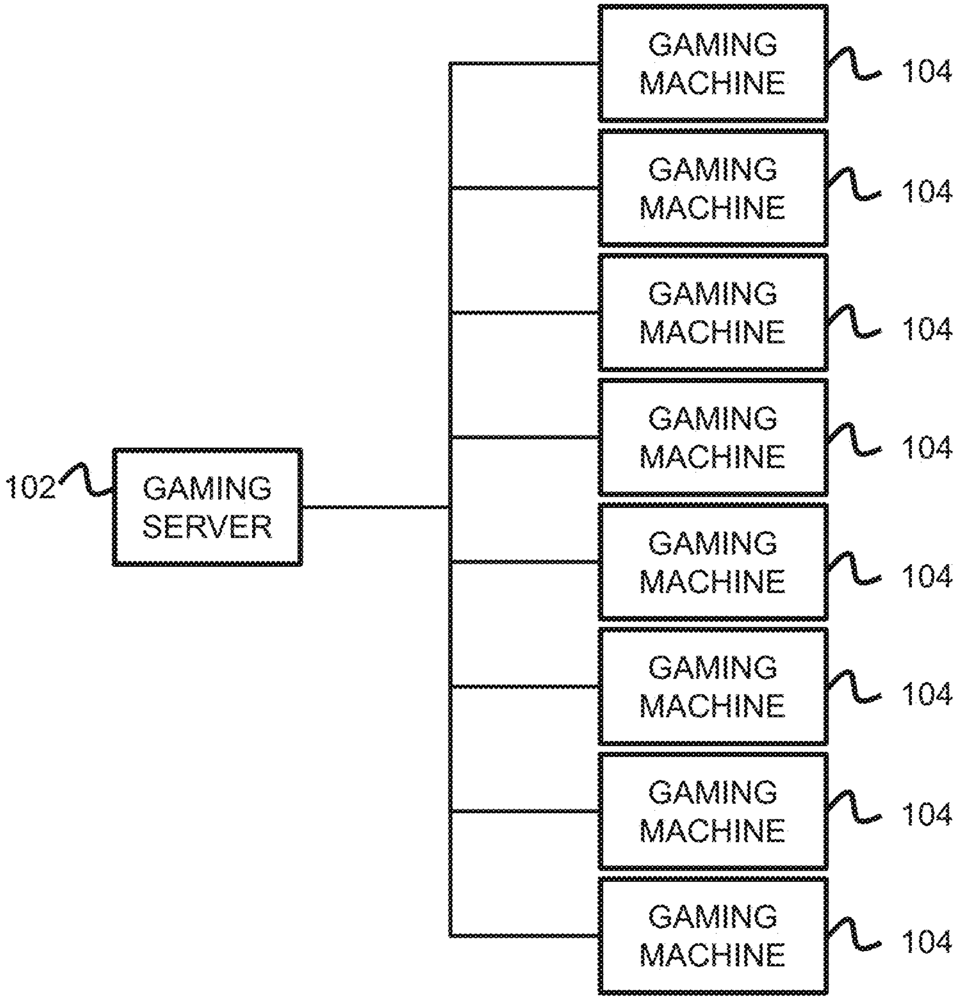
FIG. 16 is a block diagram of a system for providing a game to a plurality of gaming terminals.

In the embodiments discussed above, the primary game and the feature are provided by the controller 50 on the gaming machine 10. The controller 50 includes one or more processors 51 on which a program is run to provide the primary game and the game feature. With reference to FIG. 16, in another embodiment of the present invention, the primary game and the feature may be run, at least in part, on a remote gaming server 100. The gaming server 100 may provide the primary game and the feature to one or more gaming terminals 104. In general, the gaming terminals 104 may have a similar structure and similar componentry as the gaming machine 10. Each gaming terminal 104 may have the same or similar components as shown in FIGS. 2A-2C. The game server 102 may include one or more processors for running a program that provides the primary game and the feature. The outcome of the primary game and the feature may be communicated to each game terminal 104. If a player is playing at one or more of the gaming terminals 102, the gaming server 102 may run a separate/independent instance of the primary game/feature that is associated with each gaming terminal 102. From the player's perspective, operation or play of the primary game and feature via a gaming terminal 102 is the same or indistinguishable from play on a stand-alone gaming machine 10. The player may add funds to the gaming machine 10 or gaming terminal 100 using the bill-ticket identification unit 55 and initiate the primary game via the operation unit 36. However, the game is performed at the gaming server 102 and the outcome(s) generated at the gaming server 102 are communicated to the associated gaming terminal 102. There are several benefits to such a server-based system. First, the requirements of the hardware necessary to display the game and communicate player inputs to the gaming server 102 are less. Thus, the cost of the system overall may be less. Furthermore, since the program running the game resides at the gaming server, if changes or updates to the program are needed, the program only needs to be updated once.

Figure 17:
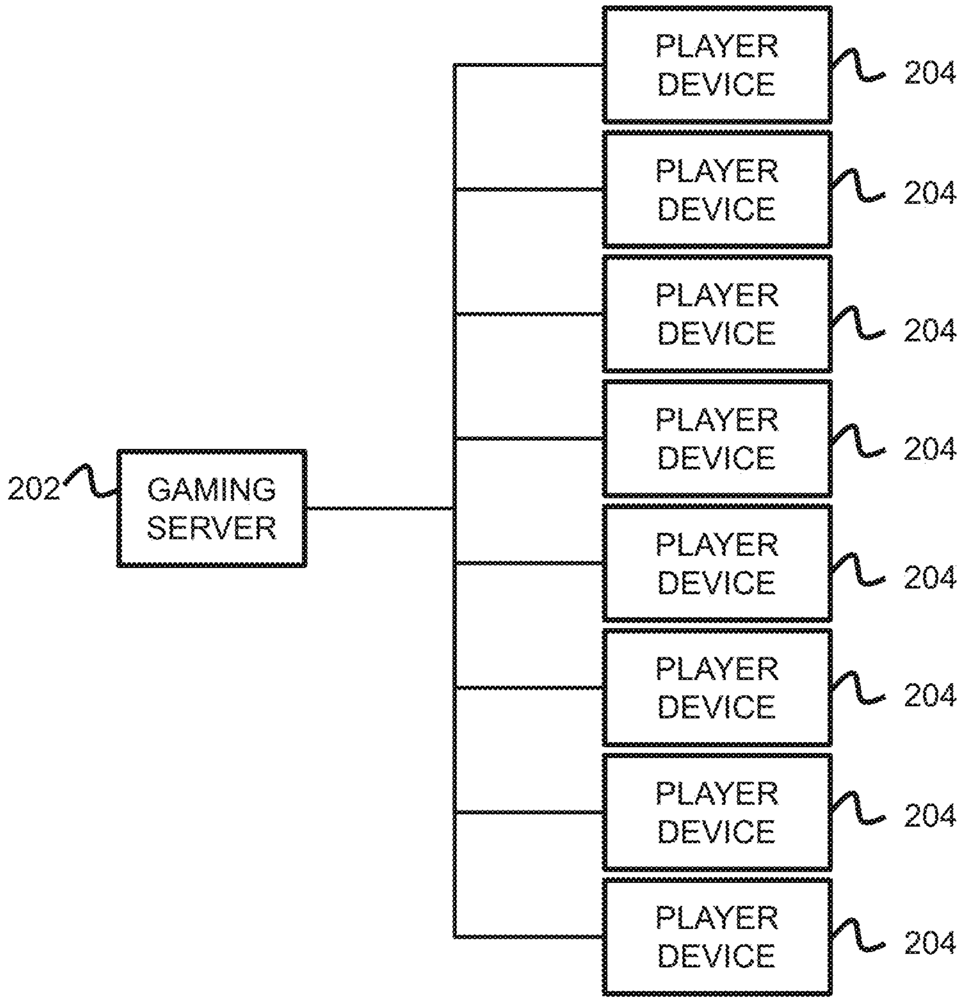
FIG. 17 is a block diagram of a system for providing a game to a plurality of player devices.

With reference to FIG. 17, the primary game and the feature may also be provided via a gaming server 202 to a plurality of player devices 204. For example, the player devices 204 could be personal computers, tablets, mobile devices or mobile phones. The primary game could be played via a computer program application or app running on the player device 204 or accessed via a website running on the world-wide web (WWW). In one embodiment, the primary game and/or feature may be provided by the computer program application or app. The game server 202 is in communication with the player devices 204 to track game play, provide access to a player account (including funds used to make wagers), and to track wagers and wins (awards). In another embodiment, the primary game and game feature may be provided via the gaming server 202. In other words, the game server 202 may run an instance of a program application to provide the primary game/feature for each (active) player device 204. The outcome(s) of the game are communicated to the player device 204, on which the outcome is displayed.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Detailed Embodiment

With reference to FIGS. 5, 6, 7A-7H, 8A-8M, 9A-9H, 10A-10G, 11A-11G, 12A-12I, 13A-13H, 14A-14I, and 15A-15C, an embodiment of the present invention, titled “Smash Festival” or (the SSF game) will now be discussed. The SSF game is a six level linked jackpot game provided to players using a plurality of linked gaming machines 10 and a jackpot controller or bonus award controller 4. As discussed in general above and more specifically below, the jackpot controller 4 implements an escrow meter 9. A center display or bonus award display unit 6 may be provided and may be used to display the escrow meter 9. The current state of the escrow meter 9 may be displayed on central display 6 and, for example, on the upper display 22 of the display unit 28.

The SSF game includes a primary game and provides three separate features: A first feature (the “Bonus Select Event”), A second feature (the “Bonus Award Event”), and A third feature (the “Gold Jackpot”).

Figure 5:
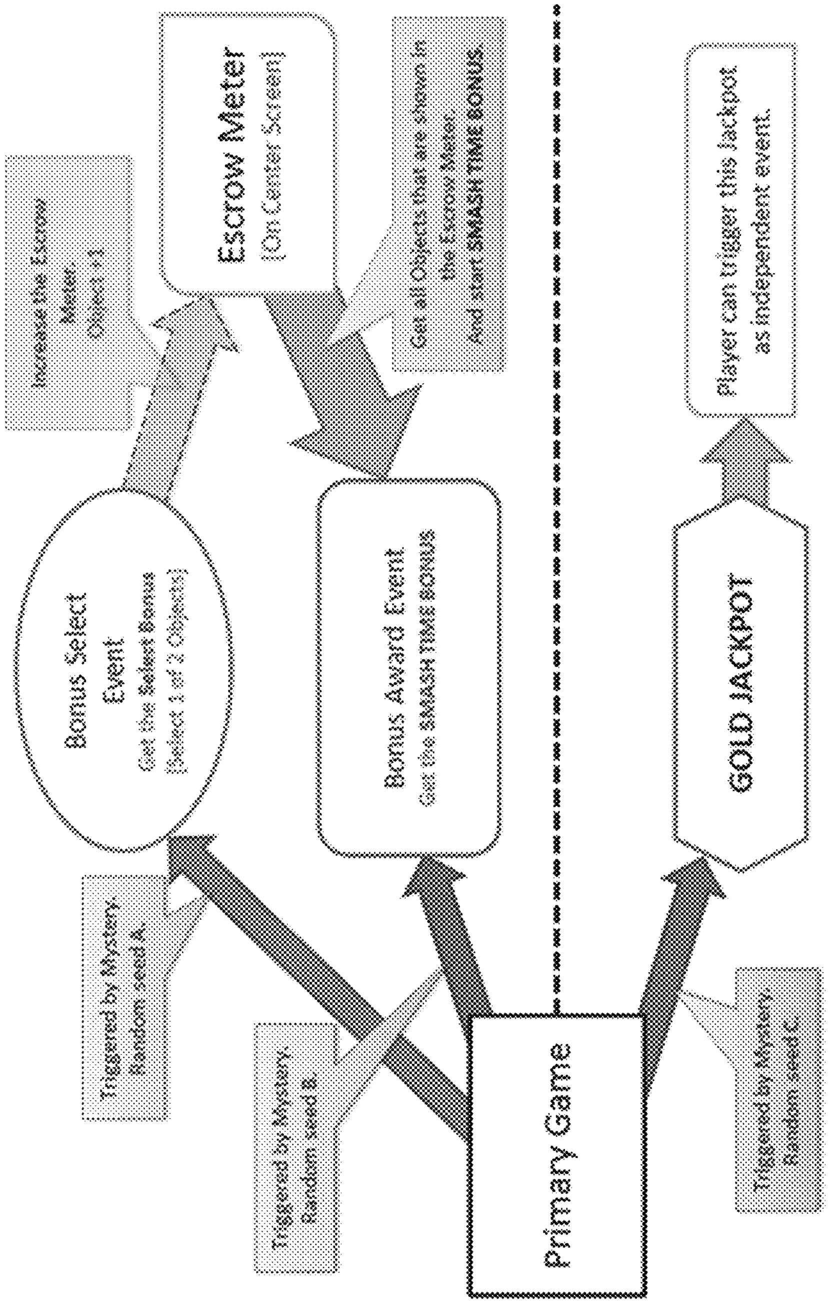
FIG. 5 is a flow diagram of a method for providing a game to a player according to an embodiment of the present invention.

With reference to FIG. 5, the general operation of the Smash Smash Festival game is shown. The primary game is a video slot game. Each of the three features are triggered by a mystery trigger (generated via a separate random number or seed). If the first feature is triggered, the bonus select event is provided. As discussed above, during the first feature or Bonus Select event, the player is presented with two objects and prompted to select one of the presented objects. The player is awarded an award associated with the selected object. The unselected object is added to the escrow meter. If the second feature is triggered, the bonus award event is provided. In the bonus award event, all of the objects in the escrow meter are provided from the escrow meter 9 and the associated escrow awards are awarded to the player. In the third feature is triggered, a Gold jackpot is provided to the player.

As discussed above, during the first and second features, objects represented by symbols are utilized. In the first feature, the player is presented with two randomly selected objects and allowed to select one of the objects. The unselected object is added to the escrow meter 9. As discussed above, in the first feature the objects presented to the player are randomly selected from a set of available objects. In the illustrated embodiment, the set of available objects are represented by symbols depicting different piñatas: a llama, a star, a pig, an owl, and a bull, see FIGS. 7A, 7B, 7C 7D, and 7E, respectively. A decorated bat symbol (see FIG. 7F) may be used in the second feature (see below).

Each of the objects has a randomly assigned award or prize. In the SSF game, the randomly assigned award is selected from a set of available awards. The set of available awards may include awards of a predetermined number of bonus credits and/or jackpot awards. In the illustrated embodiment, the set of available awards includes: a GOLD (or SUPREME) jackpot, a PURPLE jackpot, a RED jackpot, an ORANGE jackpot, a BLUE jackpot and a GREEN (or MINI) jackpot. The set of available awards also include bonus credit awards of 750, 700, 650, 600, 660, 600 450, 400, 350 and 300. Each of the jackpot awards may be progressive awards or may be an award of a set monetary amount.

Figure 7A:
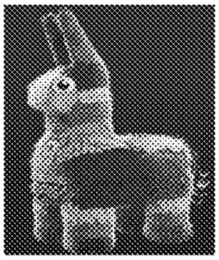
FIGS. 7A-7H are graphics used in the embodiment of the present invention of FIG. 5.
Figure 7B:
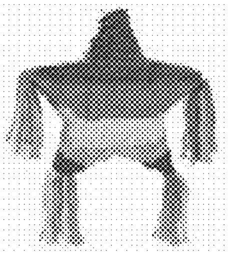
Figure 7C:
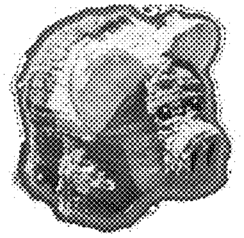
Figure 7D:
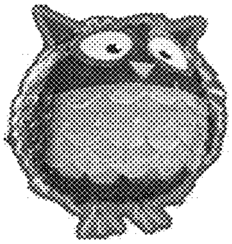
Figure 7E:
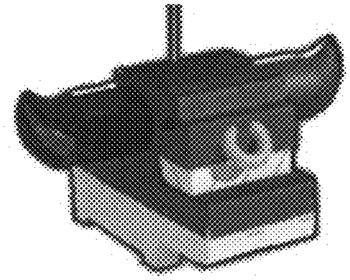
Figure 7F:
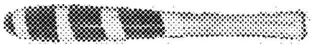
Figure 7G:
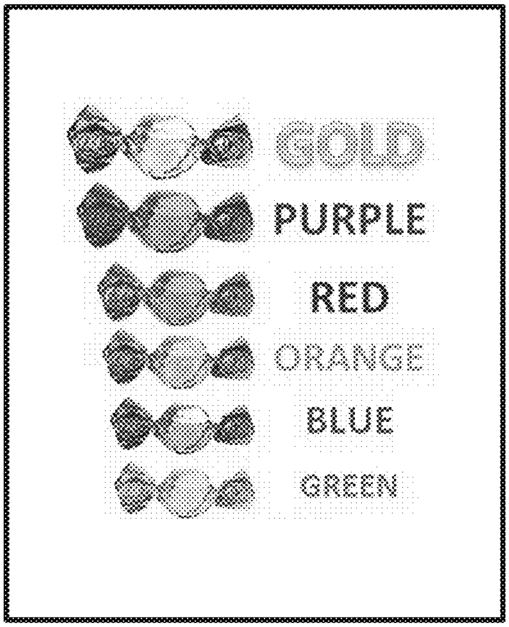
Figure 7H:
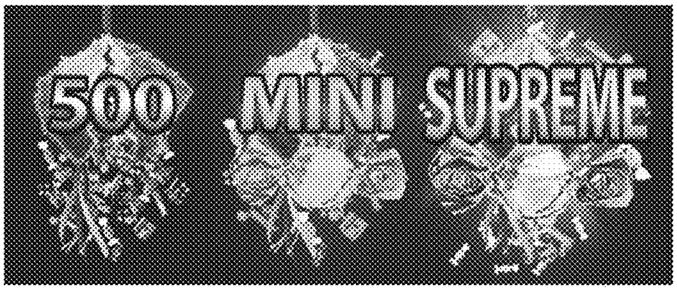

As discussed above, the third feature in the illustrated embodiment results in the direct awarding of the GOLD jackpot to the player. With reference to FIGS. 7G and 7H, each piñata is filled with candy. Each of the jackpots has a specific color. When a piñata is broken open the candies appear. In the illustrated embodiment, the candies of different size appear. If the award associated with the piñata is one of the jackpots, then the candy that appears is of the same color as the jackpot.

Figure 6:
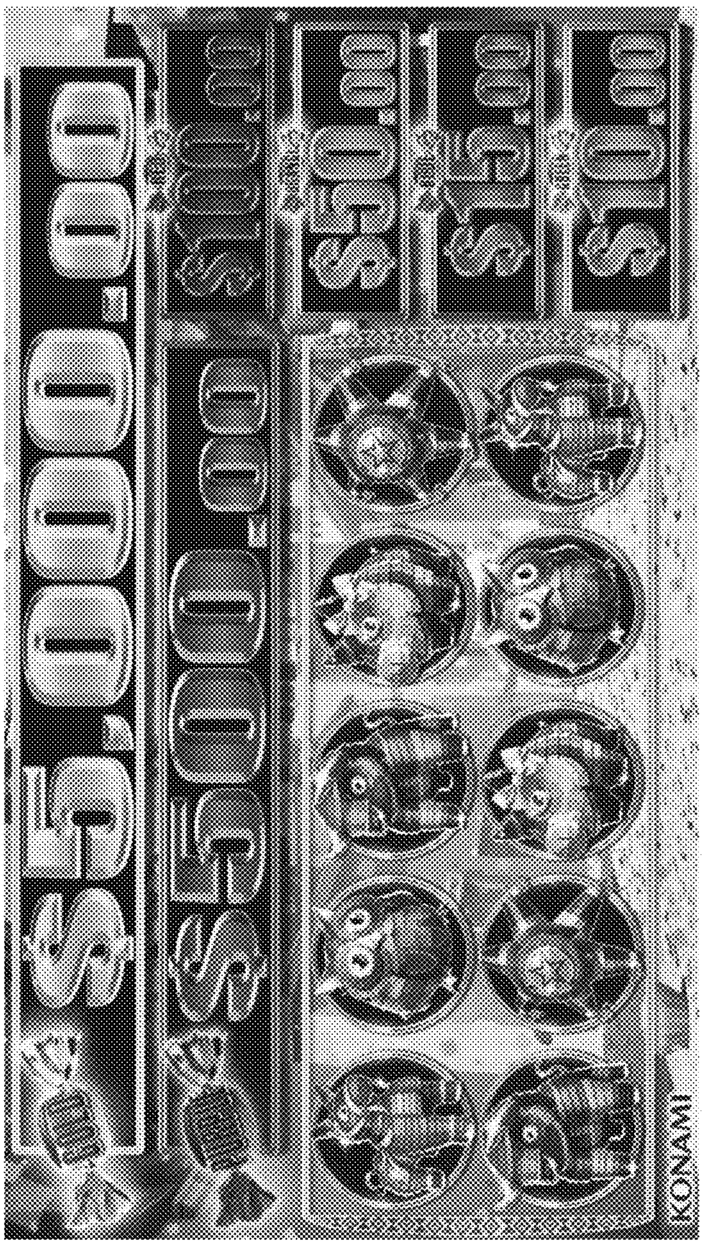
FIG. 6 is an exemplary game screen image according to an embodiment of the present invention.

With reference to FIG. 6 an exemplary screenshot 600 is displayed. The screenshot may be used during the first and second features and may be displayed on the central display 6 and/or the upper display 22 of the display unit 28. In general, the images displayed on the central display 6 and the upper display 22 are the same or similar. It should also be noted that in some gaming systems 2, the central display 6 may not be used or included.

As shown, in the illustrated embodiment the screenshot 600 includes the escrow meter 9 and a listing of the jackpot values ($5,000, $500, $100, $50, $15 and $10, respectively). The escrow meter 9 includes a symbol representing each object currently in the escrow meter 9. In the illustrated embodiment, the escrow meter 9 includes space for ten objects. If the escrow meter 9 includes more than ten objects, then the objects may be combined (see below). As illustrated, in the instance of the escrow meter 9 shown in FIG. 6, the escrow meter 9 includes ten objects: two llamas, two owls, two bulls, two stars, and two pigs. Each object has an associated, but hidden, award.

FIGS. 8A-8M, 9A-9H, 10A-10G, 11A-11G, 12A-12I, 13A-13H, 14A-14I, and 15A-15C include screenshots from different instances of the first, second and third features. Each set of screenshots include an image displayed on the central display 6, the upper display 22 and the lower display 24.

Figure 8B:
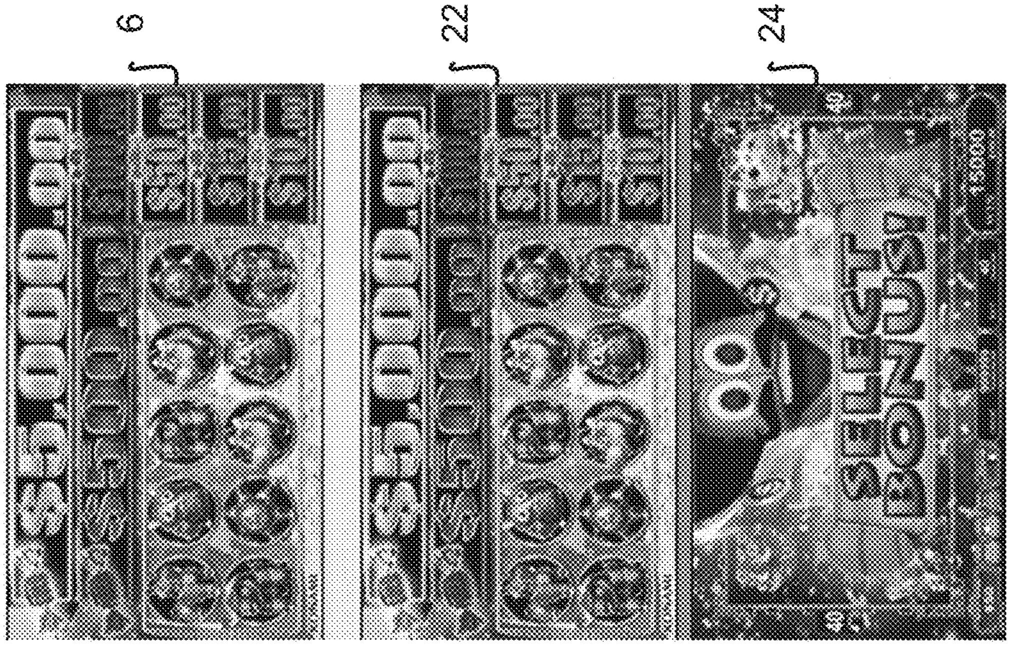
FIGS. 8A-8M are a first set screenshots of a first feature provided by the game of FIG. 5.
Figure 8A:
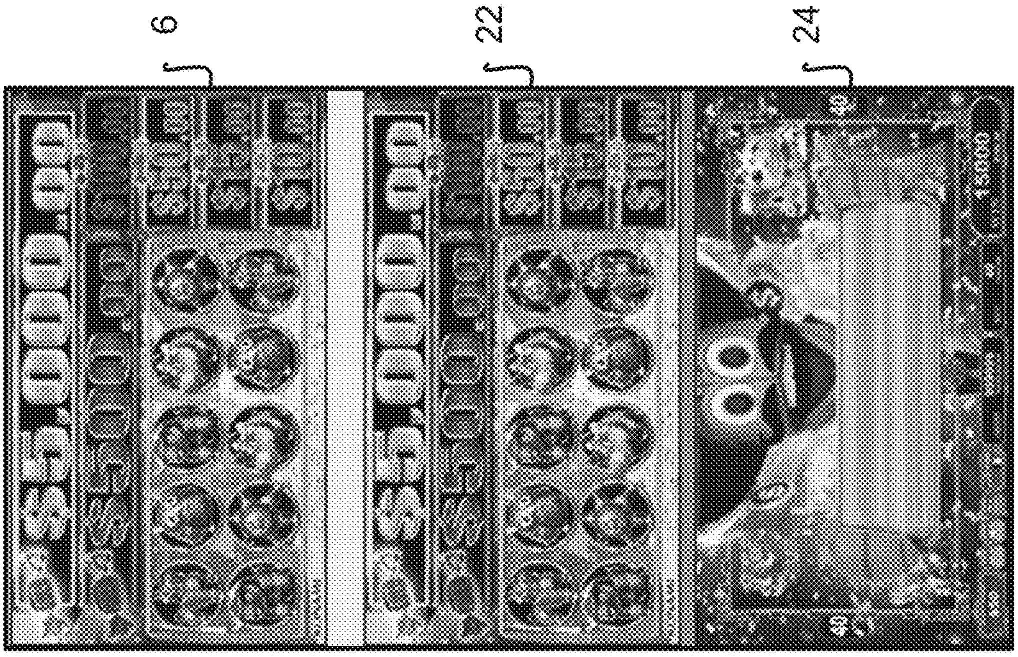
Figure 8D:
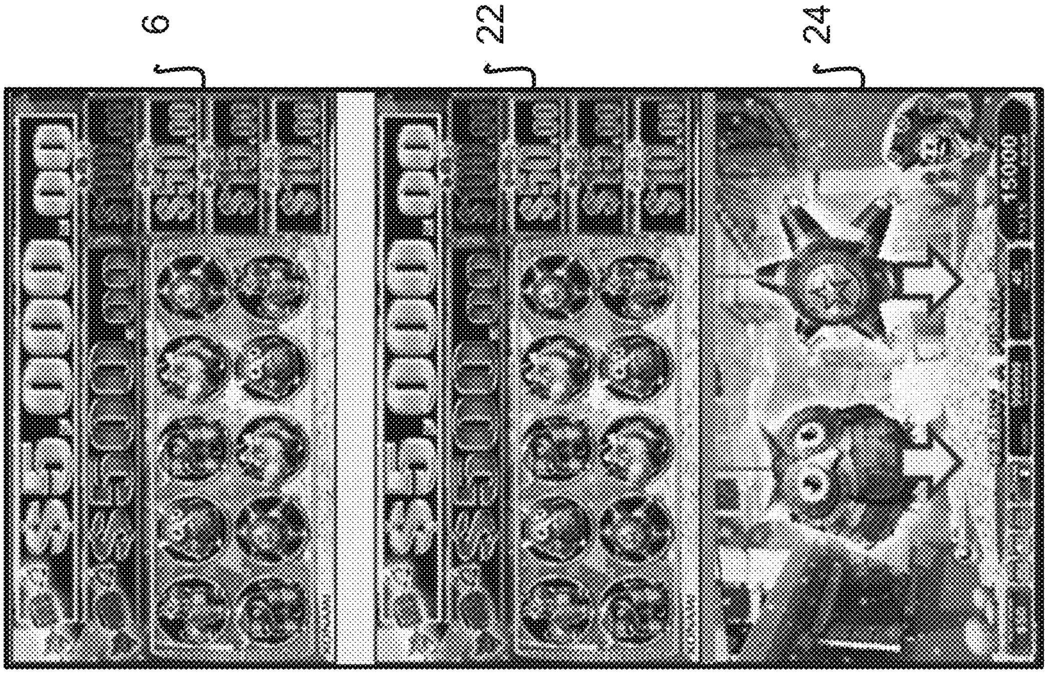
Figure 8C:
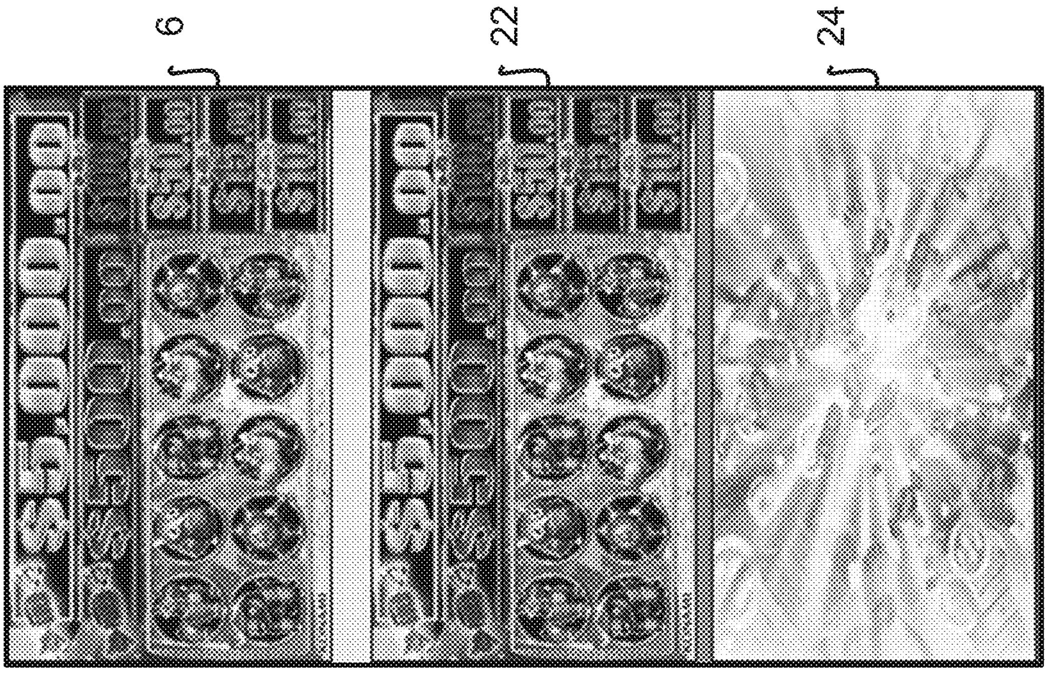
Figure 8F:
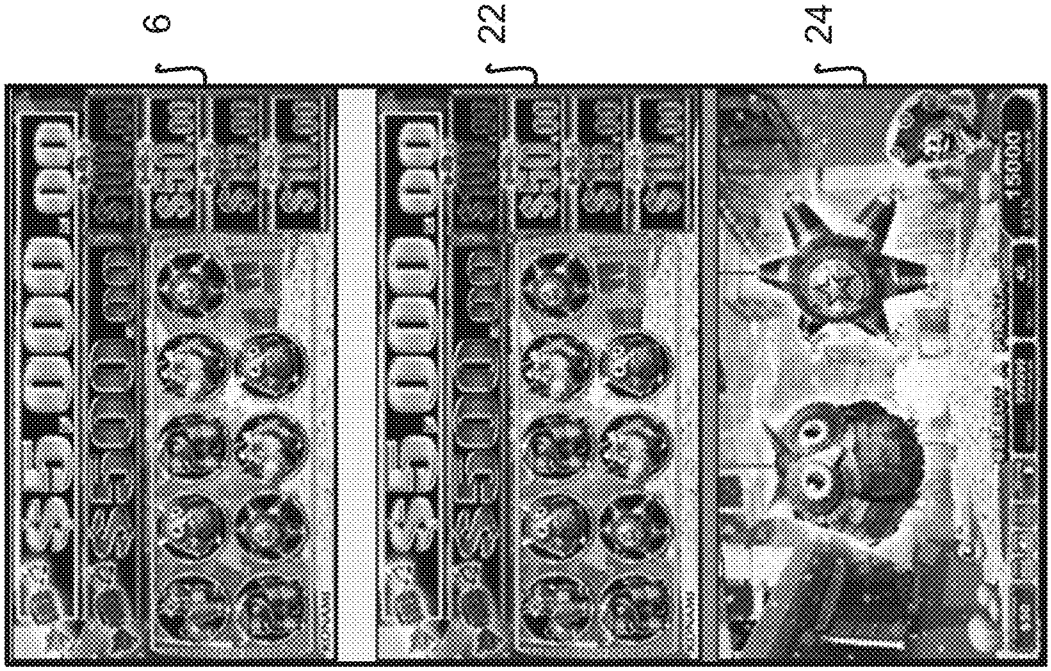
Figure 8E:
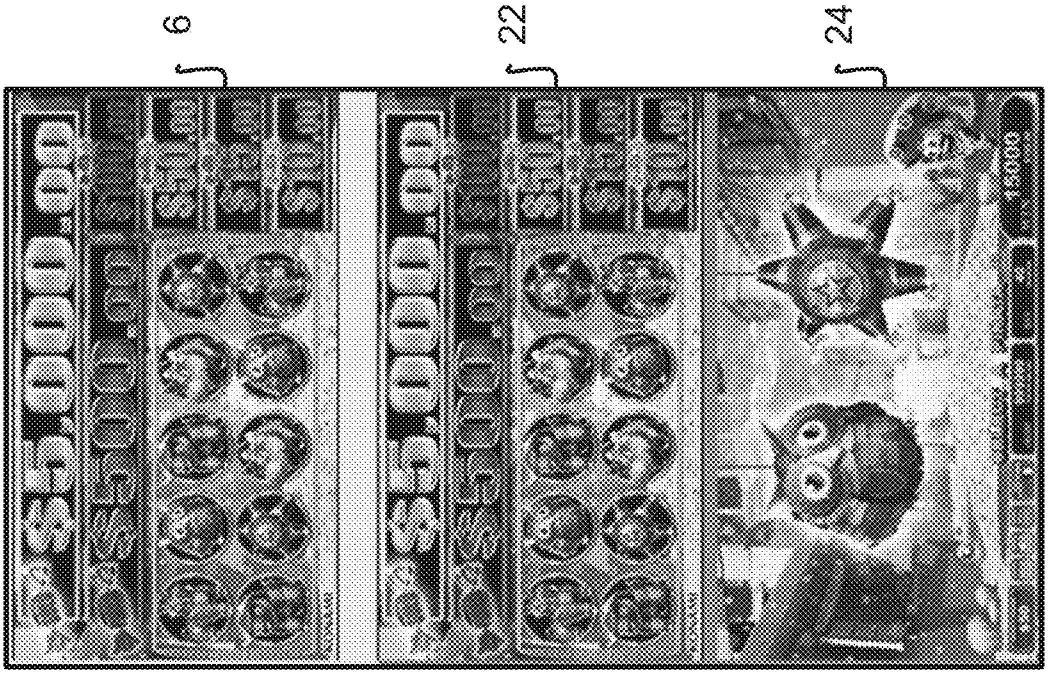
Figure 8H:
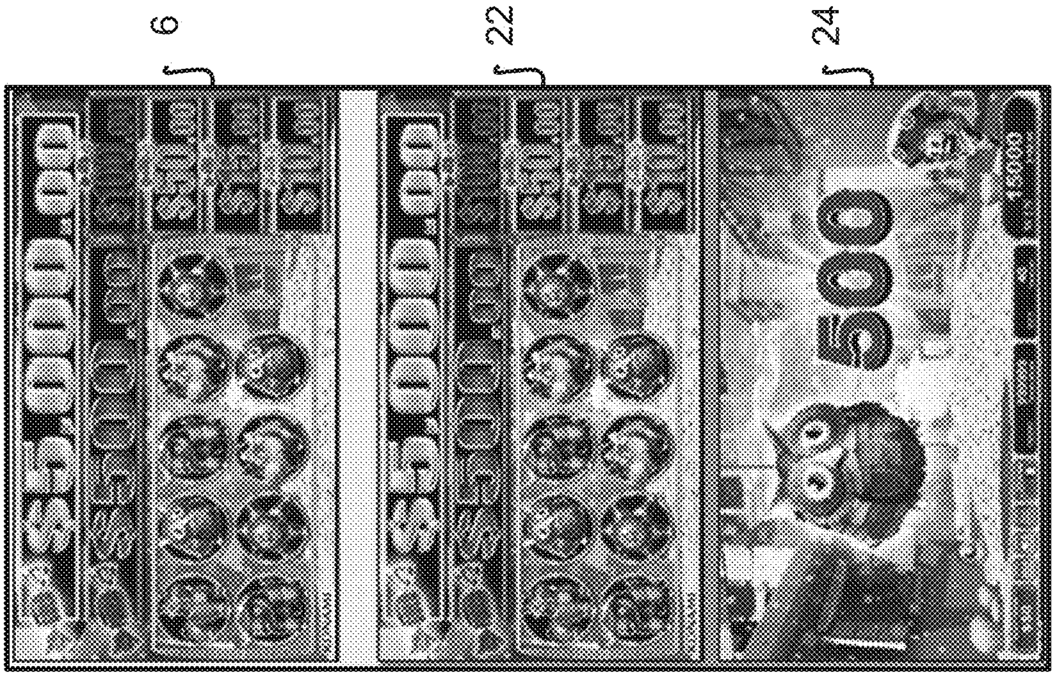
Figure 8G:
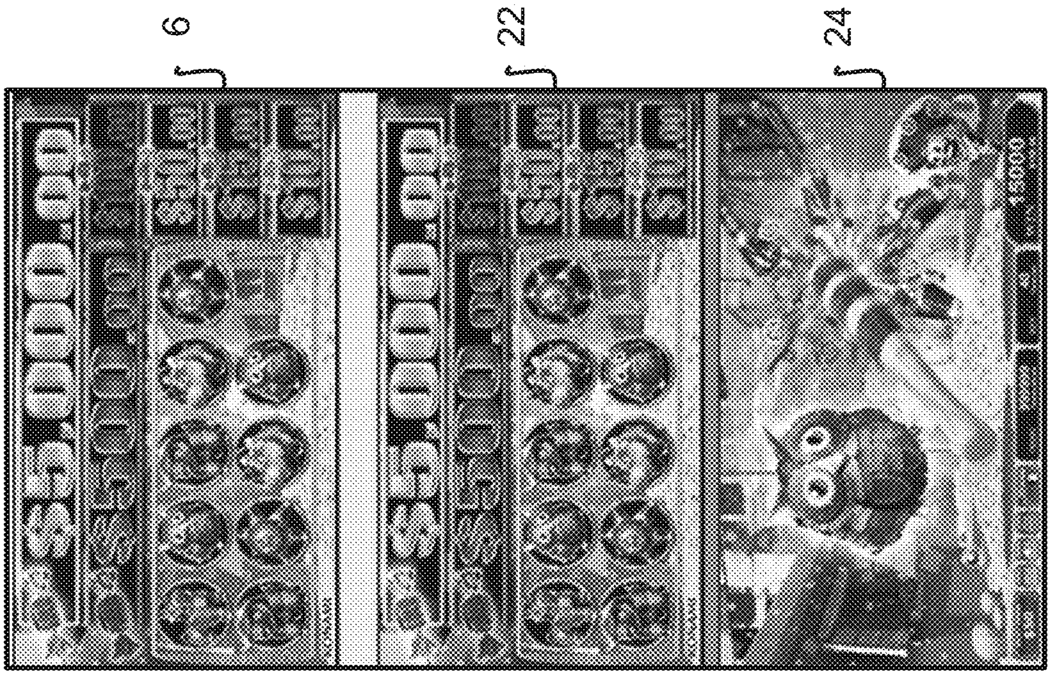
Figure 8J:
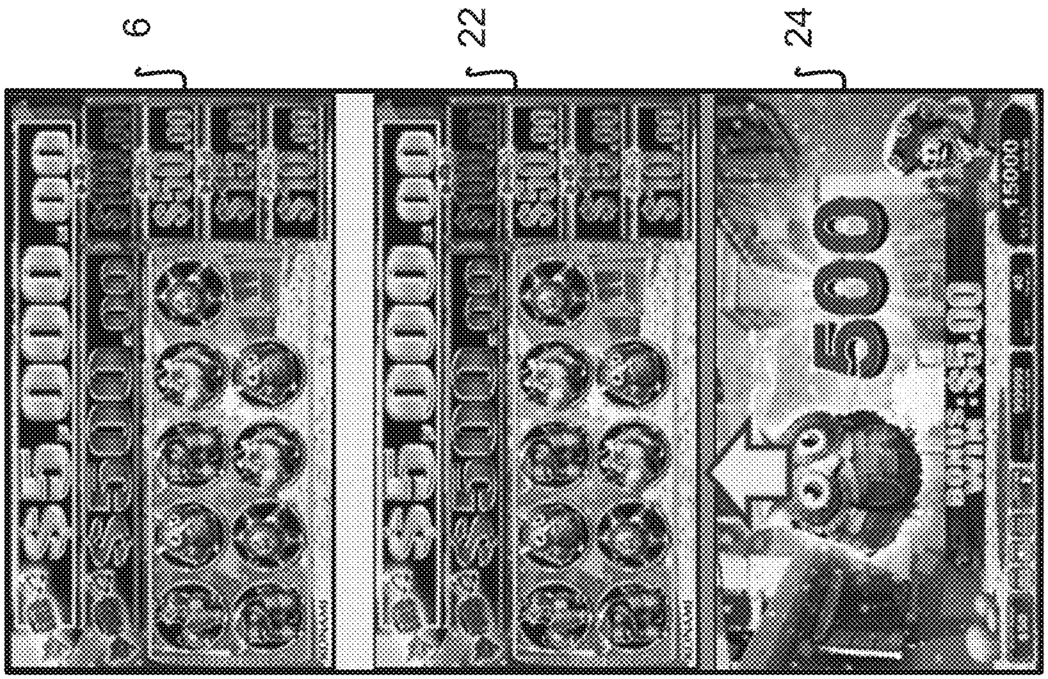
Figure 8I:
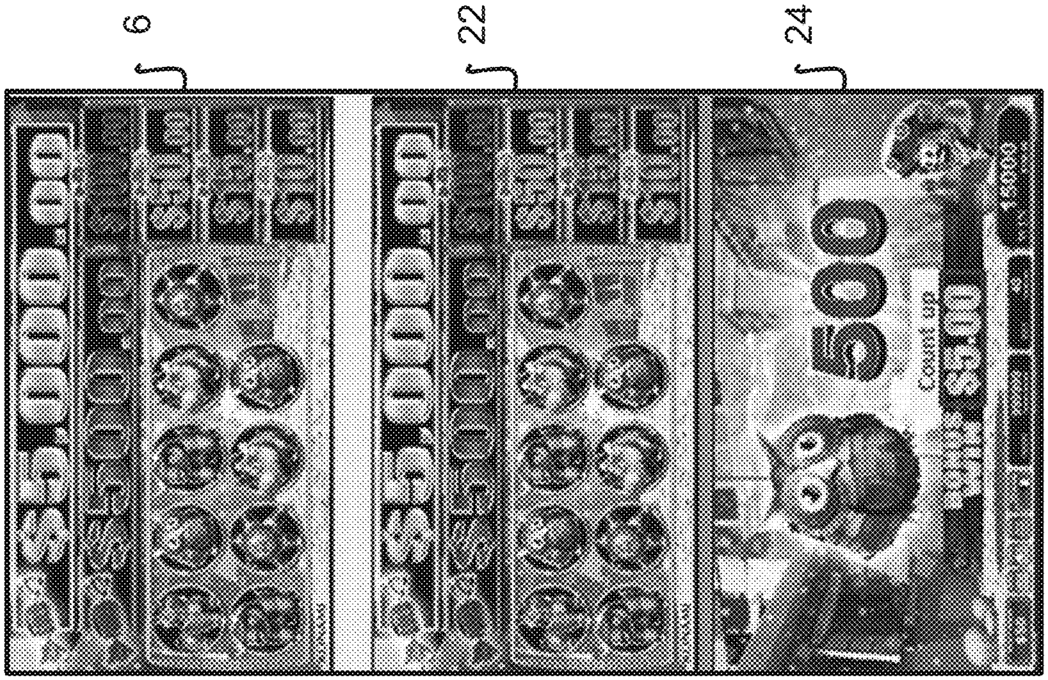
Figure 8L:
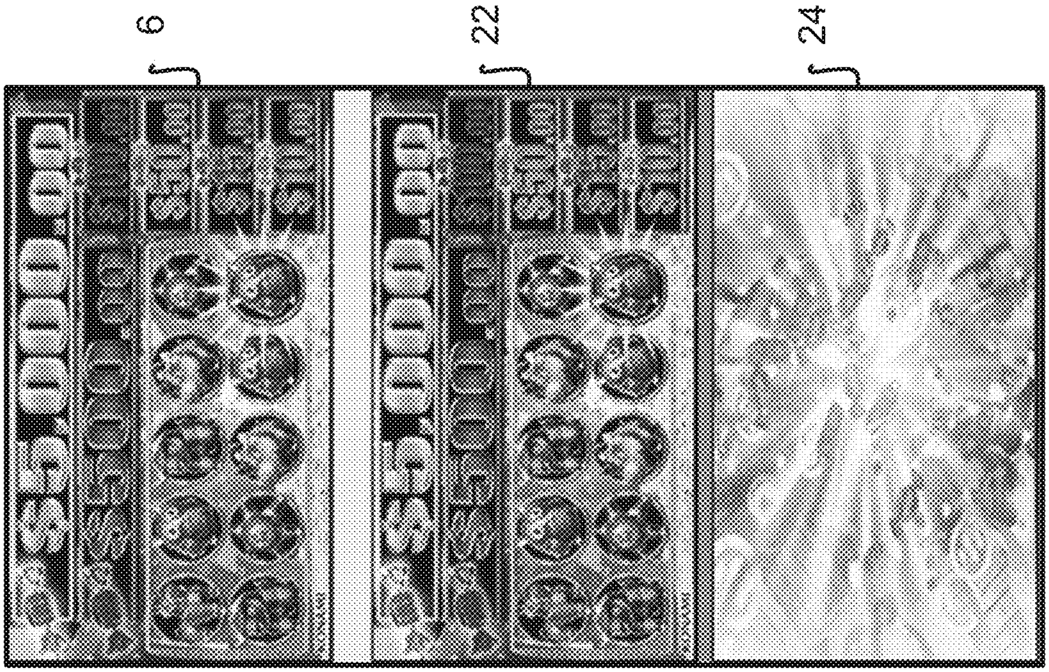
Figure 8K:
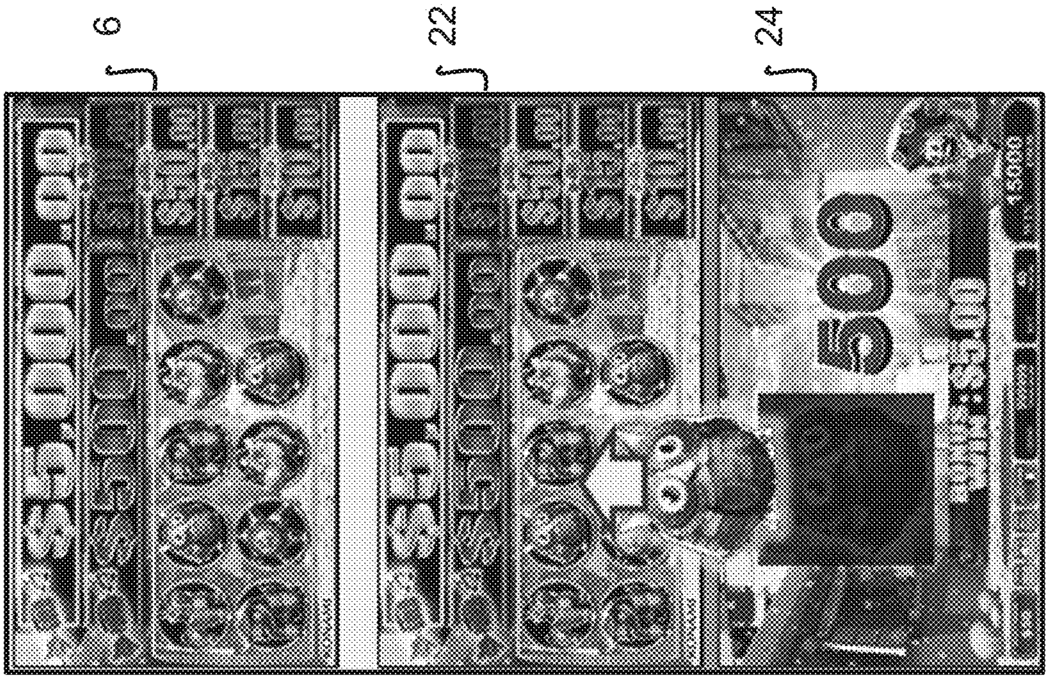
Figure 8M:
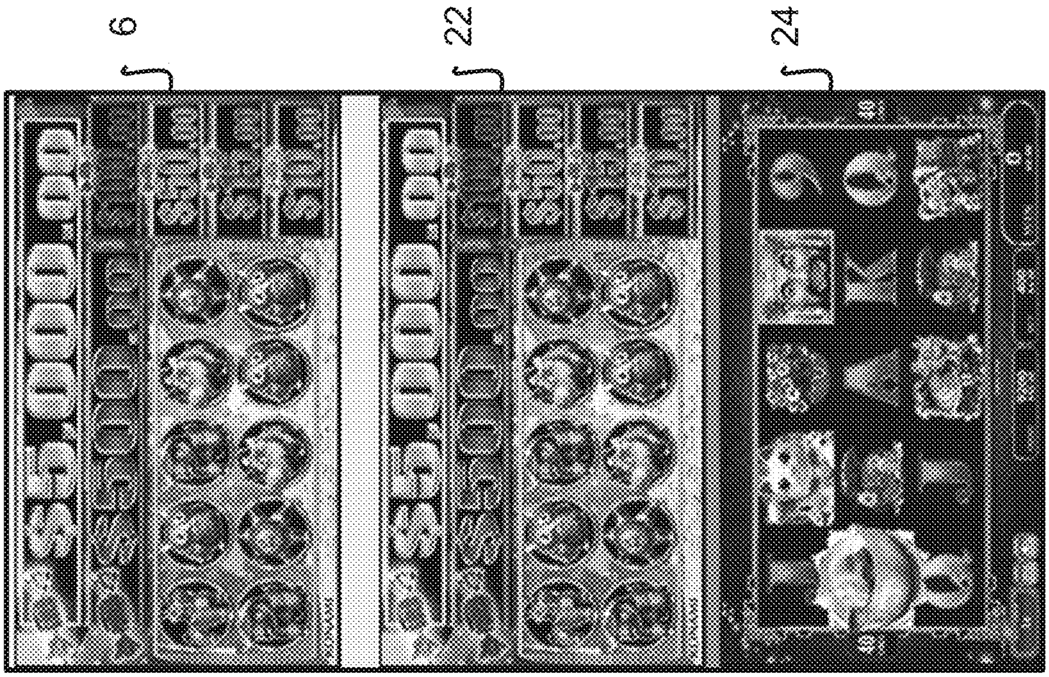

With specific reference to FIGS. 8A-8M, an example of the first feature is shown. Once the first feature has been triggered during the primary game, the primary game is replaced with an animation announcing the first feature, "Select Bonus", is shown in the lower display 24 (see FIGS. 8A-8C). After the announcement animation is shown, two of the objects are randomly selected, in this case an owl piñata and a star piñata are chosen. The two randomly selected piñatas drop down from the escrow meter 9 and are displayed on the lower display 24 (see FIGS. 8D and 8F). The player is then given an opportunity to select one of the objects. It should be noted that in one embodiment if the player does not select one of the objects within a predetermined period of time, one of the objects may be randomly selected on behalf of the player. As shown in FIGS. 8G-8I, once the player selects one of the objects, an animation showing a colored bat striking the selecting piñata and the contents of the piñata spilling out is shown. Then the selected piñata is replaced with a representation or indicia of the award (500 credits in the illustrated instance) associated with the selected object. Afterward, the symbol representing the unselected object (the owl), is shown being added to the escrow meter 9 (see FIGS. 8J-8K). An animation indicating the end of the first feature is then shown on the lower display 24 (see FIG. 8L). In FIG. 8M, the primary game is then displayed on the lower display 24.

Figure 9B:
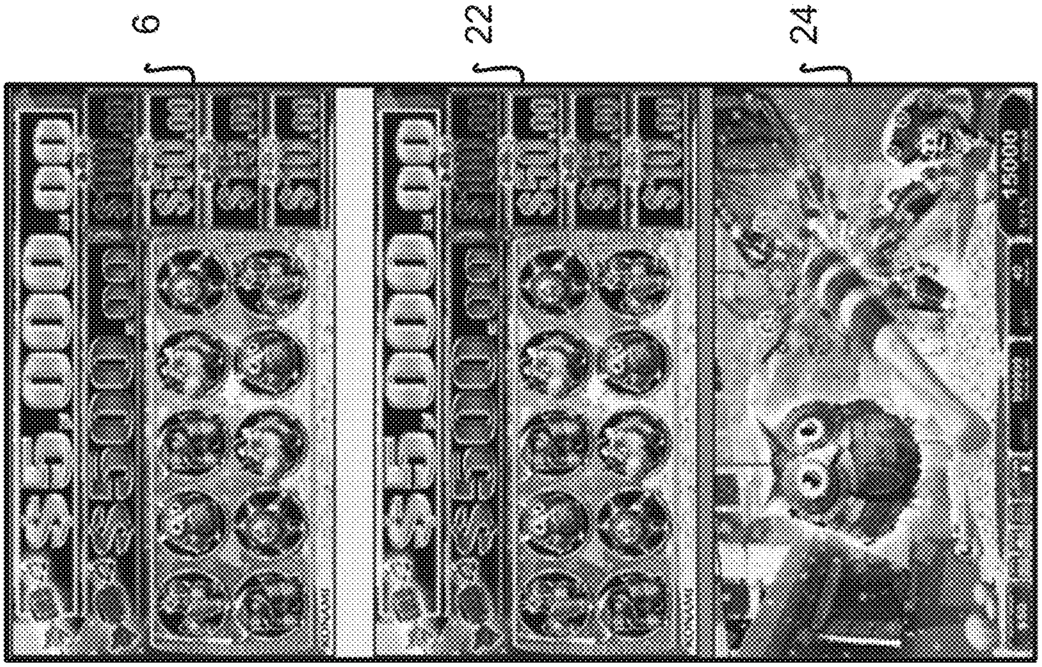
FIGS. 9A-9H are a second set of screenshots of the first feature provided by the game of FIG. 5.
Figure 9A:
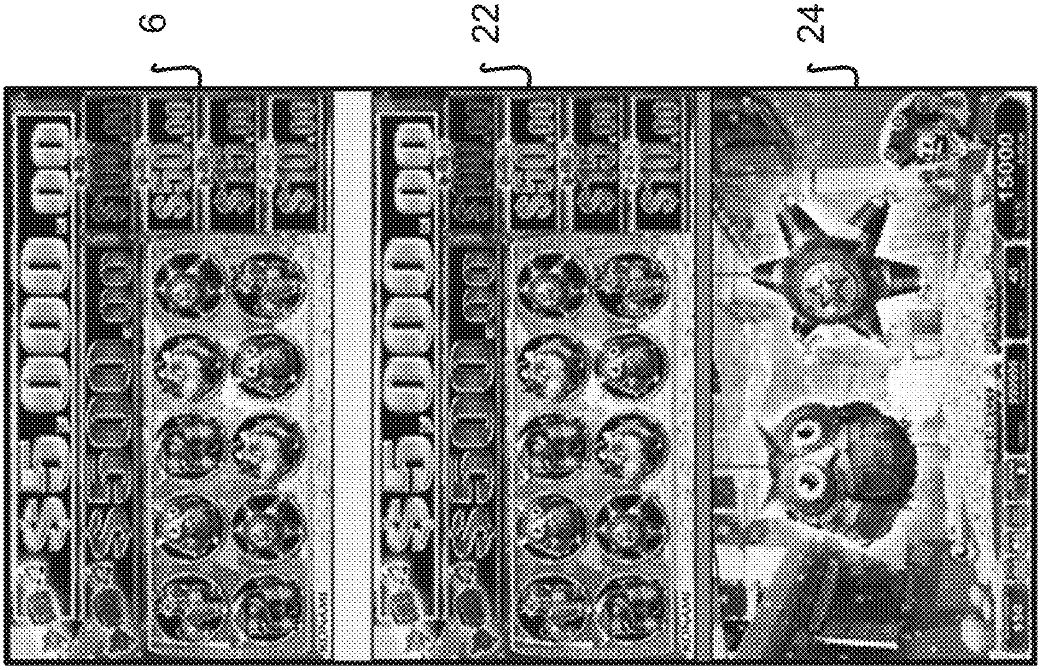
Figure 9D:
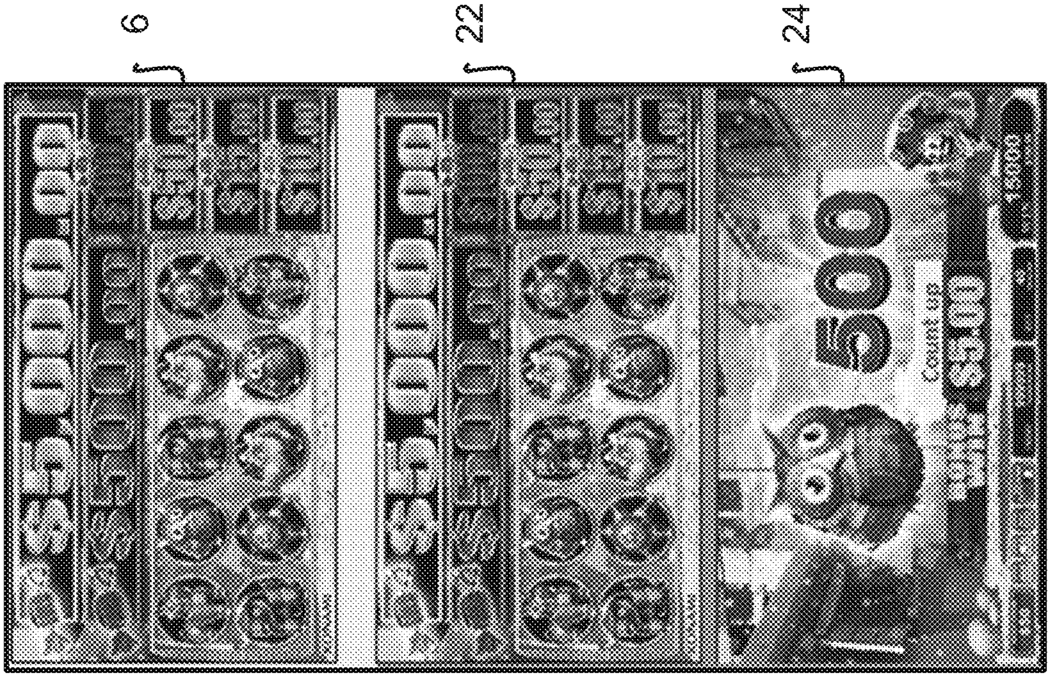
Figure 9C:
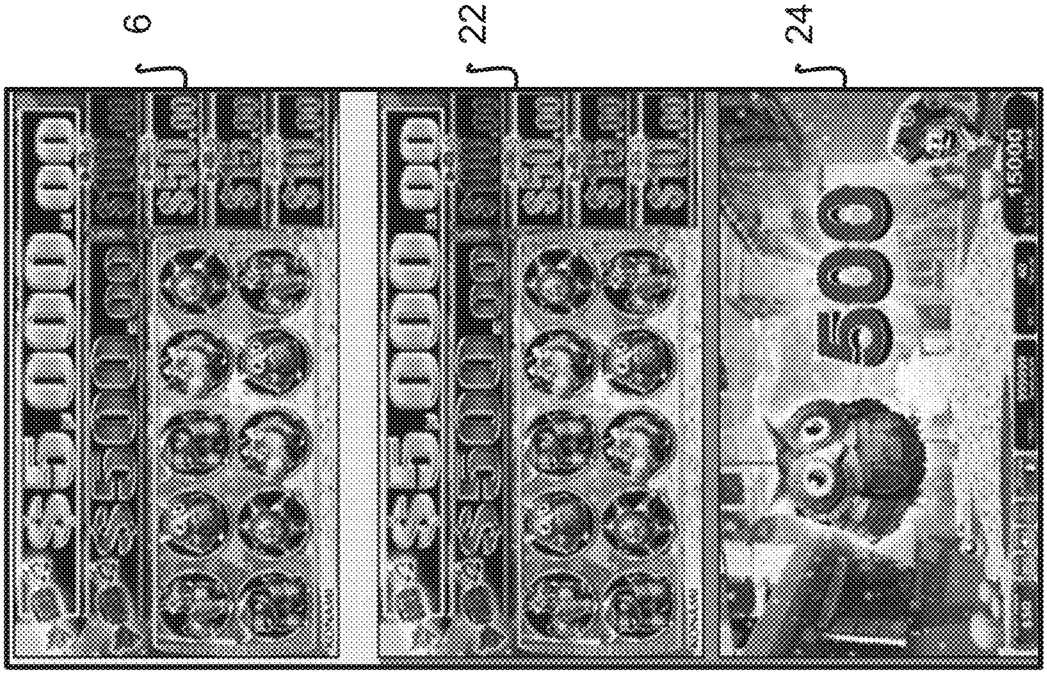
Figure 9F:
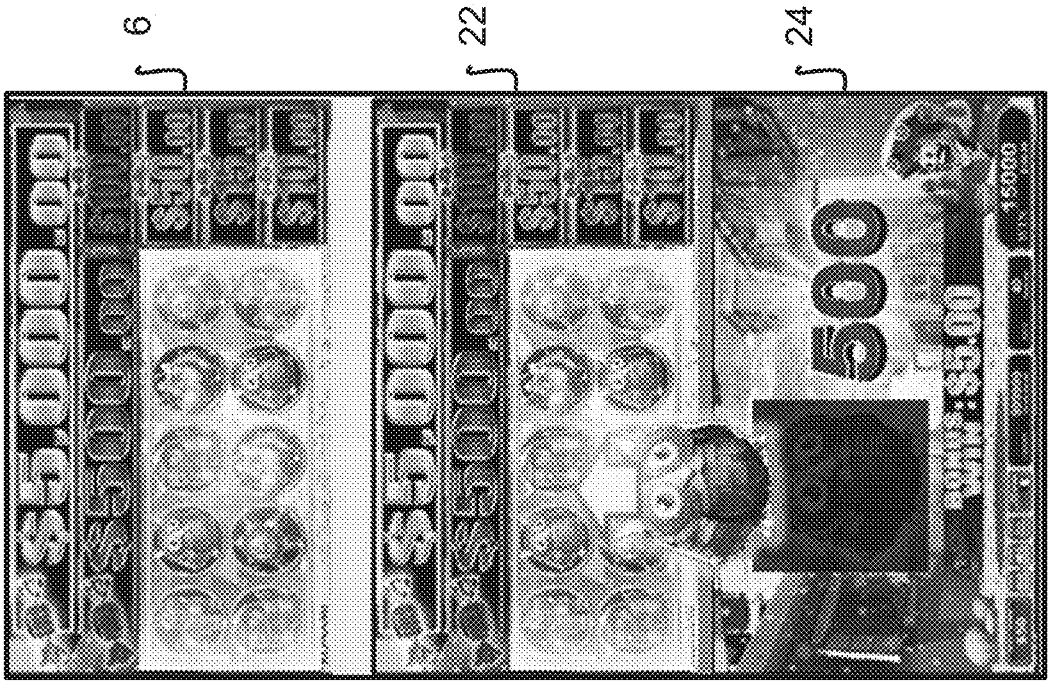
Figure 9E:
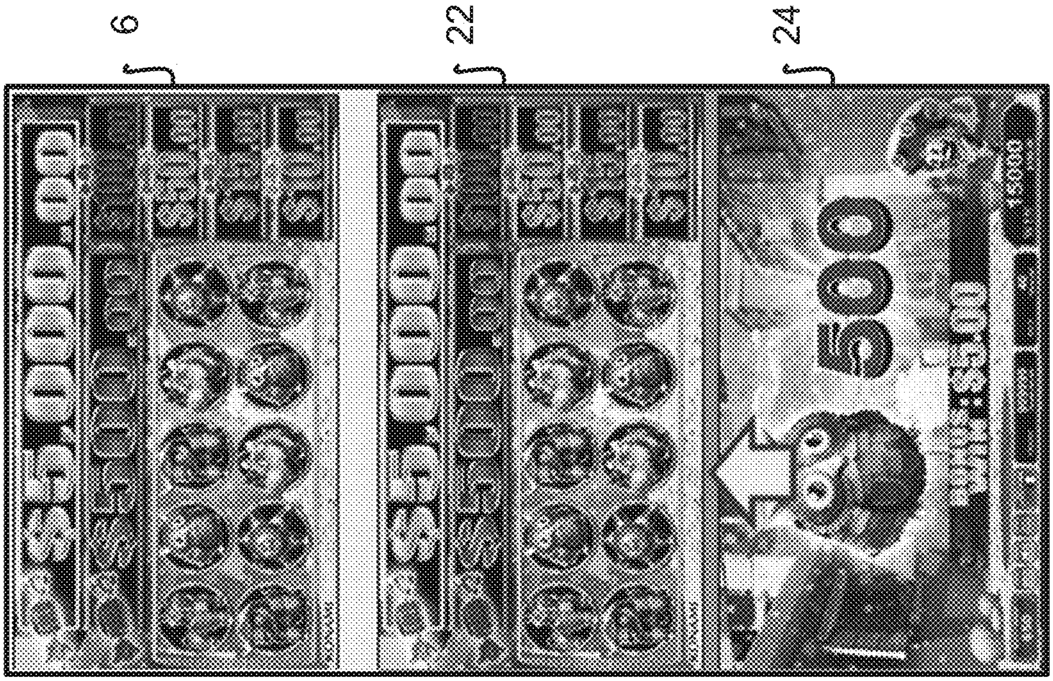
Figure 9H:
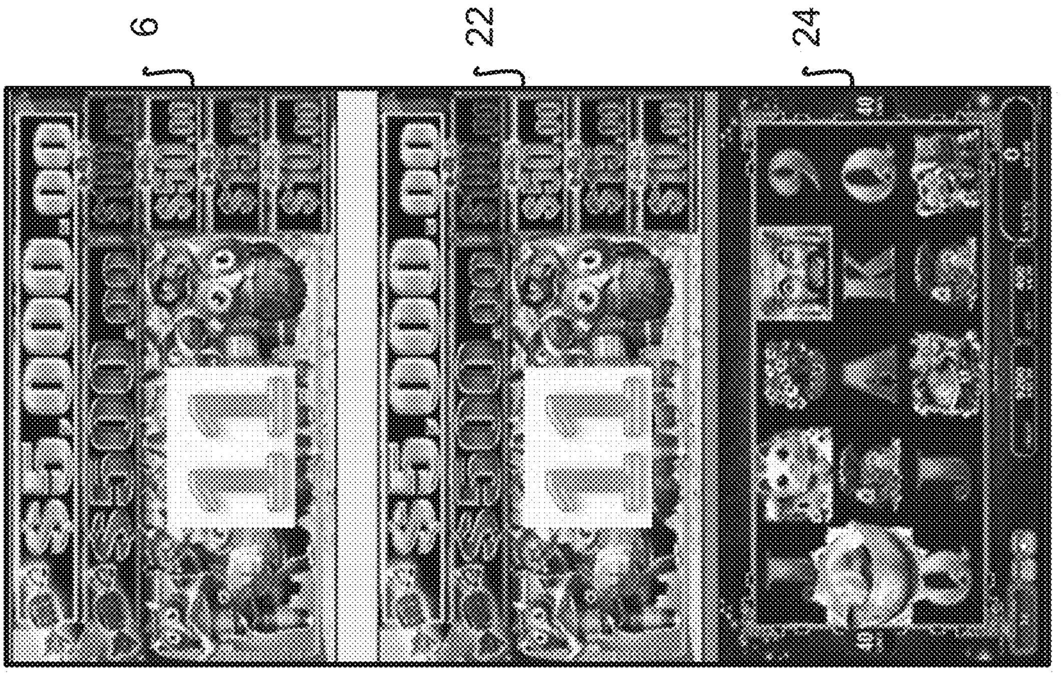
Figure 9G:
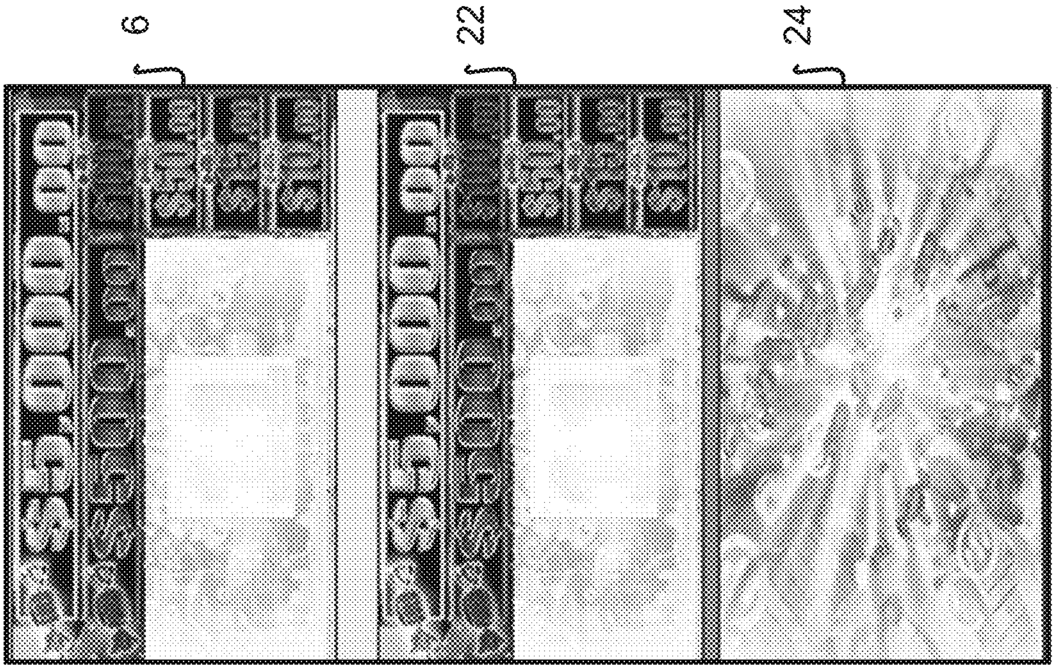

With specific reference to FIGS. 9A-9H, another example of the first feature is shown. In this example, the unselected object is added to the escrow meter 9 bringing the total number of objects in the escrow meter 9 to over ten objects. After the announcement animation is shown (see above), two of the objects are randomly selected, in this case an owl piñata and a star piñata are chosen. The two randomly selected piñatas drop down from the escrow meter 9 and are displayed on the lower display 24 (see FIG. 9A). The player is then given an opportunity to select one of the objects. As shown in FIG. 9B, once the player selects one of the objects, an animation showing a colored bat striking the selecting piñata and the contents of the piñata spilling out is shown. Then the selected piñata is replaced with a representation or indicia of the award (500 credits in the illustrated instance) associated with the selected object (see FIGS. 9C and 9D). Afterward, the symbol representing the unselected object (the owl), is shown being added to the escrow meter 9 (see FIGS. 9E and 9G). However, since the escrow meter 9 now includes more than ten objects, the objects are crowded together and a large indicia indicating the number of objects in the escrow meter 9 is displayed. In the illustrated instance, an "11" is shown indicating that the escrow meter 9 includes eleven objects. An animation indicating the end of the first feature is then shown on the lower display 24 (see FIG. 9G). In FIG. 9H, the primary game is then displayed on the lower display 24.

Figure 10B:
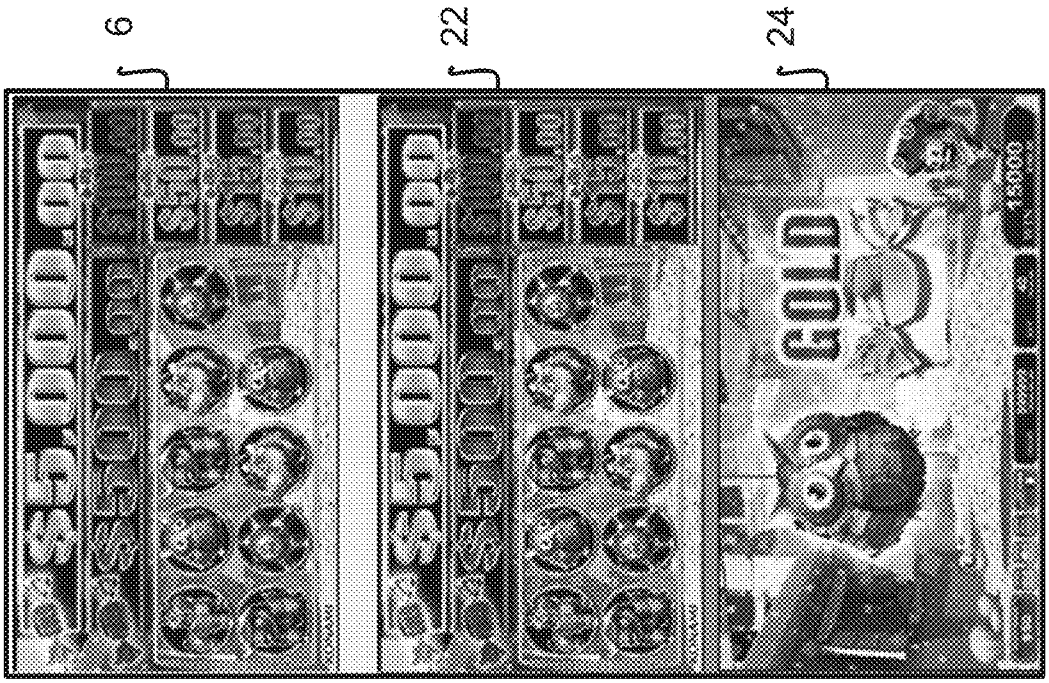
FIGS. 10A-10G are a third set of screenshots of the first feature provided by the game of FIG. 5.
Figure 10A:
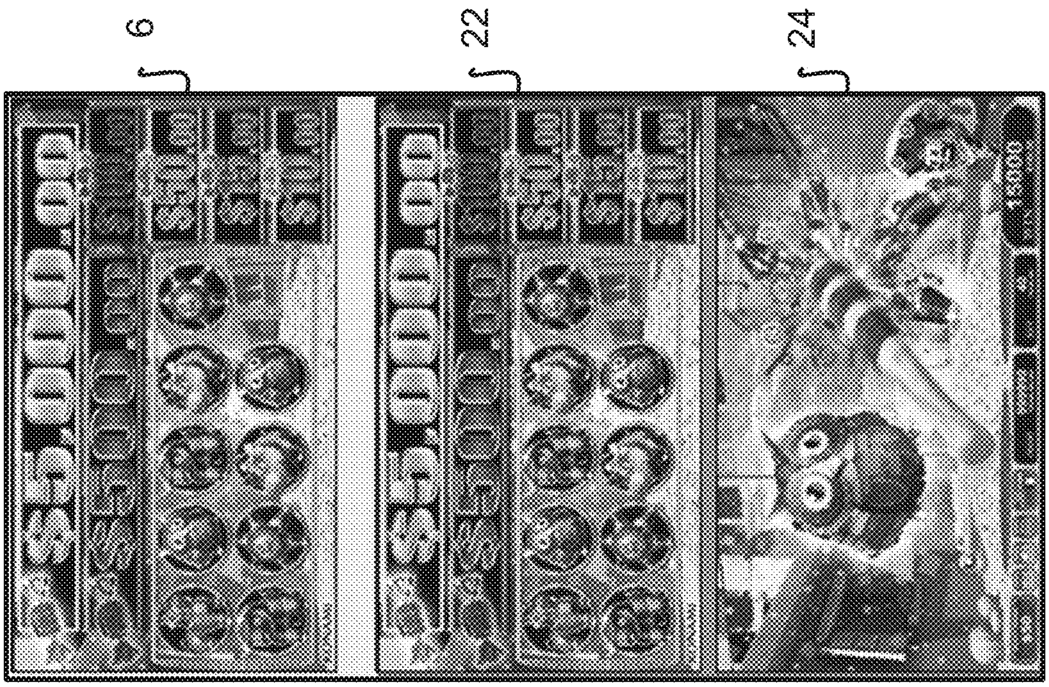
Figure 10D:
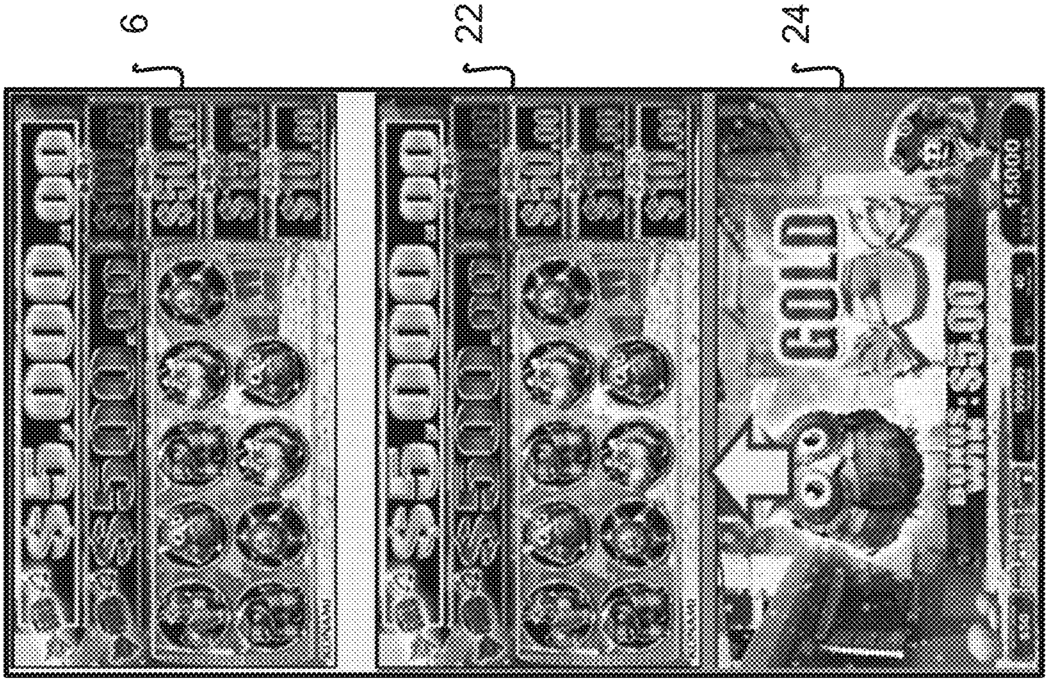
Figure 10C:
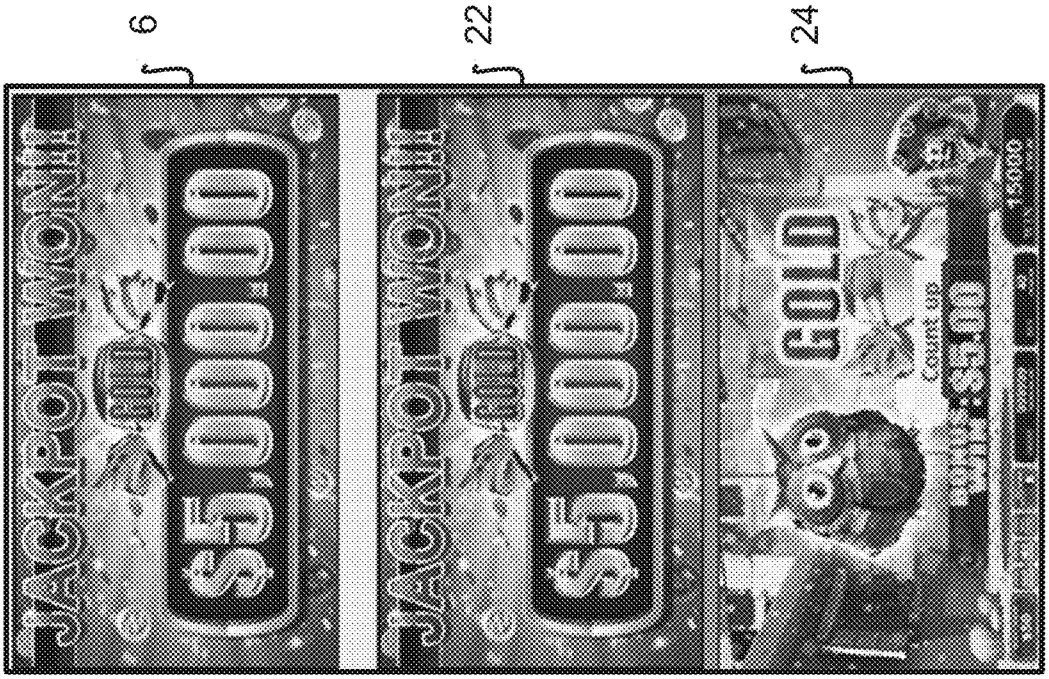
Figure 10F:
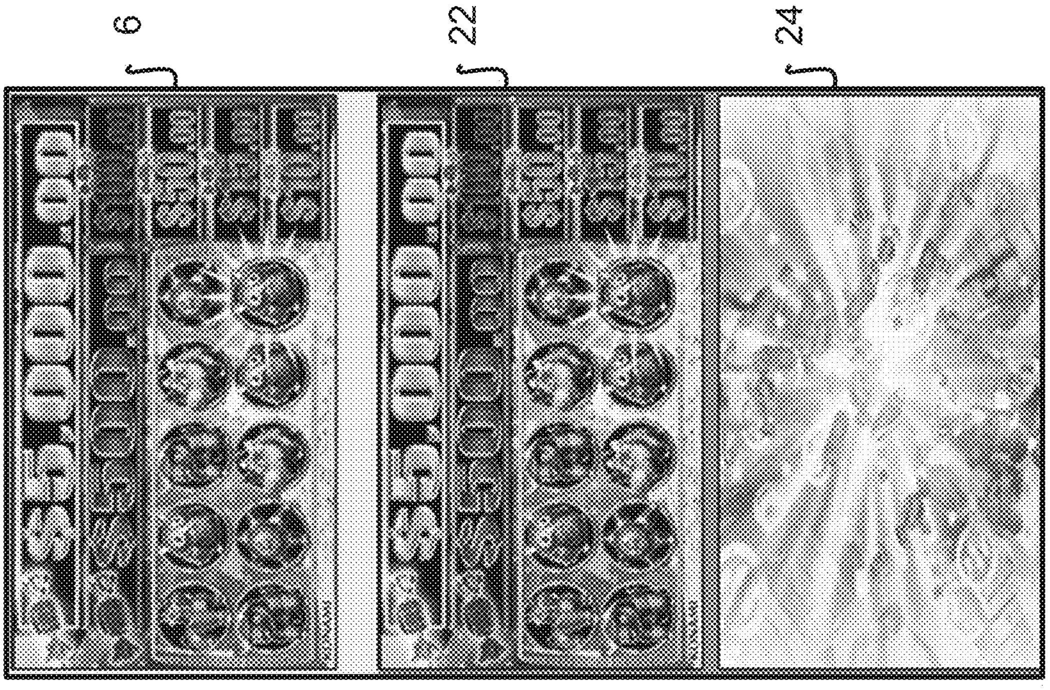
Figure 10E:
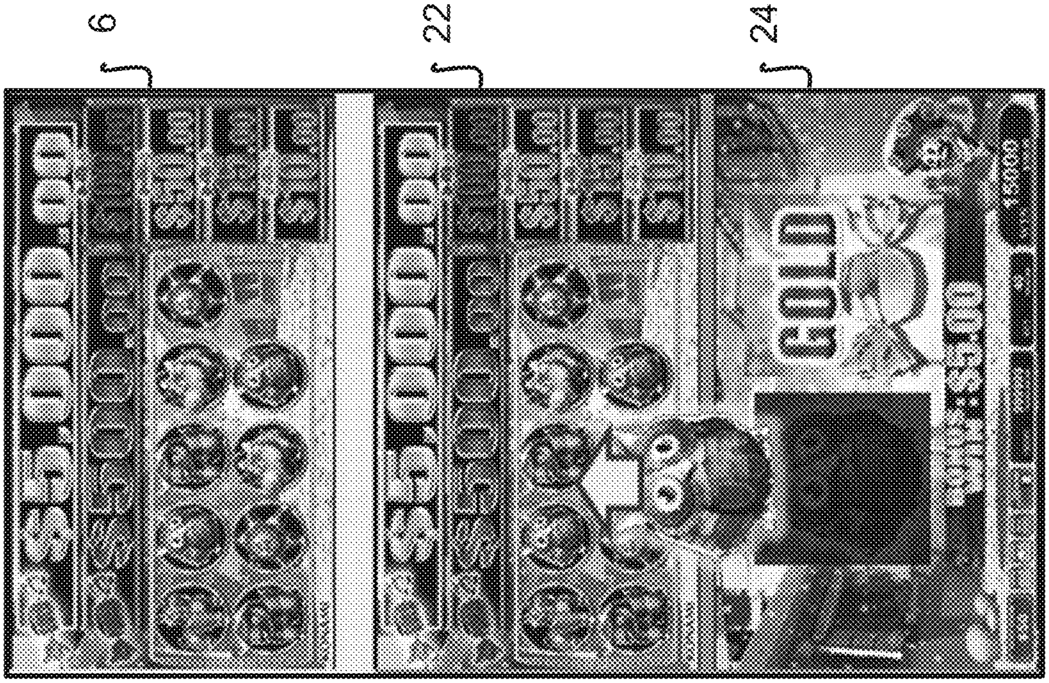
Figure 10G:
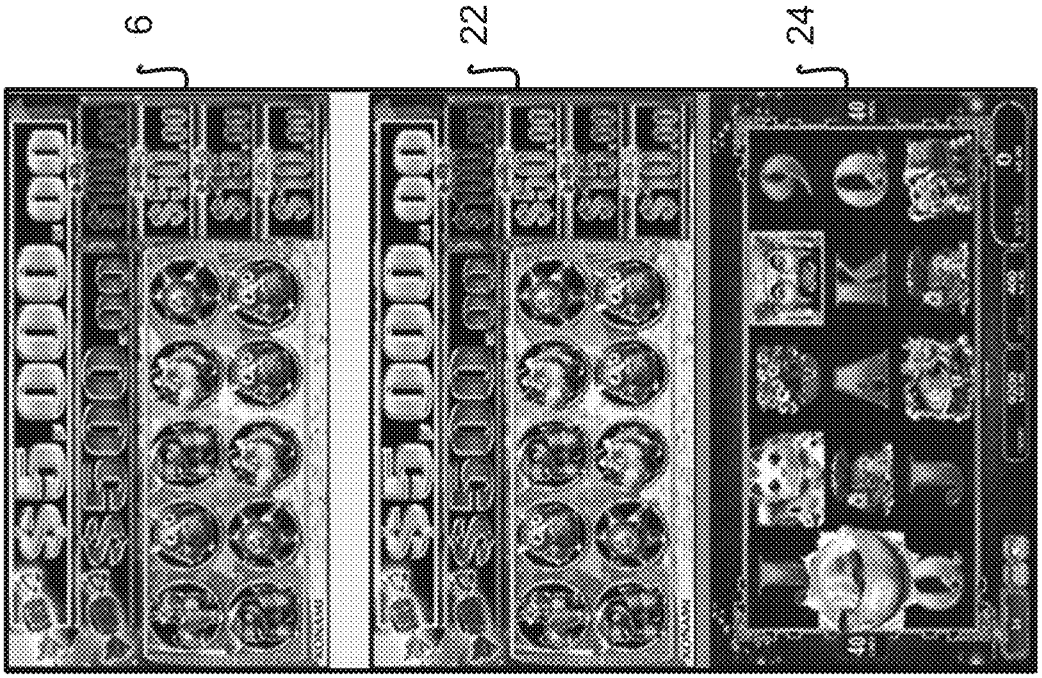

With specific reference to FIGS. 10A-10G, a third example of the first feature is shown. In the third example, the award associated with the selected object is one of the jackpots, i.e., the GOLD jackpot. After the announcement animation is shown, the randomly selected objects are displayed, the player is given an opportunity to select one of the objects and the player has selected one of the presented objects, an animation showing a colored bat striking the selecting piñata and the contents of the piñata spilling out is shown (see FIG. 10A). Then the selected piñata is replaced with a representation or indicia of the award, in this instance, the GOLD jackpot (see FIG. 10B). As shown in FIG. 10C, a screen indicating that the player has won the GOLD jackpot is then displayed on the central display 6 and the upper display 22. Afterward, the symbol representing the unselected object (the owl), is shown being added to the escrow meter 9 (see FIGS. 10D-10E). An animation indicating the end of the first feature is then shown on the lower display 24 (see FIG. 10F). In FIG. 10G, the primary game is then displayed on the lower display 24.

Figure 11B:
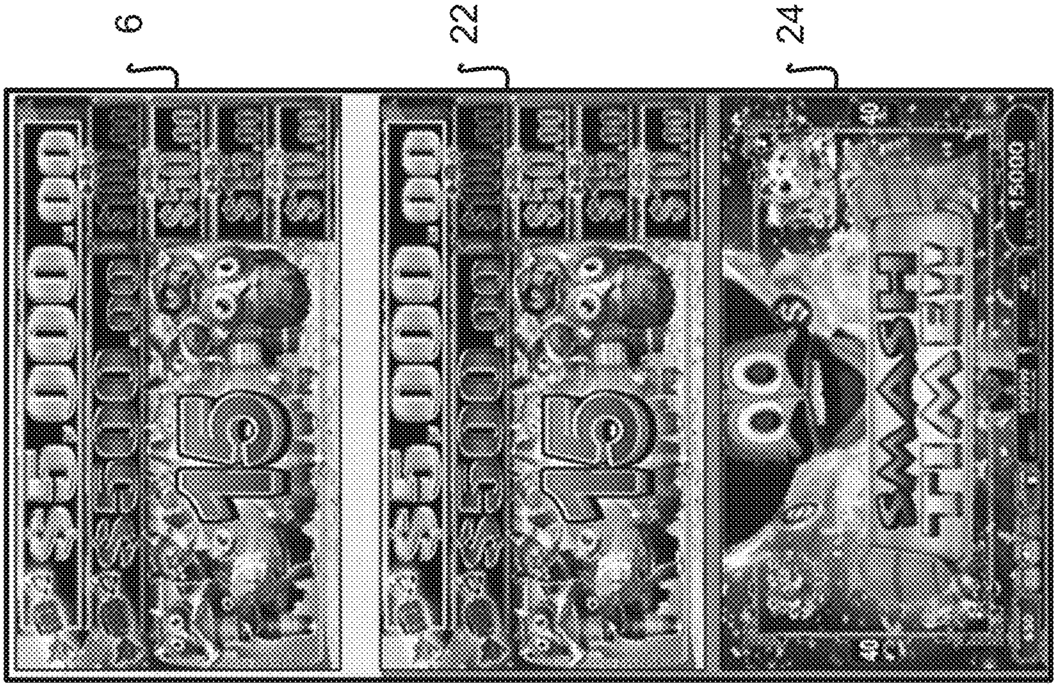
FIGS. 11A-11G are a first set of screenshots of a second feature provided by the game of FIG. 5.
Figure 11A:
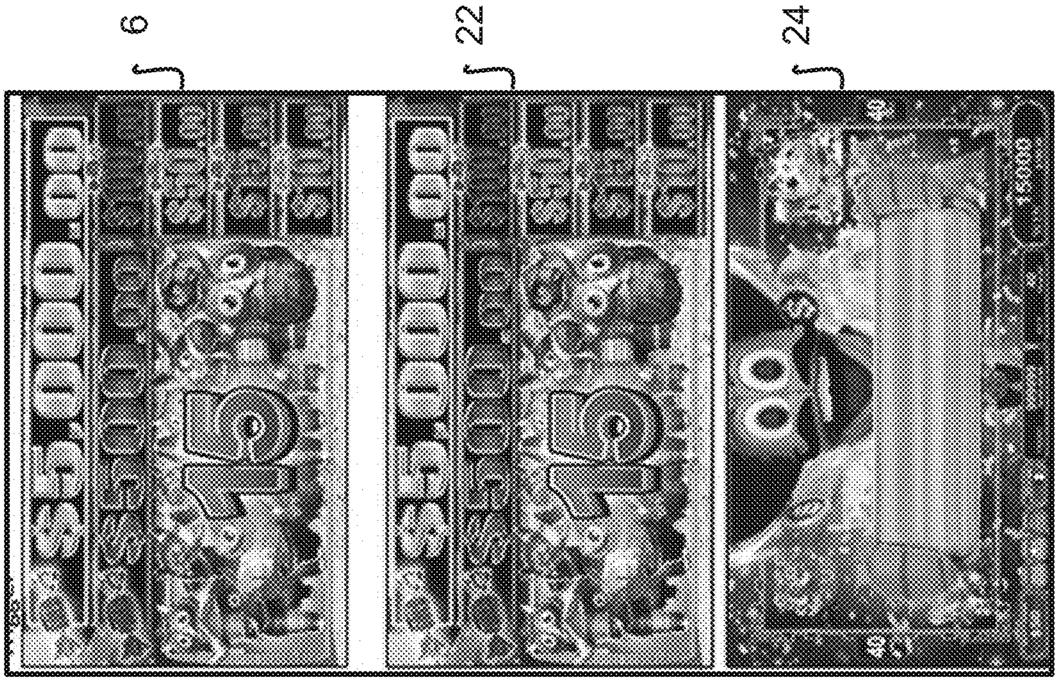
Figure 11D:
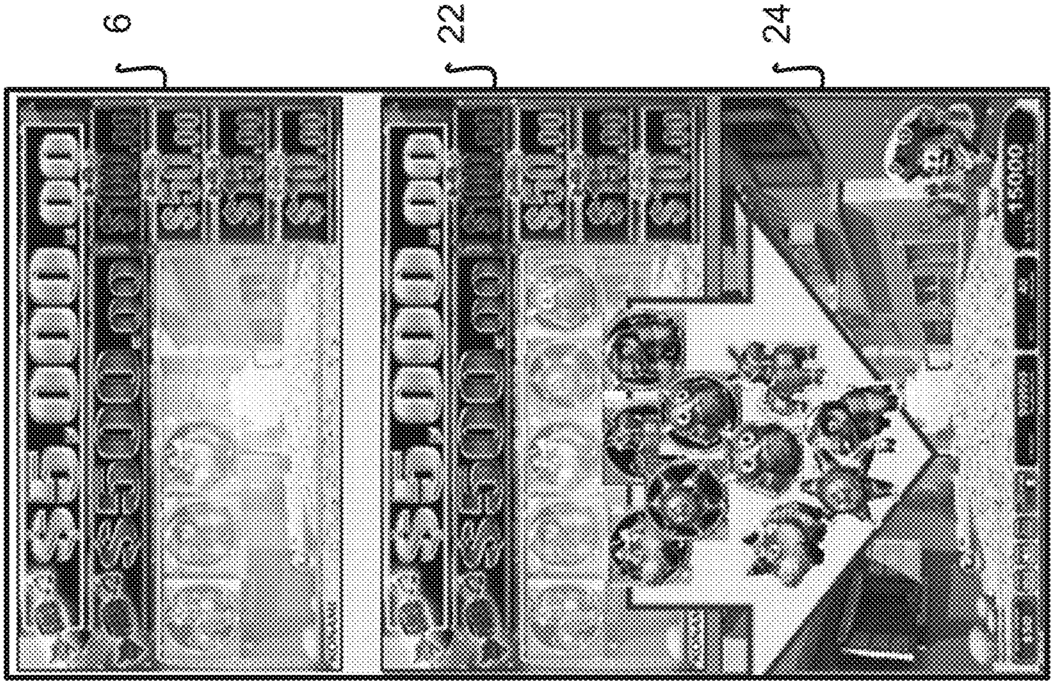
Figure 11C:
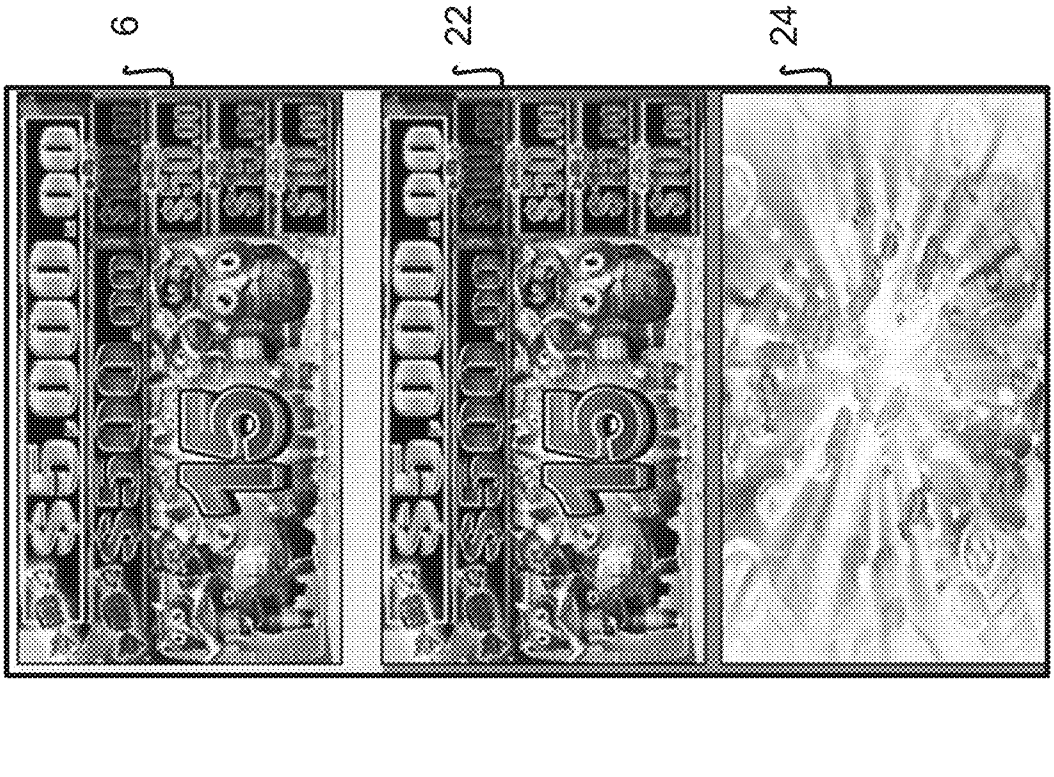
Figure 11F:
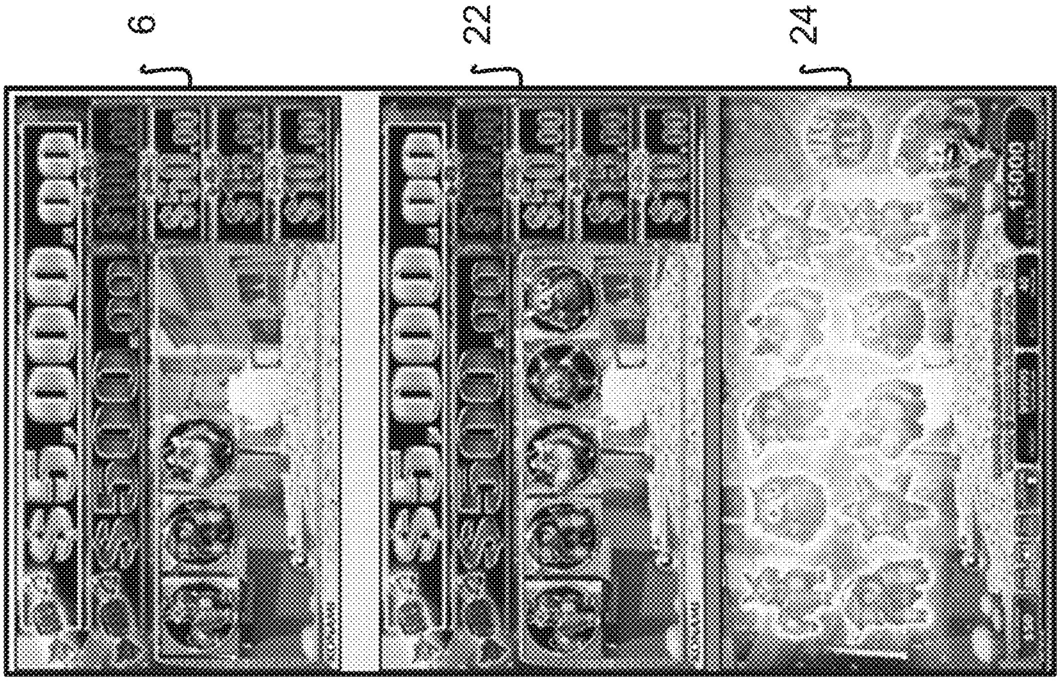
Figure 11E:
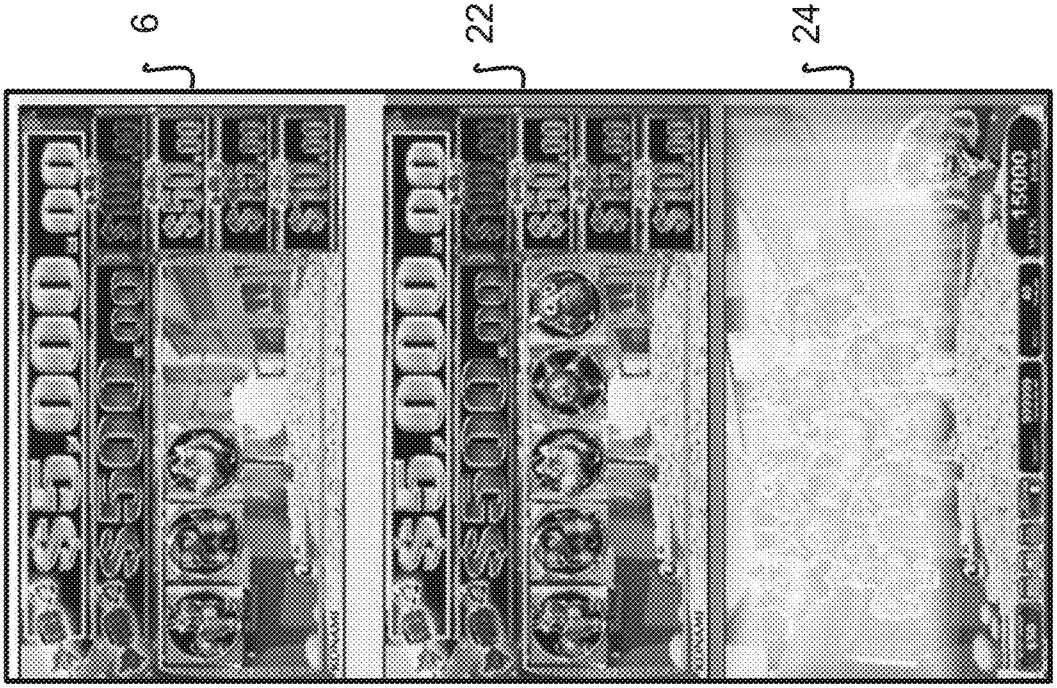
Figure 11G:
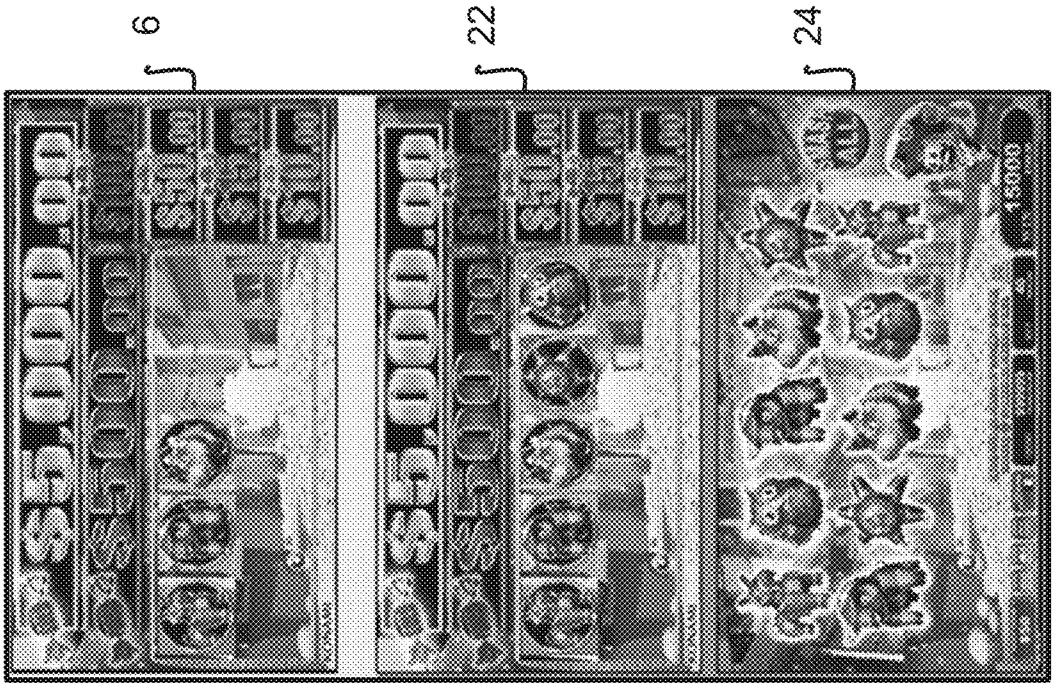

With specific reference to FIGS. 11A-11G, an example of the second feature is shown. Once the second feature has been triggered during the primary game, the primary game is replaced with an animation announcing the first feature, "SMASH TIME!!", is shown in the lower display 24 (se FIGS. 11A-11C). In general, objects are moved from the central display 6 and the upper display 22 to the lower display 24. Once in the lower display 24, the objects are smashed (see below) to reveal and award the concealed associated awards to the player. With reference to FIG. 11D, the escrow objects are moved out of the escrow meter 9 on the central display 6 and the escrow meter 9 is re-seeded with three randomly selected objects. In addition, as shown in FIGS. 11D-11G, in the illustrated embodiment only ten objects may be moved from the upper display 22 to the lower display 24 at one time. Since the escrow meter 9 included fifteen objects, ten objects are moved from the upper display 22 to the lower display 24, leaving (temporarily) five objects on the upper display 22. Once on the lower display 22 the objects can be smashed individually or all at once (see below).

Figure 12B:
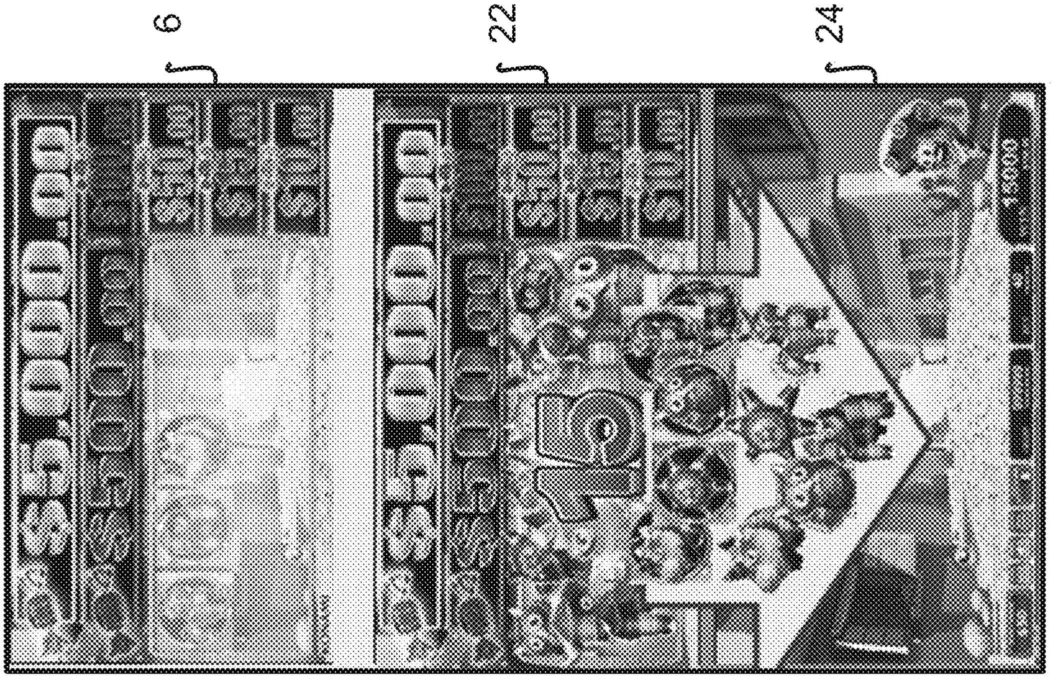
FIGS. 12A-12I are a second set of screenshots of the second feature provided by the game of FIG. 5.
Figure 12A:
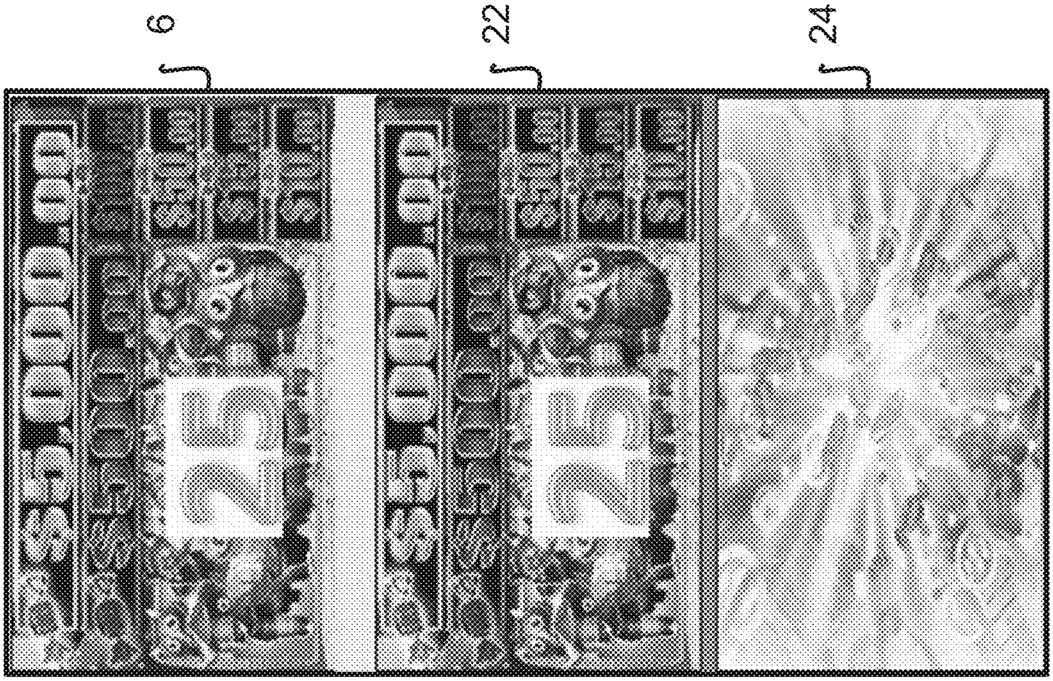
Figure 12C:
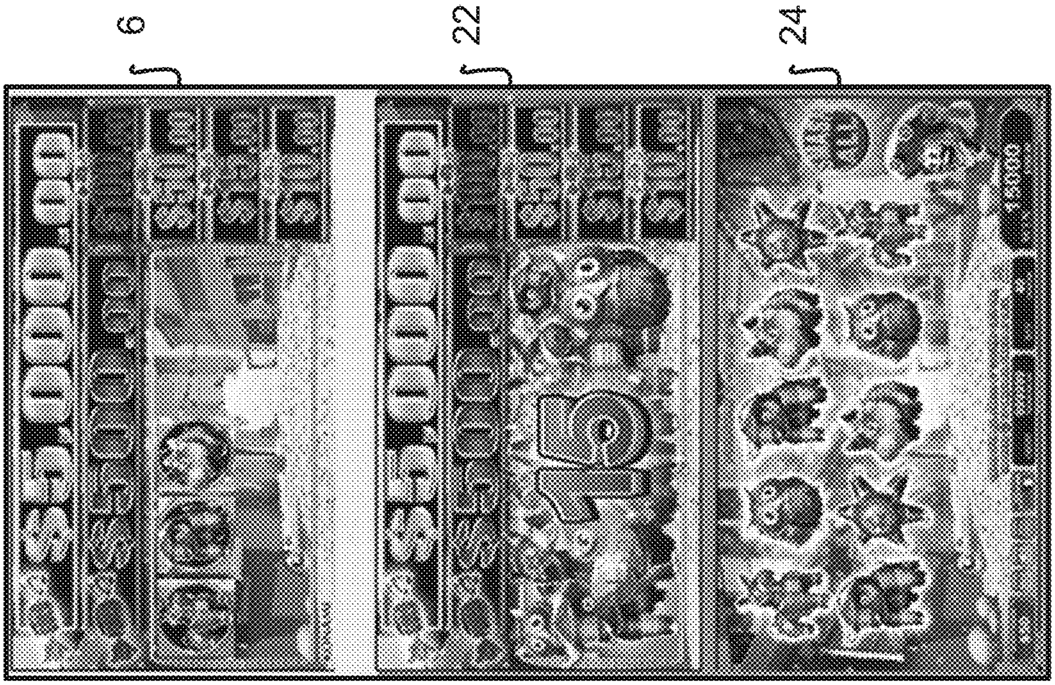
Figure 12D:
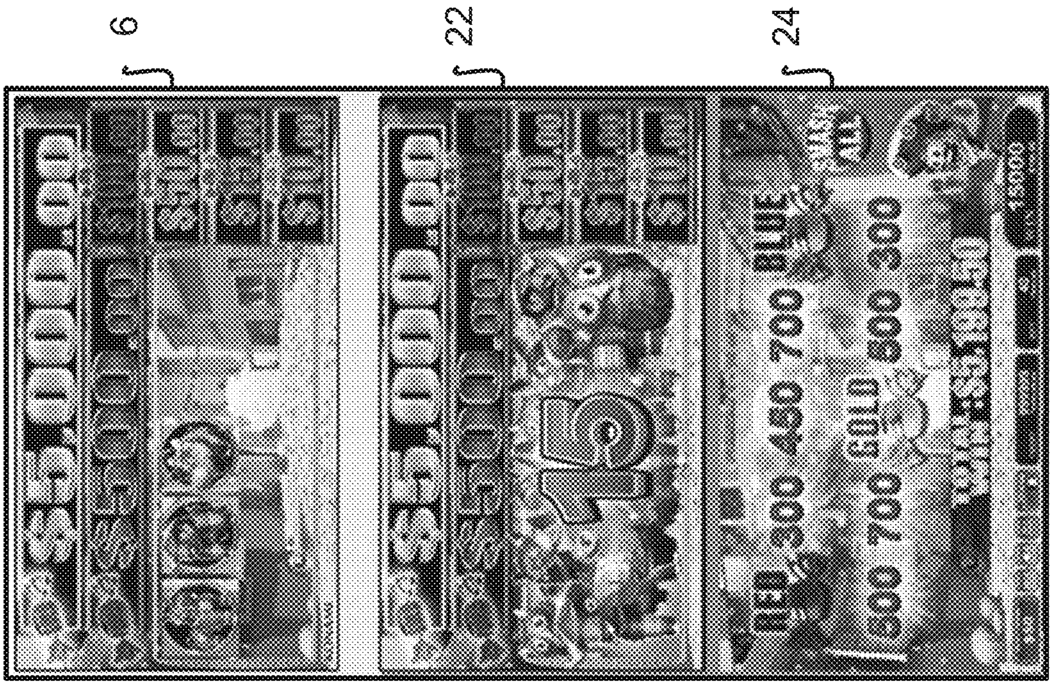
Figure 12F:
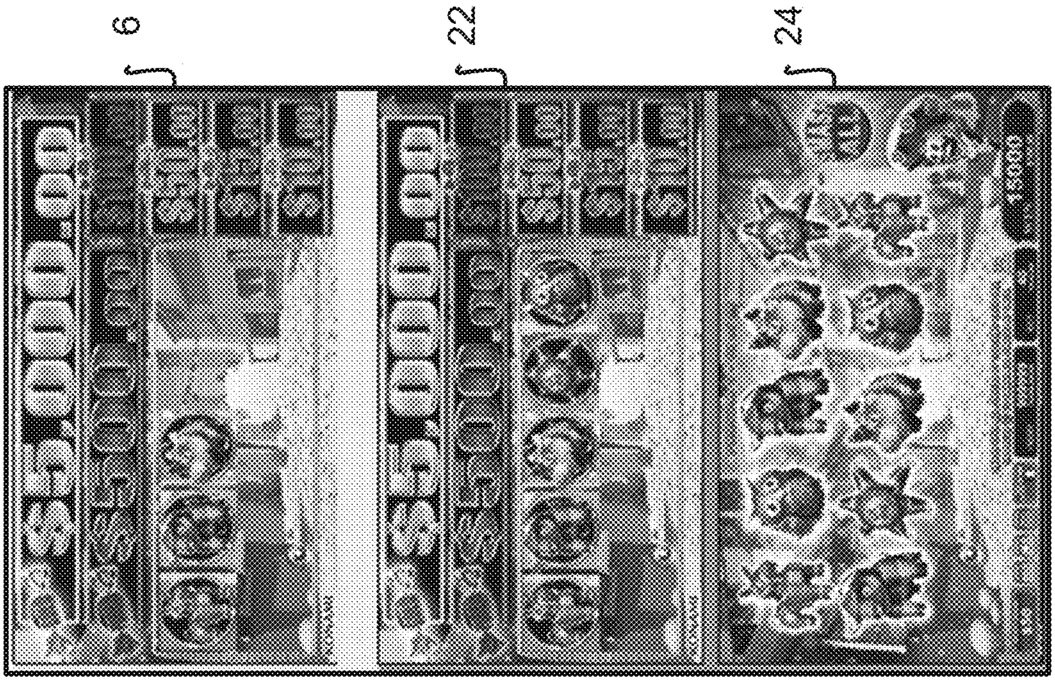
Figure 12E:
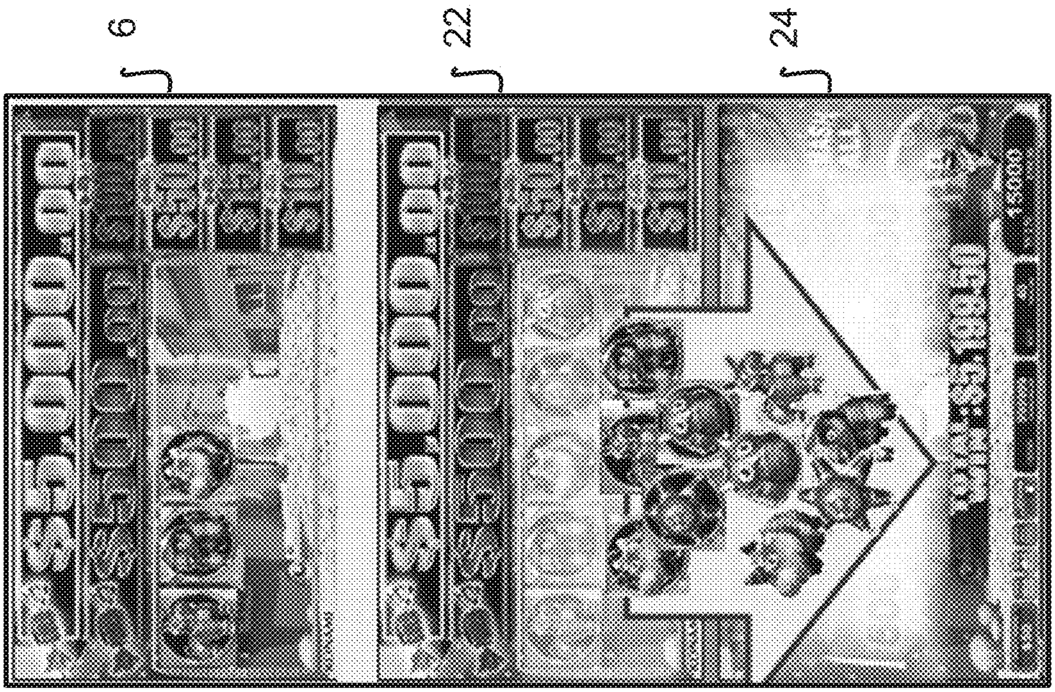
Figure 12H:
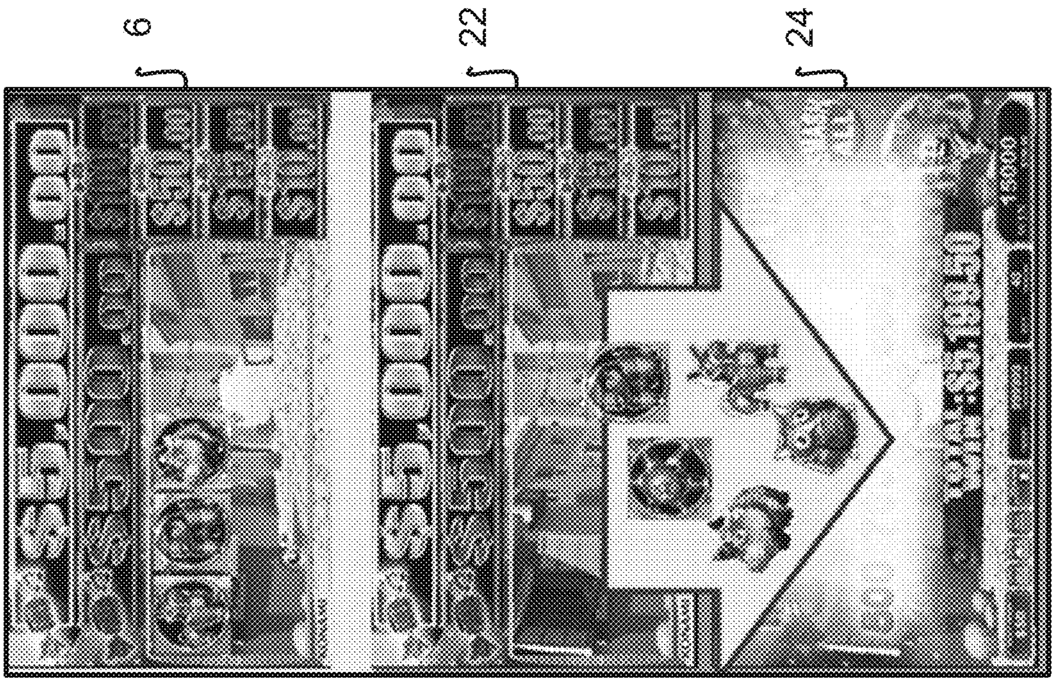
Figure 12G:
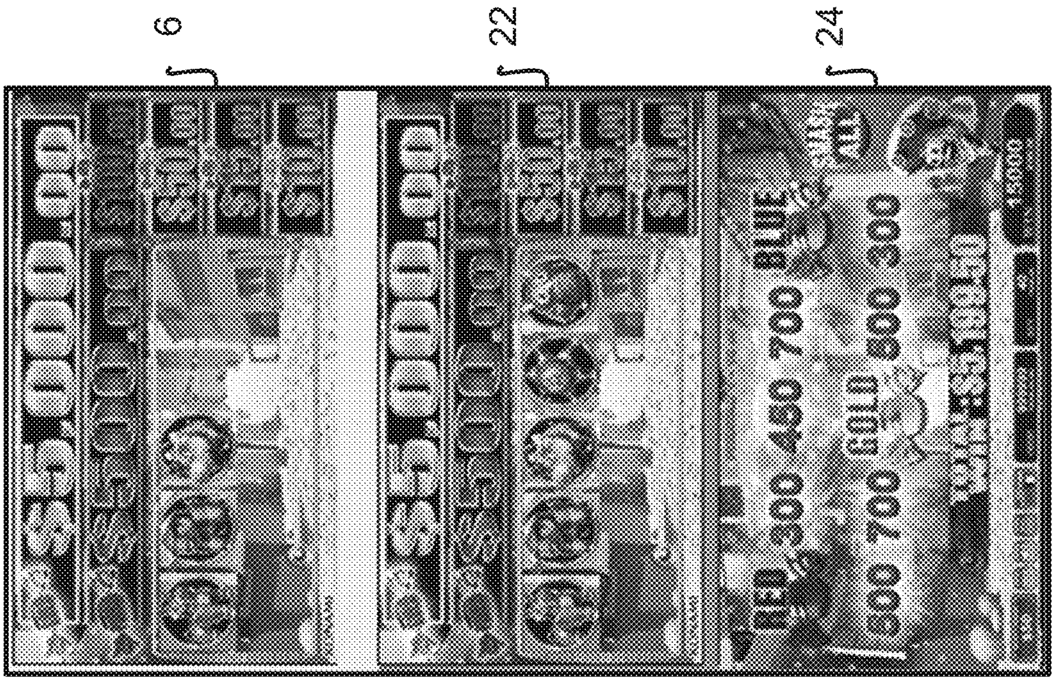
Figure 12I:
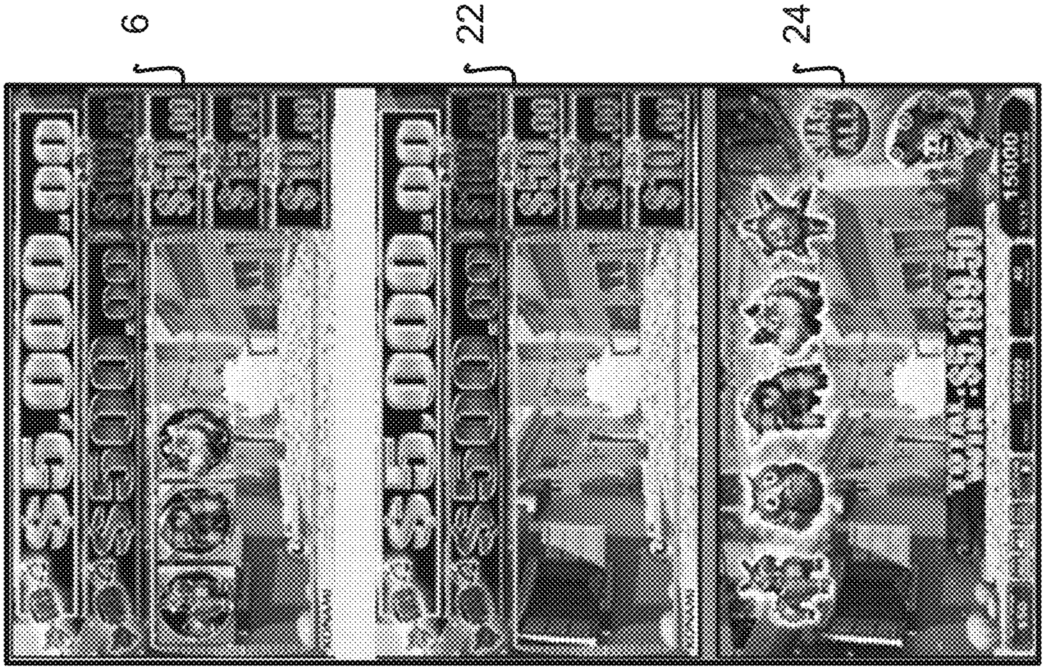

With specific reference to FIGS. 12A-12I, a second example of the second feature is shown. Once the second feature has been triggered during the primary game, the primary game is replaced with an animation announcing the first feature is shown in the lower display 24 (see FIG. 12A). In this instance, the escrow meter 9 includes twenty-five objects. In general, objects are moved from the central display 6 and the upper display 22 to the lower display 24. Once in the lower display 24, the objects are smashed (see below) to reveal and award the concealed associated awards to the player. With reference to FIG. 12B, the escrow objects are moved out of the escrow meter 9 on the central display 6 and the escrow meter 9 is re-seeded with three randomly selected objects. In addition, as shown in FIGS. 12B-12C, in the illustrated embodiment only ten objects may be moved from the upper display 22 to the lower display 24 at one time. Since the escrow meter 9 included twenty-five objects, ten objects are moved from the upper display 22 to the lower display 24, leaving (temporarily) fifteen objects on the upper display 22. Once on the lower display 22 the objects can be smashed individually or all at once. In the illustrated instance, the player has selected to "Smash All" of the objects at the same time. Thus, as shown in FIG. 12D, the objects in the lower display 24 are replaced with the award associated with each respective object. After the first set of ten objects have been smashed, the next set of ten objects are moved from the upper display 22 to the lower display 24 (see FIGS. 12E-12F). Again, the player may select the objects individually or select to smash all of the objects at the same time. In this instance, the player has elected to smash all of the objects at the same time and the objects are replaced with the award associated with each respective object (see FIG. 12G). Afterward, the remaining five objects are moved from the upper display 22 to the lower display 24 (see FIGS. 12H-12I).

Figure 13B:
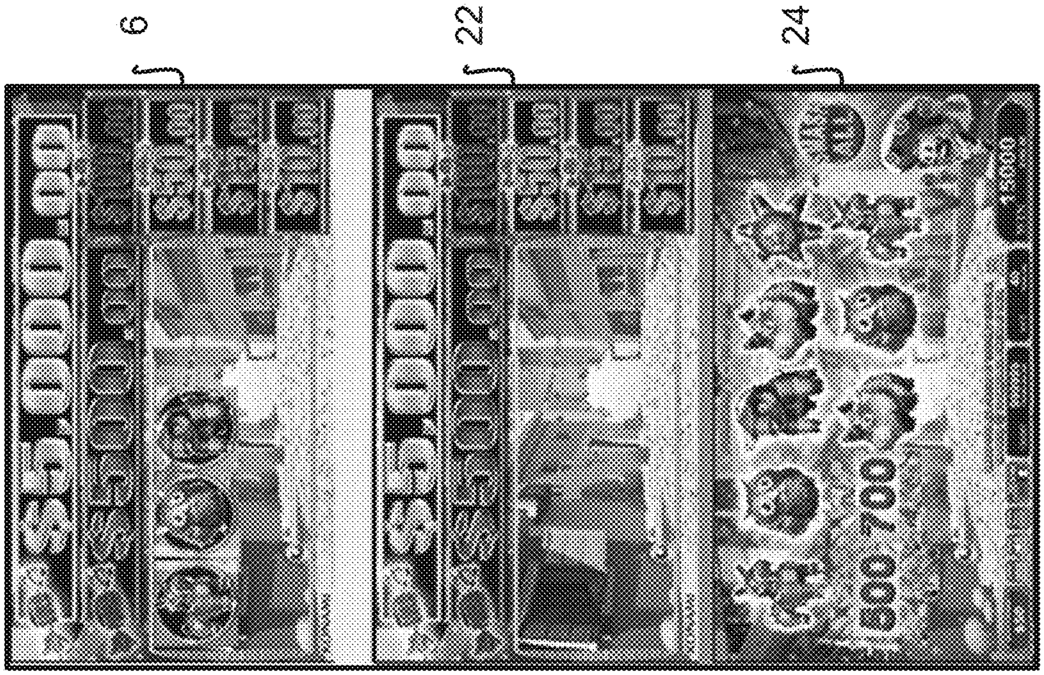
FIGS. 13A-13H are a third set of screenshots of the second feature provided by the game of FIG. 5.
Figure 13A:
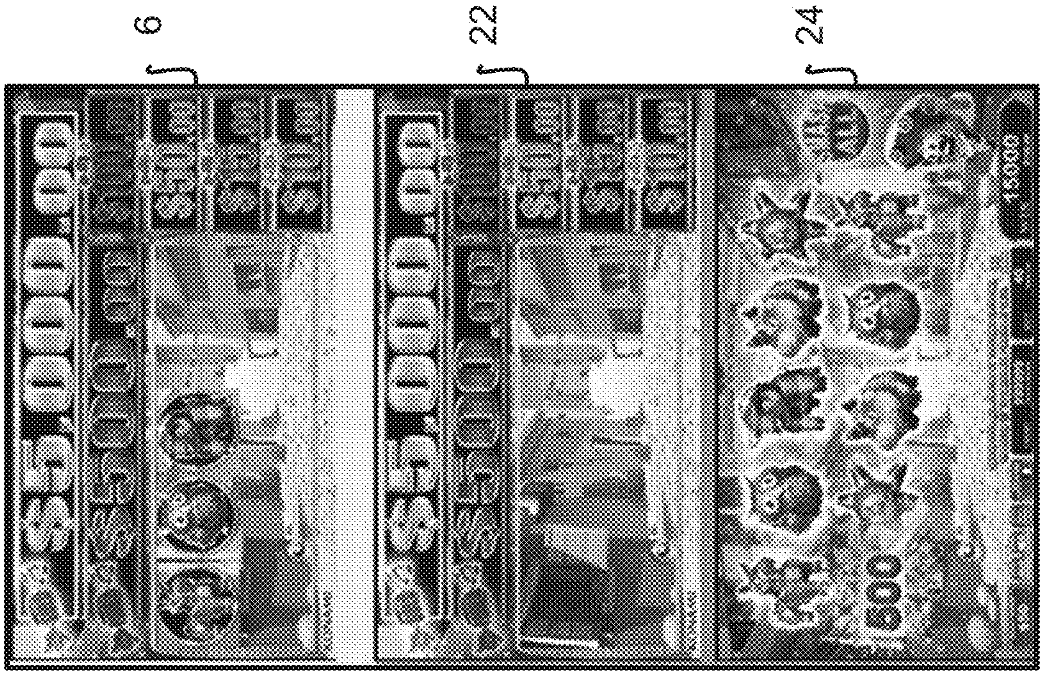
Figure 13D:
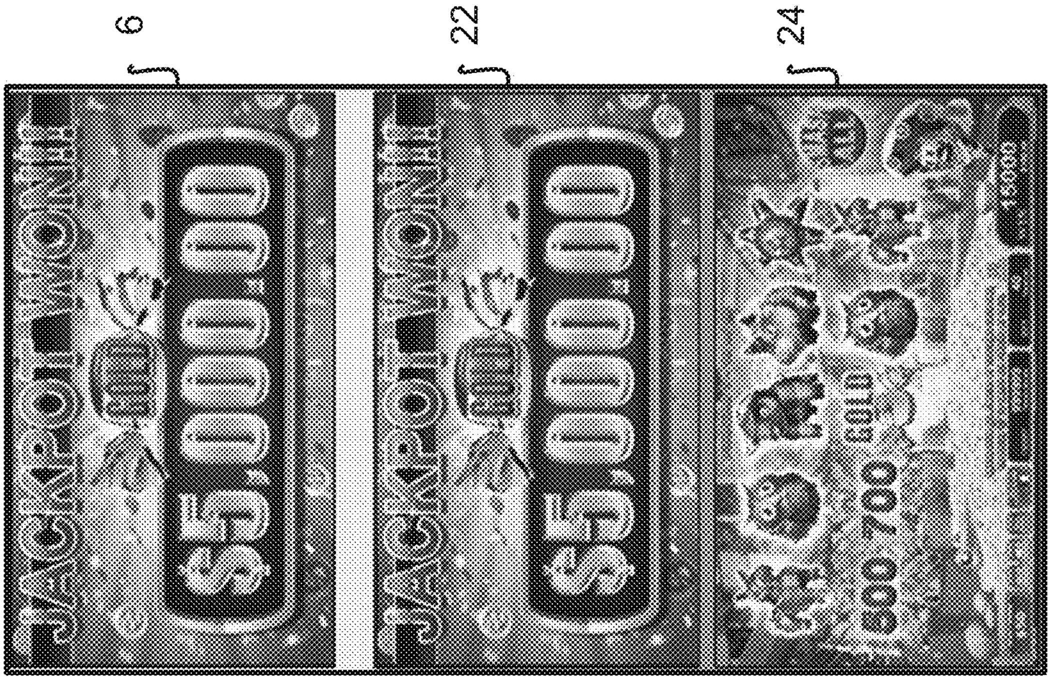
Figure 13C:
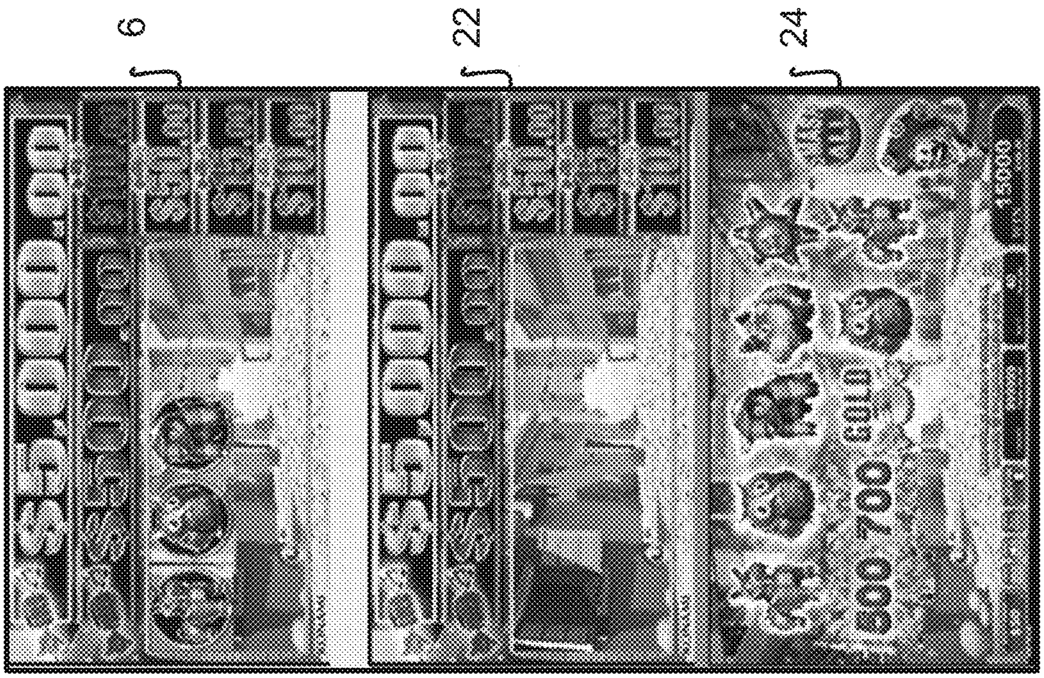
Figure 13F:
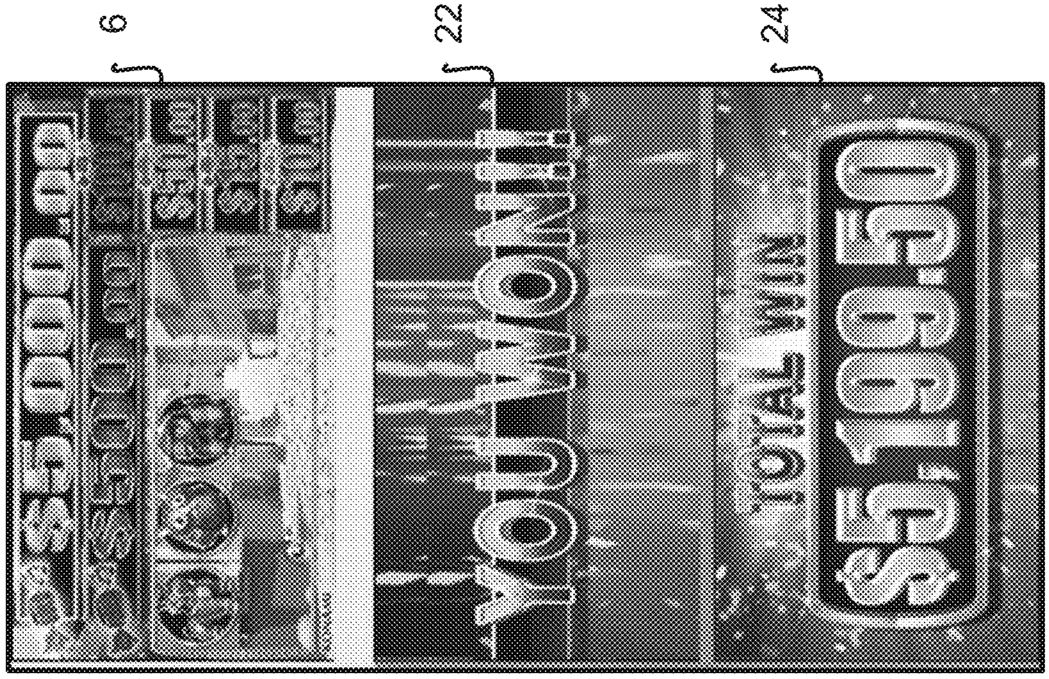
Figure 13E:
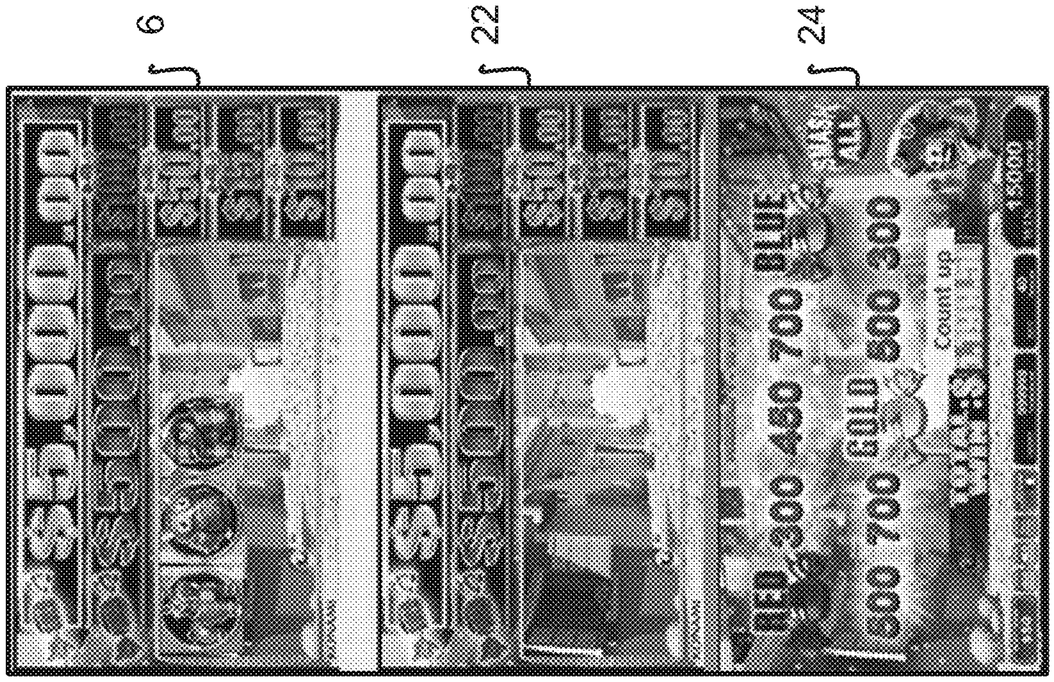
Figure 13H:
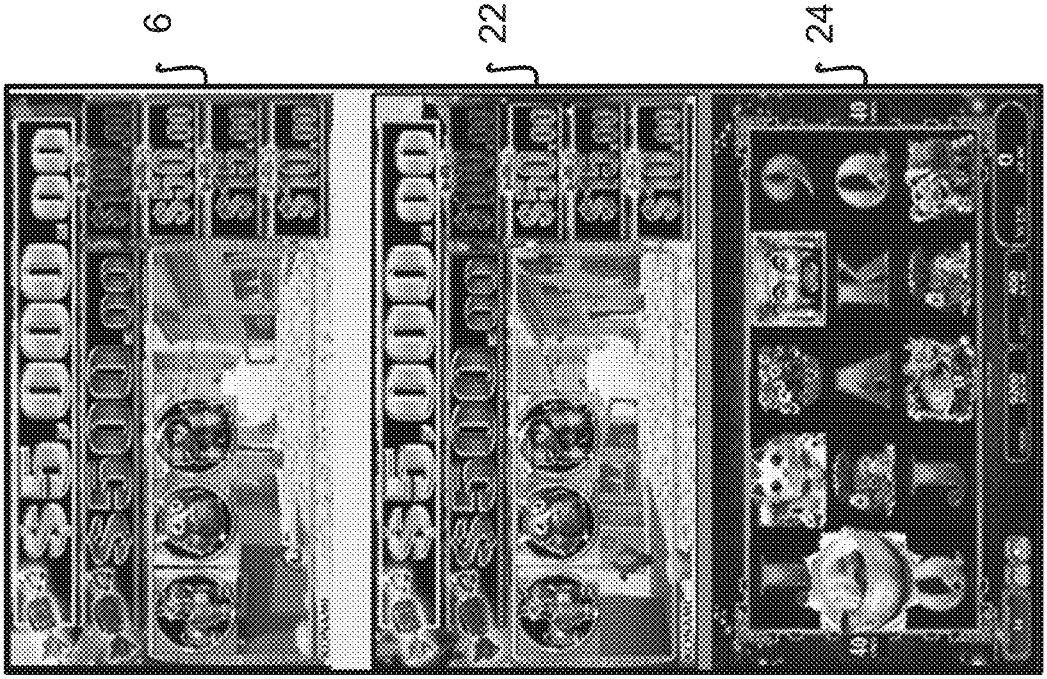
Figure 13G:
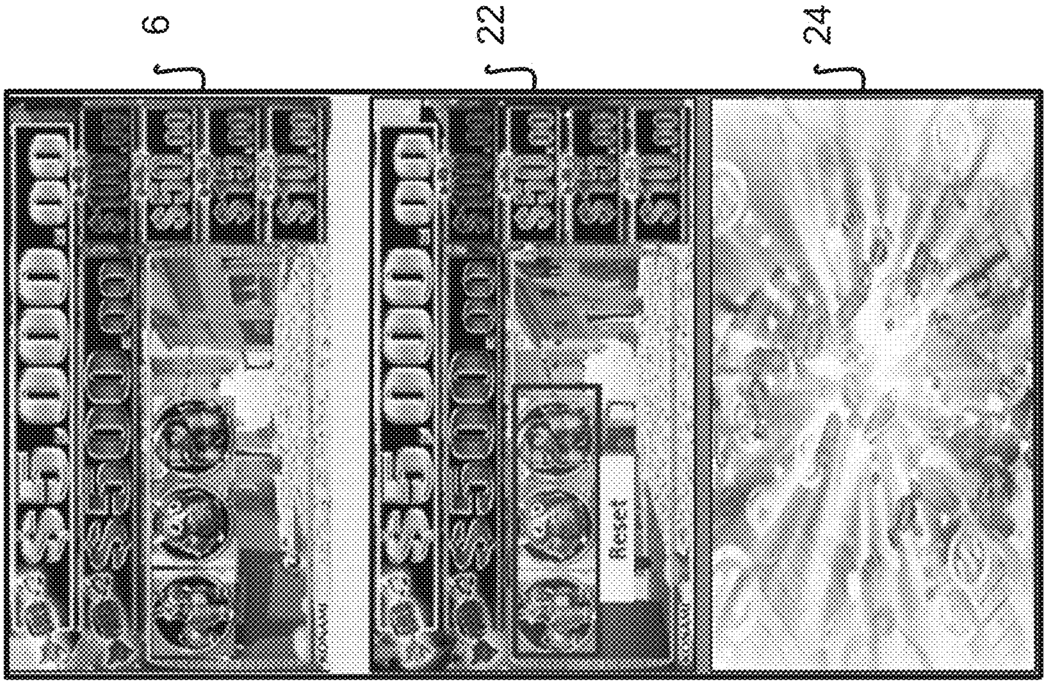

With specific reference to FIGS. 13A-13H, a third example of the second feature is shown. In this example, the associated award with one of the objects in the escrow meter 9 is the GOLD jackpot. In FIG. 13A, the escrow meter 9 has been re-seeded in the central display 6. The escrow meter 9 had previously held ten objects. The ten objects had been moved from the escrow meter 9 in the upper display 22 to the lower display. In this instance, the player has elected to select and smash the objects individually. As the player selects each object, the selected object is replaced with an indicia indicating the award (see FIGS. 13A-13B). In FIG. 13C, the associated award associated with the selected object is the GOLD jackpot. As shown in FIG. 13D, a GOLD jackpot celebration may be played or displayed on the central display 6 and/or the upper display 22. The remaining objects may then be selected by the player (see FIG. 13E) and after all objects have been selected, a celebration or animation may be displayed on the upper and lower displays 22, 24 indicating the total amount won by the player. At the end of the second feature, an animation may be played on the lower display to indicate the end of the feature and the return to the primary game (see FIGS. 13G, 13H).

Figure 14B:
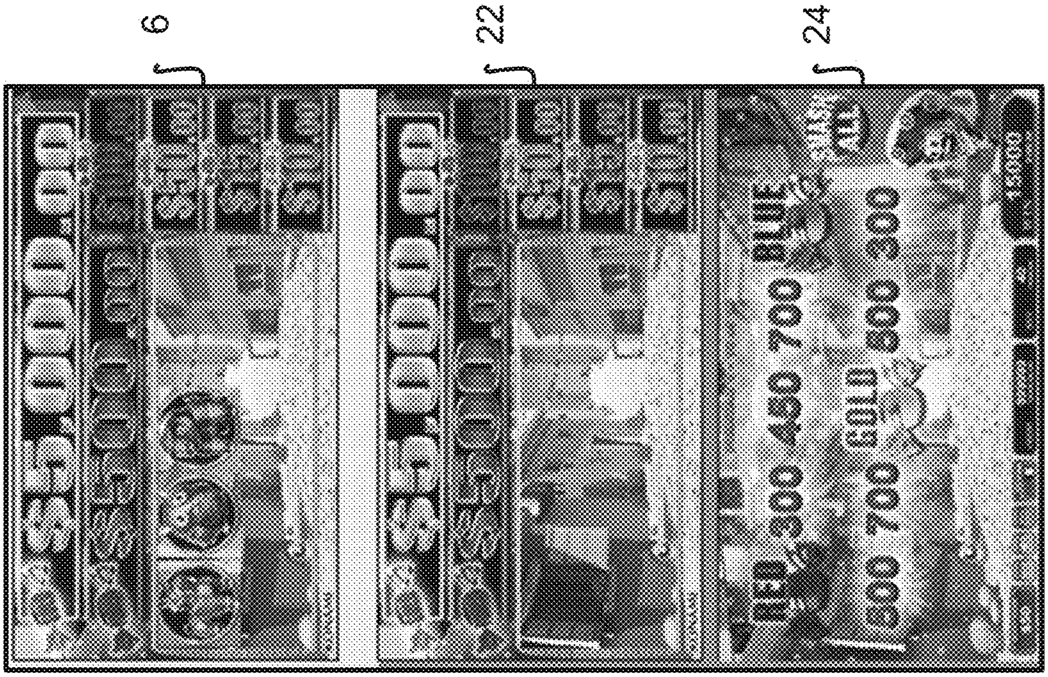
FIGS. 14A-14I are a fourth set of screenshots of the second feature provided by the game of FIG. 5.
Figure 14A:
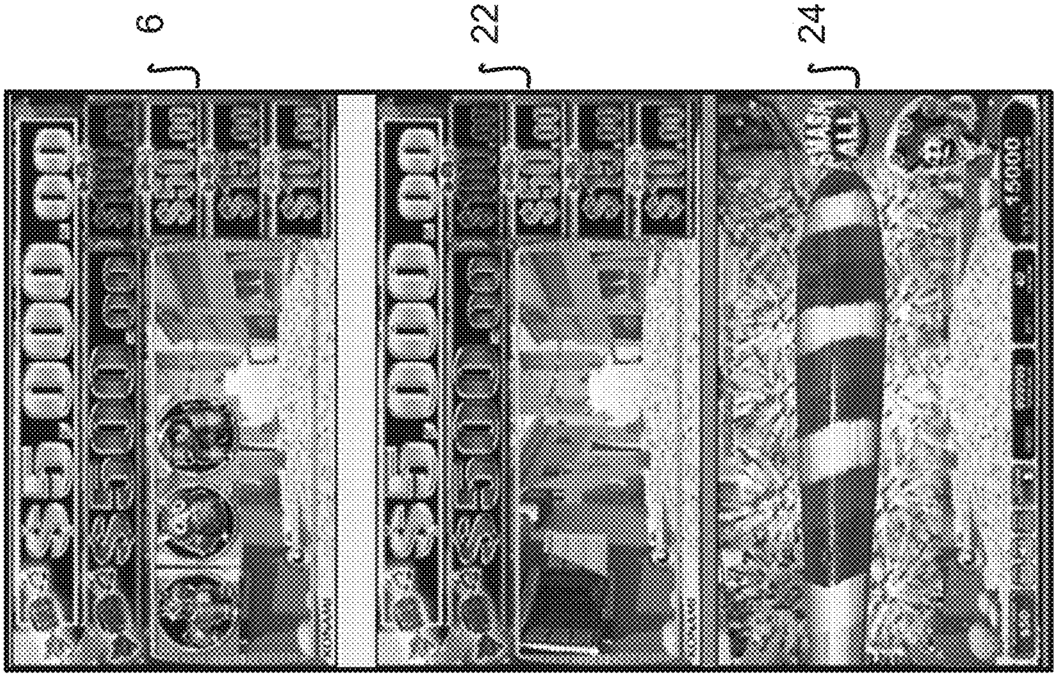
Figure 14D:
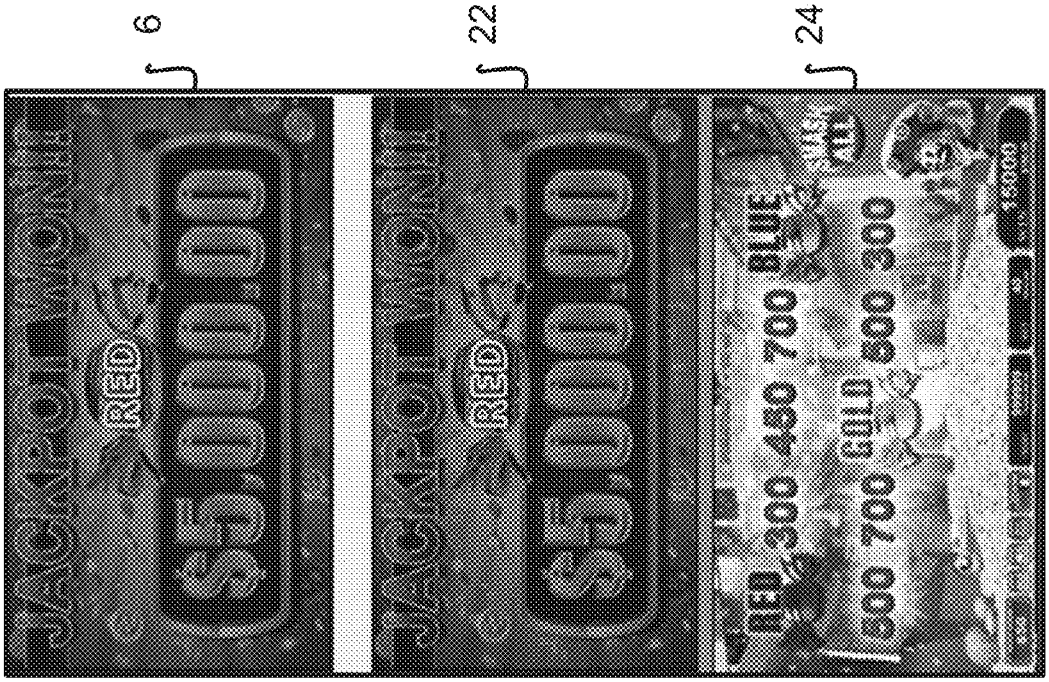
Figure 14C:
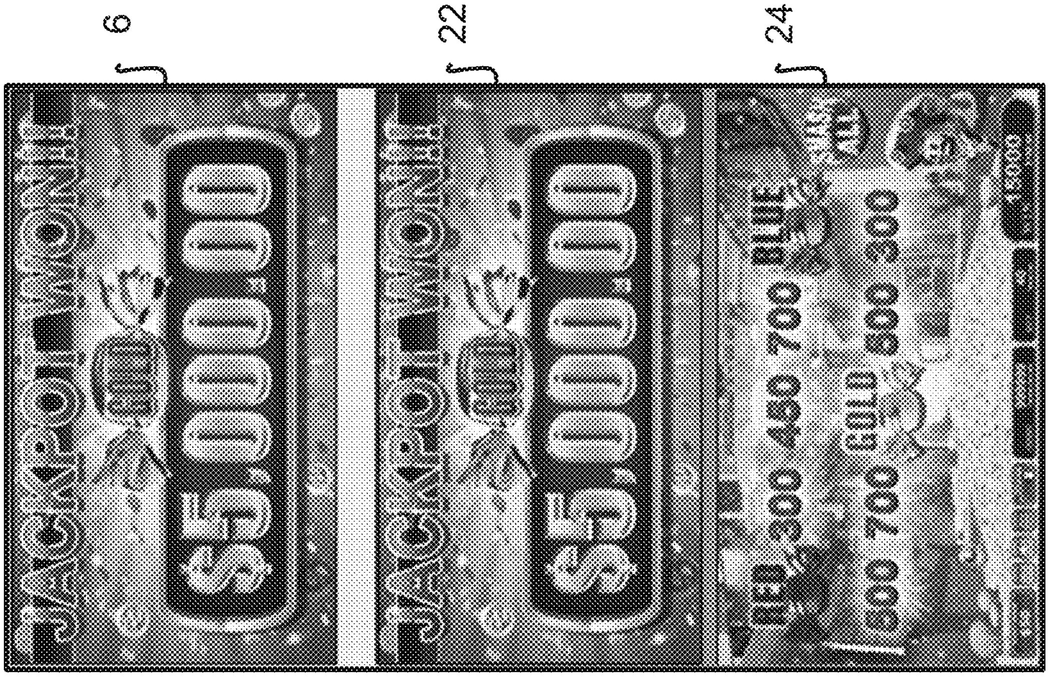
Figure 14F:
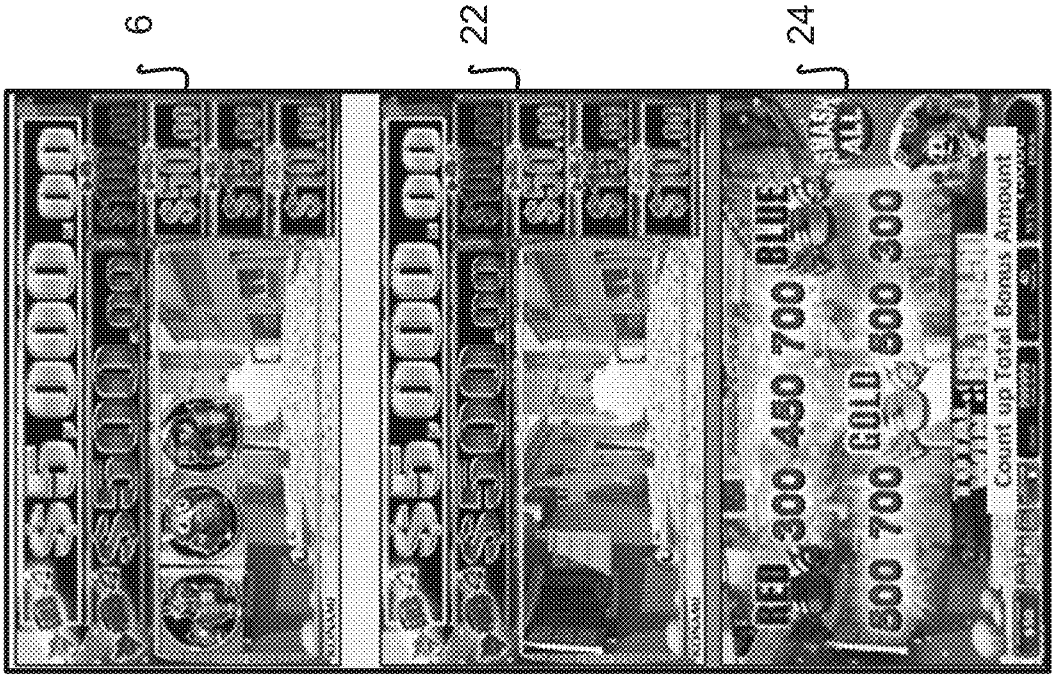
Figure 14E:
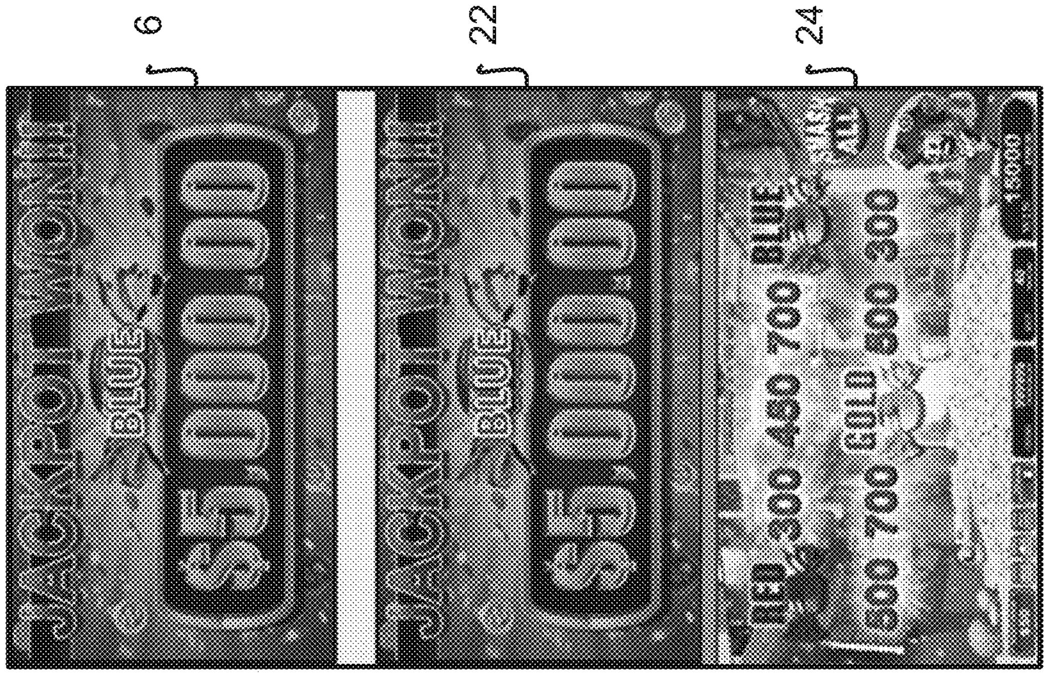
Figure 14H:
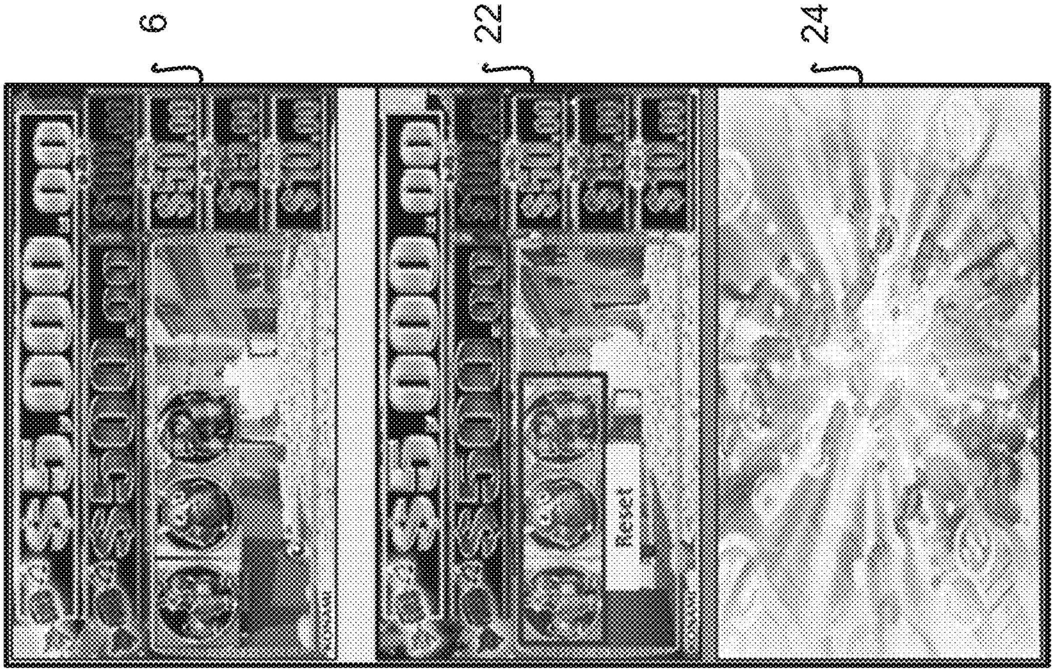
Figure 14G:
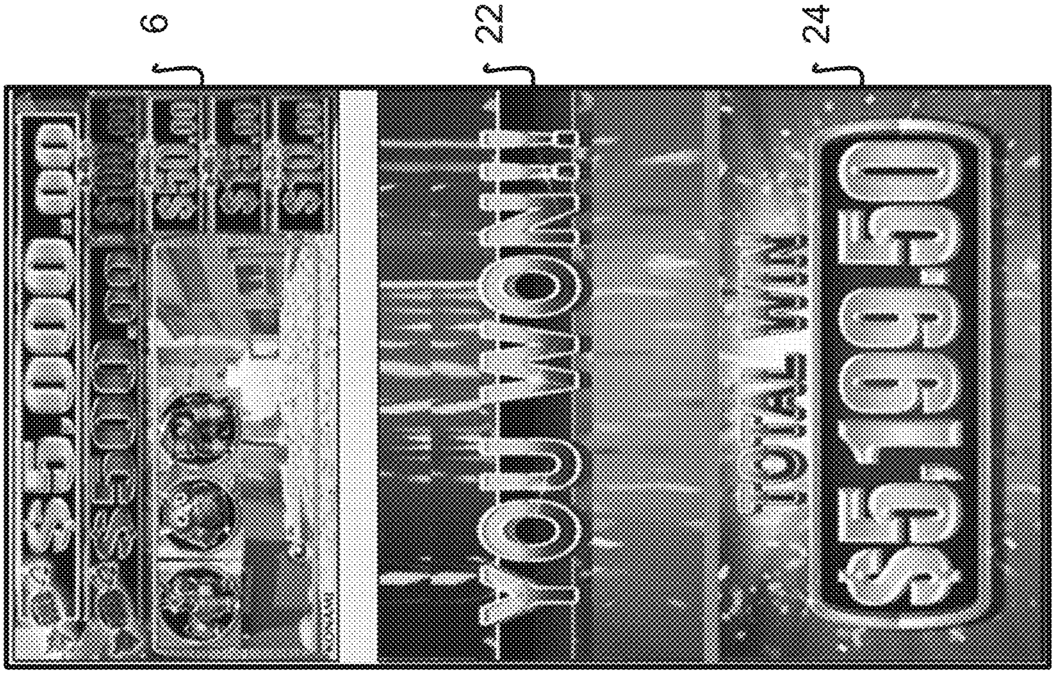
Figure 14I:
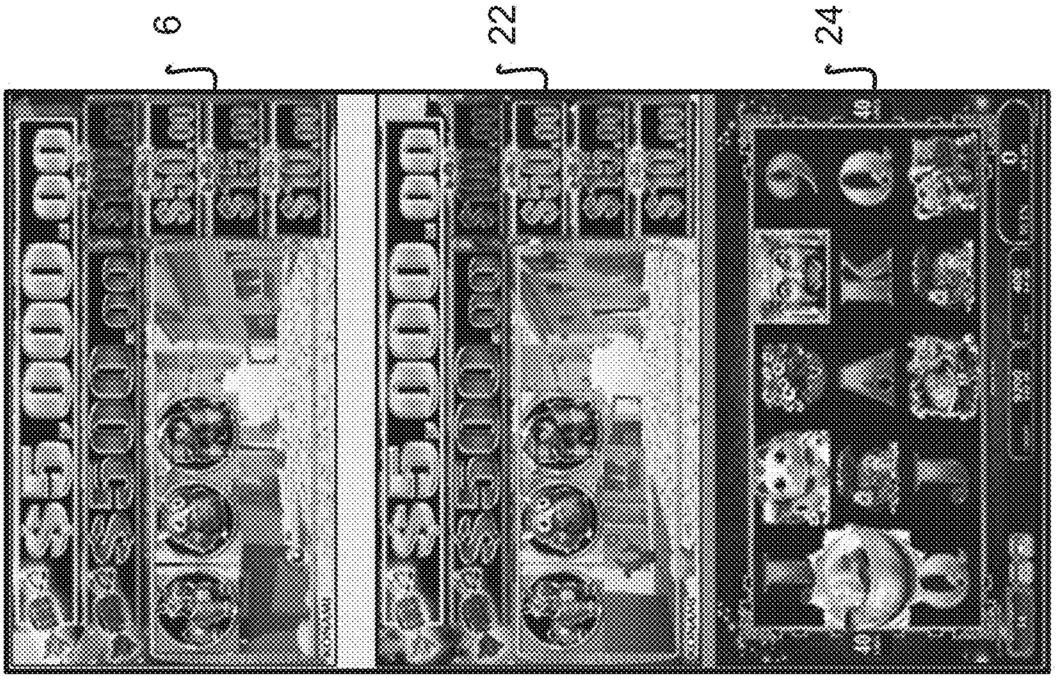

With specific reference to FIGS. 14A-14I, a fourth example of the second feature is shown. In this example, the associated awards with the objects in the escrow meter 9 include a GOLD jackpot, a RED jackpot and a BLUE jackpot. In FIG. 14A, the player has selected to smash all of the objects at the same time. A colored bat is displayed hitting all of the objects in the lower display 24. The escrow meter 9 has been re-seeded in the central display 6. As shown in FIG. 14B, all of the objects on the lower display 24 have been replaced with the associated awards. The revealed awards include a GOLD jackpot, a RED jackpot, and a BLUE jackpot. Thus, as shown in FIGS. 14C, 14D, and 14E, respective celebratory animations are displayed. The total amount of the awards awarded to the player in the second feature are displayed (see FIGS. 14F and 14G). At the end of the second feature, an animation may be played on the lower display 24 to indicate the end of the feature and the return to the primary game (see FIGS. 14H, 14I).

Figure 15B:
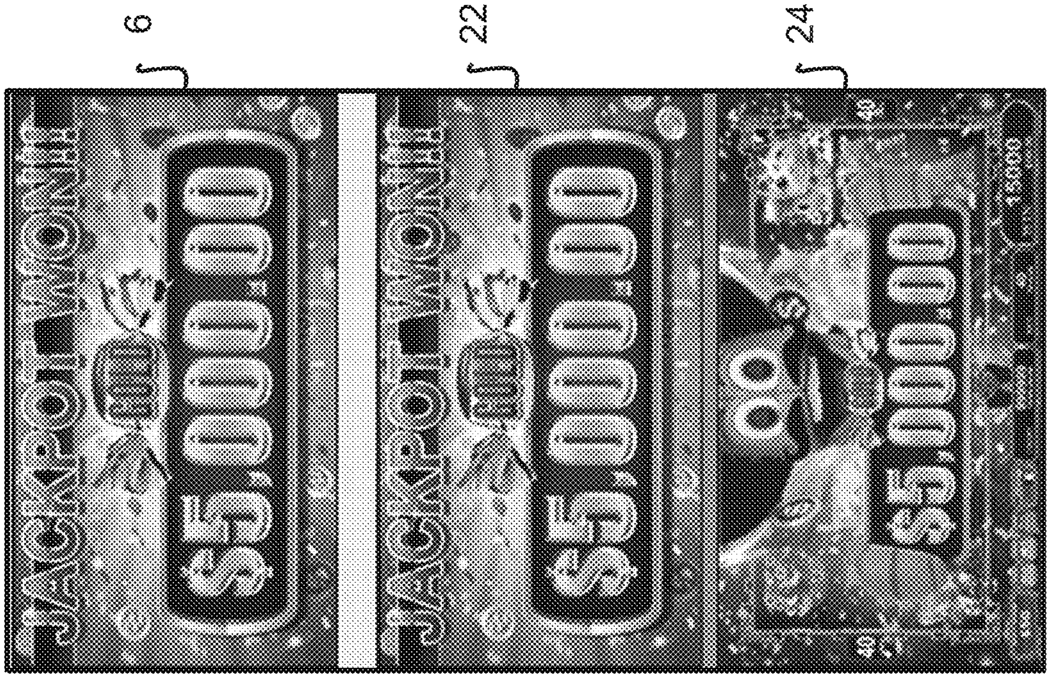
FIGS. 15A-15C are a first set of screenshots of a third feature provided by the game of FIG. 5.
Figure 15A:
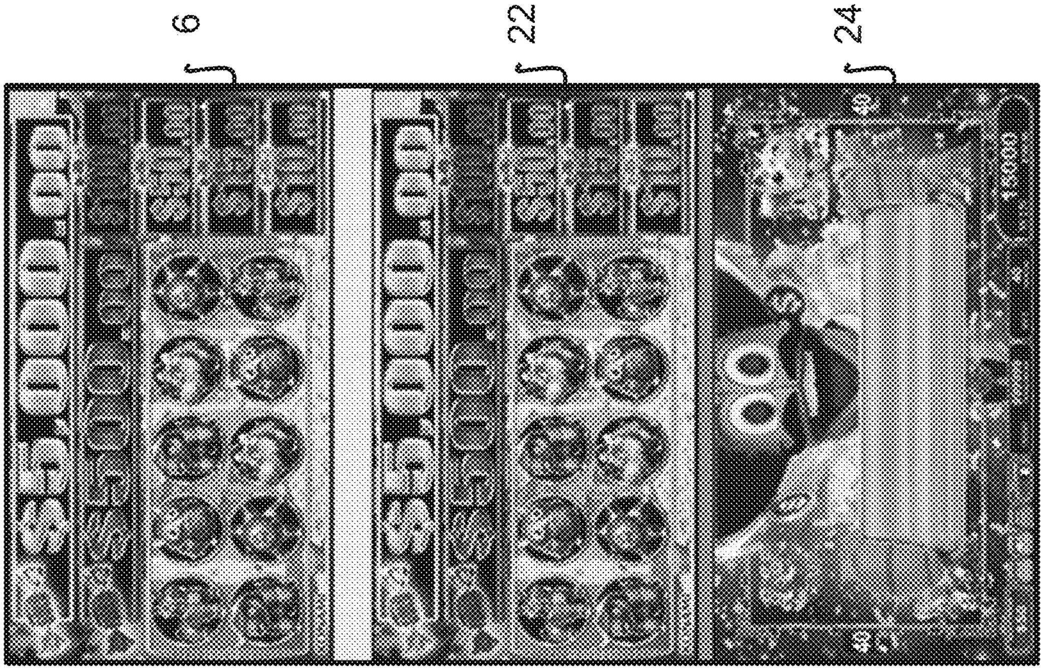
Figure 15C:
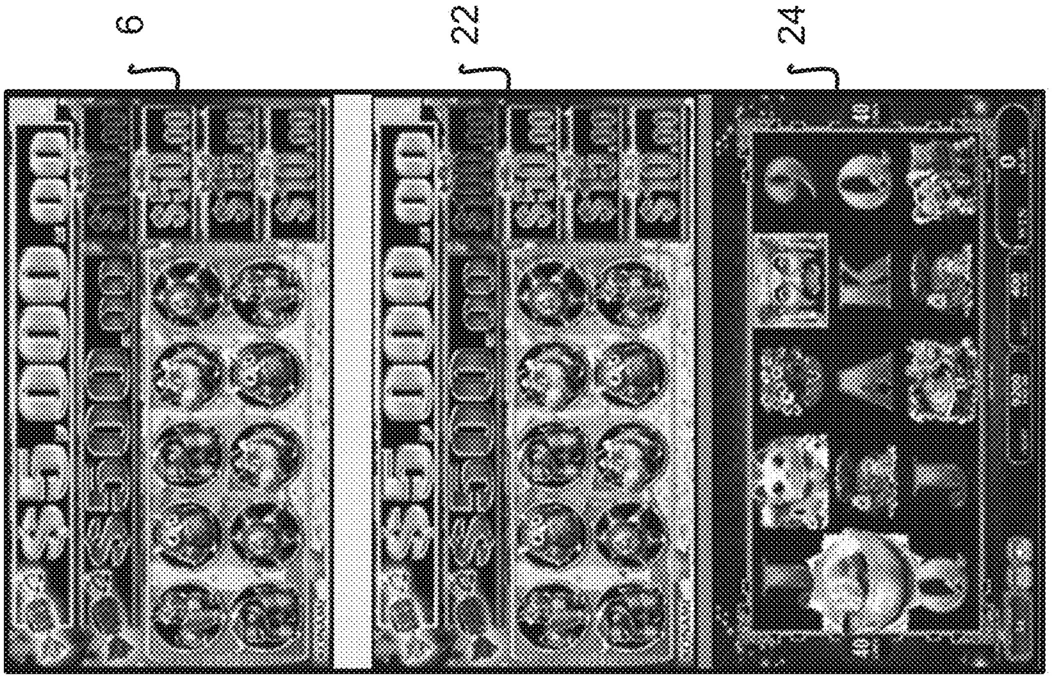

With reference to FIGS. 15A-15C, an example of the third feature is shown. As described above, the third feature is triggered by an independent trigger condition in the primary game. In the illustrated embodiment, the third feature trigger condition is a mystery trigger although any suitable trigger condition may be used. Once the third feature has been triggered during the primary game, the primary game is replaced with an animation announcing the third feature, (see FIGS. 15A-15B). After the announcement animation is shown, a celebratory animation is displayed on the central display 6 and the upper display 22. After the GOLD jackpot has been awarded, the central display 6 and the upper display 22 return to display the escrow meter 9 and the lower display returns to displaying the primary game (see FIG. 15C).

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming system for displaying computer-animations on electronic gaming machines (EGMs), comprising:

a bank of EGMs including:

a plurality of EGMs, each EGM including a gaming cabinet, an upper display mounted to the gaming cabinet, a lower display mounted to the gaming cabinet and including a touchscreen with each of the upper and lower displays including a graphical user interface (GUI) display screen displaying computer-animations of computer-generated images, and an EGM controller including a processor programed to execute computer-executable instructions for rendering an escrow meter on the upper display GUI for displaying a plurality of escrow objects and rendering a game screen on the lower display GUI displaying a plurality of animated reels displayed in a grid; and a bonus display unit positioned above each of the EGMs for displaying computer-animations of computer-generated images of the escrow meter; and a bonus award controller coupled to the bonus display unit and to each EGM controller, the bonus award controller including a random number generator, a memory device storing image data for producing computer-animated images, and one or more processors programed to access the stored image data and execute an algorithm to display an animated sequence of computer-generated images on the upper and lower displays of each EGM and the bonus display unit including the steps of:

rendering computer-animated images of the plurality of escrow objects included in the escrow meter on the bonus display unit and transmitting computer-executable instructions associated with the escrow meter to each EGM controller to cause each EGM controller to display the plurality of escrow objects included in the escrow meter on the upper display GUI of each of the EGMs including computer generated images of a plurality of escrow objects;

randomly selecting a first EGM from the plurality of EGMs using the random number generator and rendering a computer-animated bonus select event on the first EGM by:

randomly selecting two escrow objects using the random number generator;

transmitting computer-executable instructions for displaying the computer-animated bonus select event to the first EGM controller to cause the first EGM controller to:

display a first transition animation to replace the plurality of animated reels displayed on the touchscreen of the lower display GUI with an object selection screen;

animate the randomly selected two escrow objects to appear on the object selection screen as piñata images;

receive a player selection of one of the two escrow objects by a player via the touchscreen of the first EGM and animate a computer-animated bat image to appear on the object selection screen and contact the player selected escrow object;

modify an image of the player selected escrow object to display a corresponding computer-animated award image associated with the player selected escrow object; and display a second transition animation to replace the object selection screen displayed on the touchscreen of the lower display GUI with the plurality of animated reels; and modifying the computer-animated escrow meter displayed on the bonus display unit to add an image of an unselected escrow object to the plurality of escrow objects and transmitting computer-executable instructions for adding the image of the unselected escrow object to the plurality of escrow objects to each EGM controller to cause each escrow meter displayed on each EGM to display a same number of escrow objects as the escrow meter displayed on the bonus display unit; and conducting an animated bonus award event by:

randomly selecting a second EGM using the random number generator;

modifying the computer-animated escrow meter displayed on the bonus display unit to remove the plurality of escrow objects and transmitting computer-executable instructions for removing the plurality of escrow objects from the escrow meter to each non-selected EGM; and rendering a computer-animated bonus award event at the second EGM by:

transmitting computer-executable instructions for animating the plurality of escrow objects to a second EGM controller of the second EGM to cause the second EGM controller to:

replace the plurality of animated reels displayed on the lower display GUI of the second EGM with a second object selection screen;

animate each of the plurality of escrow objects to move from the computer-animated escrow meter being displayed on the upper display of the second EGM to the second object selection screen displayed on the touchscreen of the lower display of the second EGM;

animate a computer-animated prompting image on the object selection screen of the second EGM to prompt a player selection of each of the plurality of escrow objects displayed on the object selection screen; and display each computer-animated escrow award image associated with each of the plurality of escrow objects as each escrow object is selected via the touchscreen of the second EGM.

2. The gaming system of claim 1, wherein the one or more processors is programmed to execute the algorithm including the steps of:

rendering the bonus select event by:

transmitting computer-executable instructions for displaying the computer-animated bonus select event to the first EGM controller to cause the first EGM controller to animate the unselected escrow object to move to the escrow meter from the object selection screen after the selected escrow object has been modified to display the corresponding award.

3. The gaming system of claim 1, wherein the one or more processors is programmed to execute the algorithm including the steps of:

populating the computer-animated escrow meter displayed on the bonus display unit and on each EGM with a predefined number of new escrow objects upon completing the bonus award event.

4. The gaming system of claim 1, wherein the one or more processors is programmed to execute the algorithm including the steps of:

rending the escrow meter on the bonus display unit to display ten escrow objects; and displaying a number icon indicating a number of escrow objects in the escrow meter when the number of escrow objects is greater than ten escrow objects.

5. A method of operating a gaming system including a bank of EGMs including a plurality of electronic gaming machines (EGMs), a bonus display unit positioned above each of the EGMs for displaying computer-animations of computer-generated images of an escrow meter for displaying a plurality of escrow objects, and a bonus award controller, each EGM including a gaming cabinet, an upper display mounted to the gaming cabinet, a lower display mounted to the gaming cabinet and including a touchscreen with each of the upper and lower displays including a graphical user interface (GUI) display screen displaying computer-generated images, and an EGM controller including a processor programed to execute computer-executable instructions for rendering the escrow meter on the upper display GUI and rendering a game screen on the lower display GUI displaying a plurality of animated reels displayed in a grid, the bonus award controller including a random number generator, a memory device storing image data for producing computer-animated images, and one or more processors coupled to each EGM controller and the bonus display unit, the method including the one or more processors performing an algorithm to display an animated sequence of computer-generated images on the upper and lower displays of each EGM and the bonus display unit including the steps of:

accessing the stored image data and rendering a computer-animated images of the plurality of escrow objects included in the escrow meter on the bonus display unit and transmitting computer-executable instructions associated with the escrow meter to each EGM controller to cause each EGM controller to display the plurality of escrow objects included in the escrow meter on the upper display GUI of each of the EGMs including computer generated images of a plurality of escrow objects;

randomly selecting a first EGM from the plurality of EGMs using the random number generator and rendering a computer-animated bonus select event on the first EGM by:

randomly selecting two escrow objects using the random number generator;

transmitting computer-executable instructions for displaying the computer-animated bonus select event to the first EGM controller to cause the first EGM controller to:

display a first transition animation to replace the plurality of animated reels displayed on the touchscreen of the lower display GUI with an object selection screen;

animate the randomly selected two escrow objects to appear on the object selection screen as piñata images;

receive a player selection of one of the two escrow objects by a player via the touchscreen of the first EGM and animate a computer-animated bat image to appear on the object selection screen and contact the player selected escrow object;

modify an image of the player selected escrow object to display a corresponding computer-animated award image associated with the player selected escrow object; and display a second transition animation to replace the object selection screen displayed on the touchscreen of the lower display GUI with the plurality of animated reels; and modifying the computer-animated escrow meter displayed on the bonus display unit to add an image of an unselected escrow object to the plurality of escrow objects and transmitting computer-executable instructions for adding the image of the unselected escrow object to the plurality of escrow objects to each EGM controller to cause each escrow meter displayed on each EGM to display a same number of escrow objects as the escrow meter displayed on the bonus display unit; and conducting an animated bonus award event by:

randomly selecting a second EGM using the random number generator;

modifying the computer-animated escrow meter displayed on the bonus display unit to remove the plurality of escrow objects and transmitting computer-executable instructions for removing the plurality of escrow objects from the escrow meter to each non-selected EGM; and rendering a computer-animated bonus award event at the second EGM by:

transmitting computer-executable instructions for animating the plurality of escrow objects to a second EGM controller of the second EGM to cause the second EGM controller to:

replace the plurality of animated reels displayed on the lower display GUI of the second EGM with a second object selection screen;

animate each of the plurality of escrow objects to move from the computer-animated escrow meter being displayed on the upper display of the second EGM to the second object selection screen displayed on the touchscreen of the lower display of the second EGM;

animate a computer-animated prompting image on the object selection screen of the second EGM to prompt a player selection of each of the plurality of escrow objects displayed on the object selection screen; and display each computer-animated escrow award image associated with each of the plurality of escrow objects as each escrow object is selected via the touchscreen of the second EGM.

6. The method of claim 5, including the one or more processors performing the algorithm including the steps of:

rendering the bonus select event by:

transmitting computer-executable instructions for displaying the computer-animated bonus select event to the first EGM controller to cause the first EGM controller to animate the unselected escrow object to move to the escrow meter from the object selection screen after the selected escrow object has been modified to display the corresponding award.

7. The method of claim 5, including the one or more processors performing the algorithm including the steps of:

populating the computer-animated escrow meter displayed on the bonus display unit and on each EGM with a predefined number of new escrow objects upon completing the bonus award event.

8. The method of claim 5, including the one or more processors performing the algorithm including the steps of:

rending the escrow meter on the bonus display unit to display ten escrow objects; and displaying a number icon indicating a number of escrow objects in the escrow meter when the number of escrow objects is greater than ten escrow objects.

9. A non-transitory computer-readable storage media having computer-executable instructions embodied thereon to operate a gaming system including a bank of EGMs including a plurality of electronic gaming machines (EGMs), a bonus display unit positioned above each of the EGMs for displaying computer-animations of computer-generated images of an escrow meter for displaying a plurality of escrow objects, and a bonus award controller, each EGM including a gaming cabinet, an upper display mounted to the gaming cabinet, a lower display mounted to the gaming cabinet and including a touchscreen with each of the upper and lower displays including a graphical user interface (GUI) display screen displaying computer-generated images, and an EGM controller including a processor programed to execute computer-executable instructions for rendering the escrow meter on the upper display GUI and rendering a game screen on the lower display GUI displaying a plurality of animated reels displayed in a grid, the bonus award controller including a random number generator, a memory device storing image data for producing computer-animated images, and one or more processors coupled to each EGM controller and the bonus display unit, when executed by the one or more processors the computer-executable instructions cause the one or more processors to perform an algorithm to display an animated sequence of computer-generated images on the upper and lower displays of each EGM and the bonus display unit including the steps of:

accessing the stored image data and rendering a computer-animated images of the plurality of escrow objects included in the escrow meter on the bonus display unit and transmitting computer-executable instructions associated with the escrow meter to each EGM controller to cause each EGM controller to display the plurality of escrow objects included in the escrow meter on the upper display GUI of each of the EGMs including computer generated images of a plurality of escrow objects;

randomly selecting a first EGM from the plurality of EGMs using the random number generator and rendering a computer-animated bonus select event on the first EGM by:

randomly selecting two escrow objects using the random number generator;

transmitting computer-executable instructions for displaying the computer-animated bonus select event to the first EGM controller to cause the first EGM controller to:

display a first transition animation to replace the plurality of animated reels displayed on the touchscreen of the lower display GUI with an object selection screen;

animate the randomly selected two escrow objects to appear on the object selection screen as piñata images;

receive a player selection of one of the two escrow objects by a player via the touchscreen of the first EGM and animate a computer-animated bat image to appear on the object selection screen and contact the player selected escrow object;

modify an image of the player selected escrow object to display a corresponding computer-animated award image associated with the player selected escrow object; and display a second transition animation to replace the object selection screen displayed on the touchscreen of the lower display GUI with the plurality of animated reels; and modifying the computer-animated escrow meter displayed on the bonus display unit to add an image of an unselected escrow object to the plurality of escrow objects and transmitting computer-executable instructions for adding the image of the unselected escrow object to the plurality of escrow objects to each EGM controller to cause each escrow meter displayed on each EGM to display a same number of escrow objects as the escrow meter displayed on the bonus display unit; and conducting an animated bonus award event by:

randomly selecting a second EGM using the random number generator;

modifying the computer-animated escrow meter displayed on the bonus display unit to remove the plurality of escrow objects and transmitting computer-executable instructions for removing the plurality of escrow objects from the escrow meter to each non-selected EGM; and rendering a computer-animated bonus award event at the second EGM by:

transmitting computer-executable instructions for animating the plurality of escrow objects to a second EGM controller of the second EGM to cause the second EGM controller to:

replace the plurality of animated reels displayed on the lower display GUI of the second EGM with a second object selection screen;

animate each of the plurality of escrow objects to move from the computer-animated escrow meter being displayed on the upper display of the second EGM to the second object selection screen displayed on the touchscreen of the lower display of the second EGM;

animate a computer-animated prompting image on the object selection screen of the second EGM to prompt a player selection of each of the plurality of escrow objects displayed on the object selection screen; and display each computer-animated escrow award image associated with each of the plurality of escrow objects as each escrow object is selected via the touchscreen of the second EGM.

10. The non-transitory computer-readable storage media of claim 9, wherein the computer-executable instructions cause the one or more processors to perform the algorithm including the steps of:

rendering the bonus select event by:

transmitting computer-executable instructions for displaying the computer-animated bonus select event to the first EGM controller to cause the first EGM controller to animate the unselected escrow object to move to the escrow meter from the object selection screen after the selected escrow object has been modified to display the corresponding award.

11. The non-transitory computer-readable storage media of claim 9, wherein the computer-executable instructions cause the one or more processors to perform the algorithm including the steps of:

populating the computer-animated escrow meter displayed on the bonus display unit and on each EGM with a predefined number of new escrow objects upon completing the bonus award event.

12. The non-transitory computer-readable storage media of claim 9, wherein the computer-executable instructions cause the one or more processors to perform the algorithm including the steps of:

rending the escrow meter on the bonus display unit to display ten escrow objects; and displaying a number icon indicating a number of escrow objects in the escrow meter when the number of escrow objects is greater than ten escrow objects.

* * * * *